US010819037B2

(12) United States Patent
Schulz et al.

(10) Patent No.: US 10,819,037 B2
(45) Date of Patent: Oct. 27, 2020

(54) RADIO SYSTEM FOR LONG-RANGE HIGH-SPEED WIRELESS COMMUNICATION

(71) Applicant: Ubiquiti Inc., New York, NY (US)

(72) Inventors: Gary D. Schulz, Cary, IL (US); Paul Odlyzko, Arlington Heights, IL (US); John R. Sanford, Escondido, CA (US); Christopher Fay, Wheaton, IL (US); Jude Lee, San Jose, CA (US); Charles D. Macenski, West Chicago, IL (US); Richard J. Keniuk, Cary, IL (US); Lance D. Lascari, Rochester, NY (US)

(73) Assignee: Ubiquiti Inc., New York, NY (US)

( * ) Notice: Subject to any disclaimer, the term of this patent is extended or adjusted under 35 U.S.C. 154(b) by 0 days.

(21) Appl. No.: 16/430,326

(22) Filed: Jun. 3, 2019

(65) Prior Publication Data

US 2019/0372235 A1 Dec. 5, 2019

Related U.S. Application Data

(60) Continuation of application No. 15/979,342, filed on May 14, 2018, now Pat. No. 10,312,598, which is a (Continued)

(51) Int. Cl.
*H04B 17/00* (2015.01)
*H01Q 15/16* (2006.01)
(Continued)

(52) U.S. Cl.
CPC ........... *H01Q 15/16* (2013.01); *H01Q 1/1228* (2013.01); *H01Q 1/42* (2013.01); *H01Q 19/134* (2013.01)

(58) Field of Classification Search
CPC .... H04B 17/0085; H04B 17/10; H04B 17/11; H04B 17/14; H04B 17/19; H04B 17/21; H04B 17/354; H04B 1/525
See application file for complete search history.

(56) References Cited

U.S. PATENT DOCUMENTS

| | | | |
|---|---|---|---|
| 2,455,888 | A | 12/1948 | Brown |
| 2,460,869 | A | 2/1949 | Braden |

(Continued)

FOREIGN PATENT DOCUMENTS

| | | | |
|---|---|---|---|
| CN | 202042599 U | 11/2011 | |
| EP | 2416449 A1 | 2/2012 | |

(Continued)

OTHER PUBLICATIONS

Le-Ngoc et al.; Design aspects and performance evaluation of ATCS mobile data link; IEEE 39th; InVehicular Technology Conference; pp. 860-867; May 1, 1989.

*Primary Examiner* — Tuan Pham
(74) *Attorney, Agent, or Firm* — Shay Glenn LLP

(57) ABSTRACT

Devices and systems, and methods of using them, for point-to-point transmission/communication of high bandwidth signals. Radio devices and systems may include a pair of reflectors (e.g., parabolic reflectors) that are adjacent to each other and configured so that one of the reflectors is dedicated for sending/transmitting information, and the adjacent reflector is dedicated for receiving information. Both reflectors may be in a fixed configuration relative to each other so that they are aligned to send/receive in parallel. In many variations the two reflectors are formed of a single housing, so that the parallel alignment is fixed, and reflectors cannot lose alignment. The device/systems may be configured to allow switching between duplexing modes. These devices/systems may be configured as wide bandwidth zero intermediate frequency radios including alignment modules for automatic alignment of in-phase and quadrature components of transmitted signals.

16 Claims, 40 Drawing Sheets

Related U.S. Application Data continuation of application No. 15/289,031, filed on Oct. 7, 2016, now Pat. No. 9,972,912, which is a division of application No. 13/843,205, filed on Mar. 15, 2013, now Pat. No. 9,496,620.

(60) Provisional application No. 61/762,814, filed on Feb. 8, 2013, provisional application No. 61/760,381, filed on Feb. 4, 2013.

(51) Int. Cl.
*H01Q 19/13* (2006.01)
*H01Q 1/42* (2006.01)
*H01Q 1/12* (2006.01)

(56) References Cited

U.S. PATENT DOCUMENTS

| | | | |
|---|---|---|---|
| 3,140,491 | A | 7/1964 | Ashbaugh et al. |
| 3,599,219 | A | 8/1971 | Holtum et al. |
| 3,739,392 | A | 6/1973 | Ross et al. |
| 4,578,638 | A | 3/1986 | Takano et al. |
| 4,598,178 | A | 7/1986 | Rollins |
| 4,626,863 | A | 12/1986 | Knop et al. |
| 4,788,554 | A | 11/1988 | Smith |
| 4,918,459 | A | 4/1990 | De Teso |
| 5,010,348 | A | 4/1991 | Rene et al. |
| 5,131,006 | A | 7/1992 | Kamerman et al. |
| 5,151,920 | A | 9/1992 | Haagh et al. |
| 5,295,154 | A | 3/1994 | Meier et al. |
| 5,374,911 | A | 12/1994 | Kich et al. |
| 5,402,136 | A | 3/1995 | Goto et al. |
| 5,406,260 | A | 4/1995 | Cummings et al. |
| 5,422,887 | A | 6/1995 | Diepstraten et al. |
| 5,428,636 | A | 6/1995 | Meier |
| 5,446,792 | A | 8/1995 | Sango |
| 5,504,746 | A | 4/1996 | Meier |
| 5,521,983 | A | 5/1996 | Thompson, III et al. |
| 5,546,397 | A | 8/1996 | Mahany |
| 5,625,365 | A | 4/1997 | Tom et al. |
| 5,706,428 | A | 1/1998 | Boer et al. |
| 5,740,366 | A | 4/1998 | Mahany et al. |
| 5,760,739 | A | 6/1998 | Pauli |
| 5,760,749 | A | 6/1998 | Minowa et al. |
| 5,844,893 | A | 12/1998 | Gollnick et al. |
| 5,907,310 | A | 5/1999 | Seewig et al. |
| 5,936,542 | A | 8/1999 | Kleinrock et al. |
| 5,940,771 | A | 8/1999 | Gollnick et al. |
| 5,943,430 | A | 8/1999 | Saitoh |
| 6,130,892 | A | 10/2000 | Short et al. |
| 6,137,449 | A | 10/2000 | Kildal |
| 6,169,522 | B1 | 1/2001 | Ma et al. |
| 6,184,840 | B1 | 2/2001 | Hsin Loug et al. |
| 6,194,992 | B1 | 2/2001 | Short et al. |
| 6,337,990 | B1 | 1/2002 | Koshino |
| 6,374,311 | B1 | 4/2002 | Mahany et al. |
| 6,437,757 | B1 | 8/2002 | Butler |
| 6,522,305 | B2 | 2/2003 | Sharman |
| 6,563,786 | B1 | 5/2003 | Van Nee |
| 6,636,894 | B1 | 10/2003 | Short et al. |
| 6,665,536 | B1 | 12/2003 | Mahany |
| 6,697,415 | B1 | 2/2004 | Mahany |
| 6,714,559 | B1 | 3/2004 | Meier |
| 6,789,110 | B1 | 9/2004 | Short et al. |
| 6,795,035 | B2 | 9/2004 | Jocher |
| 6,795,852 | B1 | 9/2004 | Kleinrock et al. |
| 6,810,426 | B2 | 10/2004 | Mysore et al. |
| 6,857,009 | B1 | 2/2005 | Ferreria et al. |
| 6,868,399 | B1 | 3/2005 | Short et al. |
| 6,970,680 | B1 | 11/2005 | Tomoe |
| 7,020,082 | B2 | 3/2006 | Bhagavath et al. |
| 7,088,727 | B1 | 8/2006 | Short et al. |
| 7,117,526 | B1 | 10/2006 | Short |
| 7,155,196 | B1 | 12/2006 | Beard |
| 7,194,554 | B1 | 3/2007 | Short et al. |
| 7,197,556 | B1 | 3/2007 | Short et al. |
| 7,254,191 | B2 | 8/2007 | Sugar et al. |
| 7,295,165 | B2 | 11/2007 | Ferguson et al. |
| 7,295,812 | B2 | 11/2007 | Haapoja et al. |
| 7,386,002 | B2 | 6/2008 | Meier |
| 7,457,646 | B2 | 11/2008 | Mahany et al. |
| 7,577,398 | B2 | 8/2009 | Judd et al. |
| 7,656,363 | B2 | 2/2010 | Devicque et al. |
| 7,715,800 | B2 | 5/2010 | Sinha |
| 7,739,383 | B1 | 6/2010 | Short et al. |
| 7,752,334 | B2 | 7/2010 | Paunikar et al. |
| 7,800,551 | B2 | 9/2010 | McCown |
| 7,826,426 | B1 | 11/2010 | Bharghavan et al. |
| 8,077,113 | B2 | 12/2011 | Syed et al. |
| 8,190,708 | B1 | 5/2012 | Short et al. |
| 8,335,272 | B2 | 12/2012 | Roberts |
| 8,385,869 | B2 | 2/2013 | Feenaghty et al. |
| 8,466,847 | B2 | 6/2013 | Pera et al. |
| 8,483,188 | B2 | 7/2013 | Walton et al. |
| 8,493,279 | B2 | 7/2013 | Pera et al. |
| 8,581,795 | B2 | 11/2013 | Simms et al. |
| 8,804,622 | B1 | 8/2014 | Thai et al. |
| 8,836,601 | B2 | 9/2014 | Sanford et al. |
| 9,151,572 | B1 | 10/2015 | Sieracki |
| 9,191,037 | B2 | 11/2015 | Lascari et al. |
| 9,397,820 | B2 | 7/2016 | Schulz et al. |
| 9,490,533 | B2 | 11/2016 | Sanford et al. |
| 9,496,620 | B2 | 11/2016 | Schulz et al. |
| 9,543,635 | B2 | 1/2017 | Schulz et al. |
| 9,634,373 | B2 | 4/2017 | Lee et al. |
| 9,912,034 | B2 | 3/2018 | Sanford et al. |
| 9,941,570 | B2 | 4/2018 | Sanford et al. |
| 9,972,912 | B2 | 5/2018 | Schulz et al. |
| 10,069,580 | B2 | 9/2018 | Hardy et al. |
| 10,136,233 | B2 | 11/2018 | Lee et al. |
| 10,205,471 | B2 | 2/2019 | Lascari et al. |
| 10,312,598 | B2 | 6/2019 | Schulz et al. |
| 10,367,592 | B2 | 7/2019 | Hardy et al. |
| 2002/0044032 | A1 | 4/2002 | Guguen et al. |
| 2002/0098805 | A1 | 7/2002 | King |
| 2002/0177425 | A1* | 11/2002 | Li ........................... H03D 7/18 455/296 |
| 2003/0032398 | A1 | 2/2003 | Harris |
| 2003/0038753 | A1 | 2/2003 | Mahon |
| 2003/0203743 | A1 | 10/2003 | Sugar et al. |
| 2003/0207669 | A1 | 11/2003 | Kroeger |
| 2003/0221304 | A1 | 12/2003 | Janssen et al. |
| 2003/0224801 | A1 | 12/2003 | Lovberg et al. |
| 2004/0071298 | A1 | 4/2004 | Geeng |
| 2004/0108966 | A1 | 6/2004 | McKivergan et al. |
| 2004/0132424 | A1* | 7/2004 | Aytur .................. H04B 1/0475 455/335 |
| 2005/0245254 | A1 | 11/2005 | Hall |
| 2006/0001589 | A1 | 1/2006 | Nicolae |
| 2006/0007044 | A1 | 1/2006 | Crouch et al. |
| 2006/0009177 | A1 | 1/2006 | Persico et al. |
| 2007/0057860 | A1 | 3/2007 | Jaffer et al. |
| 2007/0132651 | A1 | 6/2007 | Nilsson |
| 2007/0157482 | A1 | 7/2007 | Wallace |
| 2008/0199037 | A1 | 8/2008 | Xu et al. |
| 2008/0224938 | A1 | 9/2008 | Udagawa et al. |
| 2008/0240313 | A1 | 10/2008 | Deisher et al. |
| 2008/0261548 | A1 | 10/2008 | Krone |
| 2008/0297425 | A1 | 12/2008 | Axton et al. |
| 2009/0174622 | A1 | 7/2009 | Kanou |
| 2009/0267701 | A1* | 10/2009 | Parsa ..................... H03C 3/406 332/103 |
| 2009/0295677 | A1 | 12/2009 | Gratton et al. |
| 2009/0310721 | A1 | 12/2009 | Redfern et al. |
| 2010/0013729 | A1 | 1/2010 | Harel et al. |
| 2010/0053022 | A1 | 3/2010 | Mak et al. |
| 2010/0152600 | A1 | 6/2010 | Droitcour et al. |
| 2010/0245187 | A1 | 9/2010 | Omuro et al. |
| 2010/0285769 | A1 | 11/2010 | Conroy et al. |
| 2010/0289705 | A1 | 11/2010 | Shtrom et al. |
| 2011/0012801 | A1 | 1/2011 | Monte et al. |
| 2011/0068988 | A1 | 3/2011 | Monte |
| 2011/0168480 | A1 | 7/2011 | Sterling et al. |
| 2011/0181479 | A1 | 7/2011 | Martin et al. |

(56) References Cited

U.S. PATENT DOCUMENTS

| | | | |
|---|---|---|---|
| 2011/0258678 | A1 | 10/2011 | Cowling et al. |
| 2012/0013516 | A1 | 1/2012 | Ahn et al. |
| 2012/0176608 | A1 | 7/2012 | McCown |
| 2012/0213086 | A1 | 8/2012 | Matsuura |
| 2012/0250793 | A1 | 10/2012 | Khatana et al. |
| 2013/0002515 | A1 | 1/2013 | Hills et al. |
| 2013/0012134 | A1 | 1/2013 | Jin et al. |
| 2013/0017794 | A1 | 1/2013 | Kloper et al. |
| 2013/0028150 | A1 | 1/2013 | Ma et al. |
| 2013/0135146 | A1 | 5/2013 | Ransom et al. |
| 2013/0154894 | A1 | 6/2013 | Caimi et al. |
| 2013/0163770 | A1 | 6/2013 | Takemura |
| 2013/0249754 | A1 | 9/2013 | Rice |
| 2013/0271337 | A1 | 10/2013 | Lee et al. |
| 2014/0118220 | A1 | 5/2014 | Ley |
| 2014/0169194 | A1 | 6/2014 | Banerjee et al. |
| 2014/0274177 | A1 | 9/2014 | Carbajal |
| 2014/0315599 | A1 | 10/2014 | Teichmann et al. |
| 2015/0133060 | A1 | 5/2015 | Duan |
| 2015/0292948 | A1 | 10/2015 | Goldring et al. |
| 2016/0218406 | A1 | 7/2016 | Sanford |
| 2017/0229773 | A1 | 8/2017 | Lee et al. |
| 2018/0233799 | A1 | 8/2018 | Sanford et al. |
| 2018/0269554 | A1 | 9/2018 | Sanford |
| 2019/0069108 | A1 | 2/2019 | Lee et al. |
| 2019/0132014 | A1 | 5/2019 | Lascari et al. |
| 2019/0280788 | A1 | 9/2019 | Hardy et al. |

FOREIGN PATENT DOCUMENTS

| | | | |
|---|---|---|---|
| JP | S54-95157 | U | 7/1979 |
| JP | 2002299940 | A | 10/2002 |
| JP | 2007259001 | A | 10/2007 |
| JP | 2010192992 | A | 9/2010 |
| JP | 2012227863 | A | 11/2012 |
| KR | 10-20080079357 | A | 9/2008 |
| KR | 200450128 | Y1 | 8/2010 |
| KR | 101023789 | B1 | 3/2011 |
| KR | 101068766 | B1 | 9/2011 |
| WO | WO98/40990 | A1 | 9/1998 |
| WO | WO01/31855 | A2 | 5/2001 |
| WO | WO01/31886 | A2 | 5/2001 |
| WO | WO01/86877 | A2 | 11/2001 |
| WO | WO2008/042804 | A2 | 4/2008 |
| WO | WO2008/154514 | A2 | 12/2008 |
| WO | WO2009/131219 | A1 | 10/2009 |
| WO | WO2011/005710 | A2 | 1/2011 |
| WO | WO2013/071810 | A1 | 5/2013 |

* cited by examiner

400

700

1000

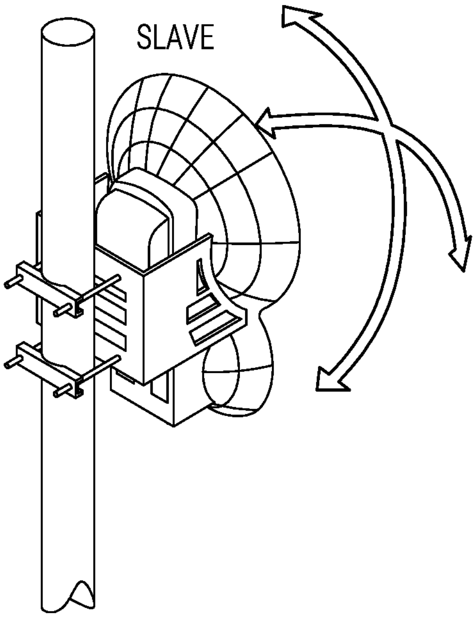
FIG. 12C1
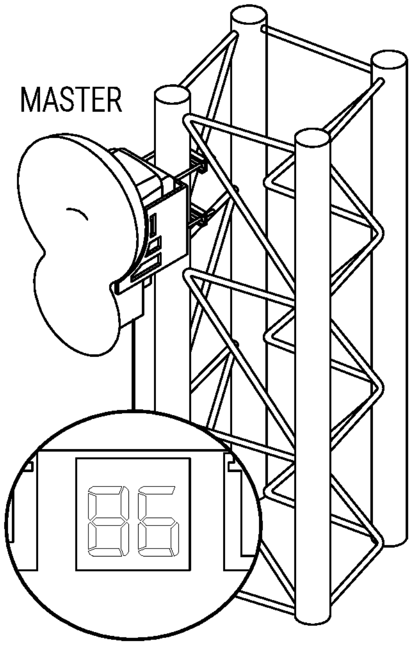
FIG. 12C2
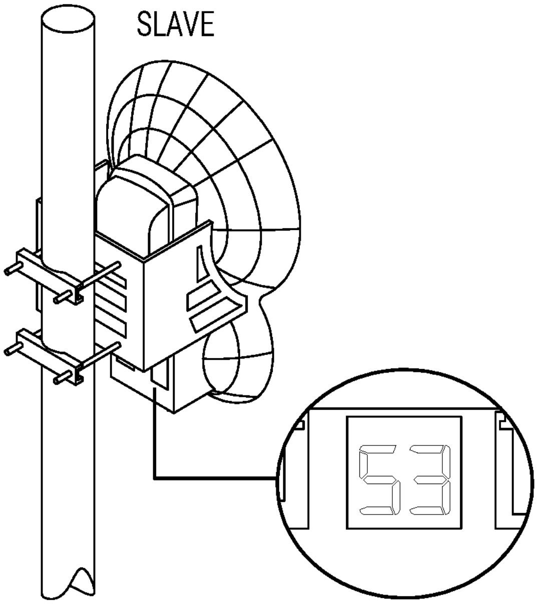
FIG. 12C3
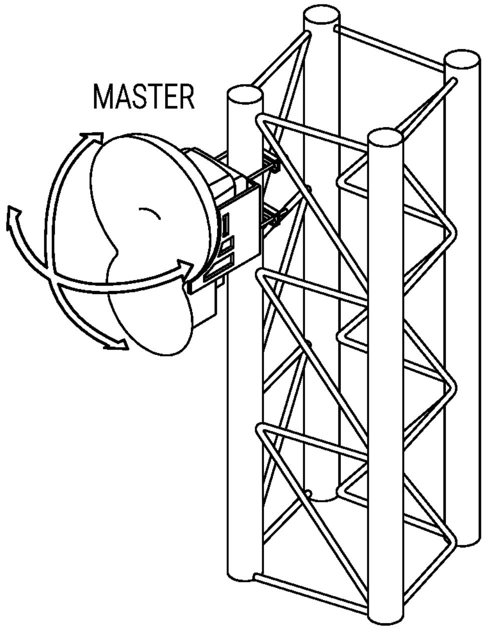
FIG. 12C4

RECEIVE SENSITIVITY SPECS

| MODULATION | SENSITIVITY | FDD CAPACITY® | TDD CAPACITY® |
|---|---|---|---|
| 64QAM | -66 dBm | 1500 Mbps | 760 Mbps |
| 16QAM | -72 dBm | 1000 Mbps | 507 Mbps |
| QPSK MIMO | -78 dBm | 500 Mbps | 253 Mbps |
| QPSK SISO | -80 dBm | 250 Mbps | 127 Mbps |
| 1/4 x QPSK SISO | -87 dBm | 62.5 Mbps | 31.7 Mbps |

FDD=(2) 100 MHz CHANNELS AND TDD=(1) 100 MHz CHANNEL

FIG. 20

| | |
|---|---|
| OPERATING FREQUENCY | 24.05 – 24.25 GHz |
| DIMENSIONS | 648 x 426 x 303 mm |
| WEIGHT | 10.5 KG (MOUNT INCLUDED) |
| MAX. POWER CONSUMPTION | < 50W |
| POWER SUPPLY | 50V, 1.2A PoE GigE ADAPTER (INCLUDED) |
| POWER METHOD | PASSIVE POWER OVER ETHERNET (42-58VDC) |
| CERTIFICATIONS | CE, FCC, IC |
| MOUNTING | POLE MOUNT KIT (INCLUDED) |
| OPERATING TEMPERATURE | -40 TO 55°C (-40 TO 131°F) |
| LEDs | (8) STATUS LEDs: DATA PORT SPEED<br>DATA PORT LINK/ACTIVITY<br>CONFIGURATION PORT SPEED<br>CONFIGURATION PORT LINK/ACTIVITY<br>GPS SYNCHRONIZATION<br>MODULATION MODE<br>MASTER/SLAVE<br>RF STATUS<br>(1) TWO-DIGIT LED DISPLAY CALIBRATED IN dBm |
| **INTERFACE** | |
| DATA PORT | (1) 10/100/1000 ETHERNET PORT |
| CONFIGURATION PORT | (1) 10/100 ETHERNET PORT |
| AUXILIARY PORT | (1) RJ-12, ALIGNMENT TONE PORT |
| **SYSTEM** | |
| MAXIMUM THROUGHPUT | 1.4+ Gbps |
| MAXIMUM RANGE | 13+ Km |
| PACKETS PER SECOND | > 1 MILLION |
| ENCRYPTION | 128-Bit AES |
| FORWARD ERROR CORRECTION | 164/205 |
| CYCLIC PREFIX | 1/16 FIXED |
| UPLINK/ DOWNLINK RATIO | 50% FIXED |
| **RADIO FREQUENCY** | |
| GPS | GPS CLOCK SYNCHRONIZATION |
| **TRANSCEIVER** | |
| EIRP | ~33 dBm (FCC/IC), ~20 dBm (CE) |
| FREQUENCY ACCURACY | ±2.5 PPM WITHOUT GPS SYNCHRONIZATION<br>±0.2 PPM WITH GPS SYNCHRONIZATION |
| CHANNEL BANDWIDTH | 100 MHz |
| OPERATING CHANNELS | 24.1 GHz, 24.2 GHz |
| MODULATION | 64QAM MIMO<br>16QAM MIMO<br>QPSK MIMO<br>QPSK SISO<br>1/4 x QPSK SISO |
| **INTEGRATED SPLIT ANTENNA** | |
| TX GAIN | 33 dBi |
| RX GAIN | 38 dBi |
| BEAMWIDTH | < 3.5* |
| FRONT - TO - BACK RATIO | 70 dB |
| POLARITY | DUAL-SLANT POLARIZATION |
| CROSS-POLARITY ISOLATION | > 28 dB |

FIG. 21

RADIO SYSTEM FOR LONG-RANGE HIGH-SPEED WIRELESS COMMUNICATION

CROSS REFERENCE TO RELATED APPLICATIONS

This patent application is a continuation of U.S. patent application Ser. No. 15/979,342, filed May 14, 2018, titled "RADIO SYSTEM FOR LONG-RANGE HIGH SPEED WIRELESS COMMUNICATION," now U.S. Pat. No. 10,312,598, which is a continuation of U.S. patent application Ser. No. 15/289,031, filed Oct. 7, 2016, titled "RADIO SYSTEM FOR LONG-RANGE HIGH SPEED WIRELESS COMMUNICATION," now U.S. Pat. No. 9,972,912, which is a divisional of U.S. patent application Ser. No. 13/843,205, filed Mar. 15, 2013, titled "RADIO SYSTEM FOR LONG-RANGE HIGH-SPEED WIRELESS COMMUNICATION," now U.S. Pat. No. 9,496,620, which claims priority to: U.S. Provisional Patent Application No. 61/762,814, filed Feb. 8, 2013, titled "RADIO SYSTEM FOR LONG-RANGE HIGH-SPEED WIRELESS COMMUNICATION;" and U.S. Provisional Patent Application No. 61/760,381, filed Feb. 4, 2013, and titled "FULL DUPLEX ANTENNA." The entire content of each of these applications is herein incorporated by reference in their entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This disclosure is generally related to wireless communication systems. More specifically, this disclosure is related to radio systems for high-speed, long-range wireless communication, and particularly radio devices for point-to-point transmission of high bandwidth signals.

BACKGROUND

The rapid development of optical fibers, which permit transmission over longer distances and at higher bandwidths, has revolutionized the telecommunications industry and has played a major role in the advent of the information age. However, there are limitations to the application of optical fibers. Because laying optical fibers in the field can require a large initial investment, it is not cost effective to extend the reach of optical fibers to sparsely populated areas, such as rural regions or other remote, hard-to-reach areas. Moreover, in many scenarios where a business may want to establish point-to-point links among multiple locations, it may not be economically feasible to lay new fibers.

On the other hand, wireless radio communication devices and systems provide high-speed data transmission over an air interface, making it an attractive technology for providing network connections to areas that are not yet reached by fibers or cables. However, currently available wireless technologies for long-range, point-to-point connections encounter many problems, such as limited range and poor signal quality.

Radio frequency (RF) and microwave antennas represent a class of electronic antennas designed to operate on signals in the megahertz to gigahertz frequency ranges. Conventionally these frequency ranges are used by most broadcast radio, television, and wireless communication (cell phones, Wi-Fi, etc.) systems with higher frequencies often employing parabolic antennas.

A parabolic antenna is an antenna that uses a parabolic reflector, a curved surface with the cross-sectional shape of a parabola, to direct the radio waves. Conventionally, a parabolic antenna is includes a portion shaped like a dish and is often referred to as a "dish." Parabolic antennas provide for high directivity of the radio signal because they have very high gain in a single direction. To achieve narrow beam-widths, the parabolic reflector must typically be much larger than the wavelength of the radio waves used, so parabolic antennas are typically used in the high frequency part of the radio spectrum, at UHF and microwave (SHF) frequencies, where the wavelengths are small enough to allow for manageable antenna sizes. Parabolic antennas may be used in point-to-point communications, such as microwave relay links, WAN/LAN links and spacecraft communication antennas.

The operating principle of a parabolic antenna is that a point source of radio waves at the focal point in front of a parabolic reflector of conductive material will be reflected into a collimated plane wave beam along the axis of the reflector. Conversely, an incoming plane wave parallel to the axis will be focused to a point at the focal point.

Described herein are devices, methods and systems that may address many of the issues identified above.

SUMMARY OF THE DISCLOSURE

In general, described herein are devices and systems, and methods of using them, for point-to-point transmission/communication of high bandwidth signals. For example, described herein are radio devices and systems including dual high-gain reflector antennas. A typical radio device may include a pair of reflectors (e.g., parabolic reflectors) that are adjacent to each other and configured so that one of the reflectors is dedicated for sending/transmitting information, and the adjacent reflector is dedicated for receiving information. Both reflectors may be in a fixed configuration relative to each other so that they are aligned to send/receive in parallel. In many variations the two reflectors are formed of a single housing, so that the parallel alignment is fixed, and reflectors cannot lose alignment. The housing forming or holding the antenna is this fixed parallel alignment may be adapted to prevent disruption of the alignment, for example, by increasing the rigidity of the overall device/system.

In general, the radio systems and devices described herein may be configured to operate at licensed or unlicensed frequencies, including the unlicensed 24 GHz frequency band. Thus the devices, systems and methods may be configured for operation at this frequency band.

The devices and systems described herein may also be adapted to prevent loss of signal strength for both sending and receiving, including preventing cross-talk or interference between the separate transmission and receiving reflectors. For example, the reflectors may be sized, shaped, and/or positioned to prevent interference, as will be described in greater detail below. The devices and systems may be configured to prevent loss at the radio by shielding (separately or jointly) the transmission and/or receiving components of the radio, e.g., on the circuitry. The device may be configured so that the transmitting and receiving components of the system are located on a single circuit board (e.g., PCB) so that the number of connectors between different components is minimized. Although such configurations may potentially introduce cross-talk/interference between the sending and receiving channels, various design aspects, illustrated and discussed herein, may be included to prevent or reduce such interference.

For example, described herein are radio devices for point-to-point transmission of high bandwidth signals. Such devices may include: a housing comprising a first parabolic reflector and a second parabolic reflector wherein the first and second reflectors are aimed directionally parallel with each other; a transmitter feed coupled to the first parabolic reflector; a receiver feed coupled to the second parabolic reflector; and a printed circuit board (PCB) comprising both a first transmitter connected to the transmitter feed and a first receiver connected to the receiver feed.

In any of the variations described herein, more than two reflectors (e.g., parabolic reflectors) may be used, e.g., 3, 4, 5, 6, or more. For example, two transmitter reflectors and one receiver; two transmitter reflectors and two receivers, etc. Such reflectors are all typically rigidly arranged as described, and may be aligned so that all of them are configured to be aimed directionally parallel. Any of the variations describe herein may be configured as multiple-input multiple-output (MIMO) antennas, so that multiple (e.g., 2) transmitters feed into one or more reflector/antenna feed for the transmitter and/or multiple receivers feed into one or more reflector/antenna feed for the receiver.

For example, in some variations, the PCB comprises a second transmitter connected to the transmitter feed and a second receiver connected to the receiver feed.

In general, the housing may be rigid or stiff, which may keep the send and receive antenna (reflector) aimed directionally parallel. For example, the housing comprises a rigid housing. The housing may be adapted for rigidity, for example by forming the antenna and/or circuitry housing from a single piece. The radio devices/systems described herein may also include supports, struts, beams, etc. ("ribs") to provide/enhance the rigidity, which may also be formed as a single piece with the housing. The device may also include a cover (e.g., radome cover) over all or a portion of the device (e.g., the reflectors) which may enhance stiffness. In general, the se device may be adapted for exterior use, and may withstand temperature, moisture, wind and/or other environmental forces without altering the alignment of the reflectors.

As mentioned, the systems/devices may be configured to prevent interference between the transmitter and receiver of the radio. For example, the first parabolic reflector and the second parabolic reflector may be separated by an isolation choke boundary layer. In some variations, the choke boundary layer may be configured to include corrugations or ridges between the reflectors, which may be considered as part of the isolation boundary between the reflectors. In some variations the reflectors are configured so that there is low mutual coupling between the two antennas. For example, the ratio of focal length to diameter ($f_l$/d) may be less than approximately 0.25 for the reflectors (e.g., the transmission reflector or both the transmission and receiving reflectors).

In some variations the outer diameter of the first parabolic reflector cuts into the outer diameter of the second parabolic reflector. This configuration may allow better coupling between the radio circuitry components and may be balanced to prevent interference between the transmitter and receiver. Thus, the distance between the dedicated transmitter feed and the dedicated receiver feed may be less than the sum of the diameters of the two reflectors (transmitter reflector and receiver reflector). In some variations the transmitter reflector cuts into the transmitter receiver.

The relative sizes of the transmitter reflector and the receiver reflector may be different. For example, the first parabolic reflector (e.g., transmitter) may be smaller than the second parabolic reflector (e.g., receiver).

As mentioned, the housing comprises ribs configured to stiffen the housing and keep the first and second reflectors directionally parallel. These ribs may be located anywhere on the housing, including behind the reflectors, between the reflectors, etc.

In general, the reflectors may be configured to reflect the frequencies being transmitted/received (which may be the same frequencies for both transmission/receiving). For example, the reflectors may include reflective coating on the first and second reflectors. The reflective coating may be a metal (e.g., silver, aluminum, alloys, etc.) and may be applied by any appropriate method, including deposition (e.g., sputtering, etc.), plating, etc.

As mentioned, in some variations, the first parabolic reflector is a dedicated transmitting antenna configured to transmit but not to receive; further wherein the second parabolic reflector is a dedicated receiving antenna configured to receive but not to transmit.

For example, described herein are radio devices for point-to-point transmission of high bandwidth signals that include: a housing forming a pair of reflectors including a first reflector and a second reflector, wherein the pair of reflectors are situated on a front side of the antenna housing unit; and a printed circuit board (PCB) comprising at least a transmitter and a receiver, wherein the transmitter couples with the first reflector to form a dedicated transmitting antenna configured to transmit but not to received and the receiver couples with the second reflector to form a dedicated receiving antenna configured to receive but not to transmit.

As mentioned, the transmitter may be isolated from the receiver on the PCB to prevent RF interference between the two.

In any of the examples described herein, the transmitter and the receiver can be operated either a full-duplex mode or a half-duplex mode. As described in more detail below, the devices and systems may be configured so that a full duplex mode (e.g., FDD, etc.) or a half-duplex mode (e.g., TDD) or a variation thereof (e.g., HDD) may be selected automatically and/or manually. In some variations, the system or device is configured to switch between two or more of these modes dynamically, based on performance and/or environmental parameters.

As mentioned above, the reflectors may be formed using a single mold. For example, the housing may be injection molded so that the reflectors are formed a single piece. In general, such reflectors may include a parabolic reflecting surface. The reflectors may have different shapes and sizes. For example, the parabolic shaped reflecting surfaces may have different diameters, e.g., a reflector with a larger diameter is coupled to the receiver, or in some variations to the transmitter. In some variations the parabolic profiles of the first and second reflectors overlap.

As mentioned above, in general the transmitters are isolated from the receiver, so that a first reflector (antenna) is dedicated as a transmitter and a second reflector (antenna) is dedicated as a receiver. For example, a transmitter feed may be coupled to the first reflector and the transmitter; and a receiver feed coupled to a second reflector and the transmitter.

Any of the radio devices described herein may include a mounting unit for mounting the radio device (e.g., onto a pole). In some variations the mounting unit is coupled to the backside of the housing. The mounting unit may be configured to rigidly secure the device to a stand, pole, wall, or the like; the mounting unit may include adjustable elements to allow the direction that the combined transmitter reflector and parallel-arranged receiver face. In some variations a mounting unit includes: an azimuth-adjustment mechanism for adjusting the reflectors' azimuth; and an elevation-adjustment mechanism for adjusting the reflectors' elevation.

In general, the devices described herein include radio circuitry controlling the transmission and reception of high-bandwidth signals. For example, the radio devices/systems typically include a printed circuit board (PCB) holding the circuitry and connecting/coupled to the antenna feeds for transmission and reception. In some variations only a single PCB is used, so that connections are minimal, reducing the losses due to connections.

The devices may be dynamically programmable. For example, the radio circuitry may include a field-programmable gate array (FPGA) chip coupled to the transmitter and the receiver on the PCB. The devices/systems may include a central processing unit (CPU) coupled to the FPGA chip, on the PCB. In some variations the devices/systems includes an Ethernet transceiver, e.g., coupled to the FPGA chip.

Any of the devices described herein may include a global positioning satellite (GPS). The device of claim 11, wherein the PCB further comprises a GPS receiver. The GPS receiver may provide timing and/or location device that may be used for scheduling communication (e.g., transmission between units). For example, the GPS signal received by the antenna may be used to provide a timing that is synchronized with other radio devices (e.g., a paired radio system). The GPS signal may also be used to provide distance information on the separation between radio systems, which may also be used, for example, for adaptive synchronous protocols for minimizing latency in TDD (or hybrid TDD) systems. See, e.g., U.S. application Ser. No. 13/217,428 (titled "Adaptive Synchronous Protocol for Minimizing Latency in TDD systems").

Any of the systems and devices described herein may be configured as wide bandwidth zero intermediate frequency radios. For example, the transmitter may comprise a quadrature modulator for modulating transmitted signals. In particular, the transmitter further may include an in-phase/quadrature (IQ) alignment module for automatic alignment of in-phase and quadrature components of transmitted signals, as will be described in greater detail below.

In general any of the devices described herein may be paired with another similar (or different embodiment) to form a system for point-to-point transmission of high bandwidth data. A system may include two or more radio devices having a dedicated transmitter aligned in parallel with a dedicated receiver. For example a wireless communication system may include: a pair of radio devices that are in communication with each other; wherein each radio device comprises an antenna housing forming a pair of reflectors including a first reflector and a second reflector wherein the first and second reflectors are aimed directionally parallel with each other; and wherein the radio devices are configured so that the reflectors of a first radio device face reflectors of a second radio device.

As mentioned, any of the radio devices described herein may be used. For example, the pair of reflectors may include a top parabolic reflector situated adjacent (e.g., above) a bottom parabolic reflector. The transmitter reflector may be smaller than the receiver reflector, and the transmitter reflector may cut into the transmitter reflector. Any of these radio devices may be configured to operate in either full-duplex mode or half-duplex mode.

Also described herein are methods for establishing a wireless communication link. These methods may use any of the radio devices/systems described herein. A method of establishing a link (e.g. point-to-point high bandwidth connection) may include: placing a pair of radio devices that are in communication with each other at each end of the wireless communication link; wherein each radio device comprises an antenna housing forming a first reflector and a second reflector that are aimed directionally parallel with each other; and wherein placing the radio devices involves configuring reflectors of a first radio device to face reflectors of a second radio device. The radio device(s) may be configured to operate in either a full-duplex mode or a half-duplex mode, or to switch between the two (manually and/or dynamically).

Another example of a method of establishing a point-to-point wireless communication link may include: positioning a first radio device at one end of the link, wherein the first radio device comprises a housing forming a dedicated transmitting antenna configured to transmit but not to receive and a dedicated receiving antenna configured to receive but not to transmit; and positioning a second radio device at one end of the link, wherein the second radio device comprises a housing forming a dedicated transmitting antenna configured to transmit but not to receive and a dedicated receiving antenna configured to receive but not to transmit; wherein the first radio device faces the second radio device so that transmitted signals from the transmitting antenna of the first radio device are received by the receiving antenna of the second radio device. As mentioned, the transmitting antenna may comprise a first reflector and the receiving antenna comprises a second reflector, wherein the first and second reflectors are formed by the housing of the first radio device so that the first reflector and the second reflector are aimed directionally parallel with each other. The method transmitting antenna may comprise a first parabolic reflector and the receiving antenna comprises a second parabolic reflector, further wherein the first parabolic reflector cuts into the second parabolic reflector. As mentioned, the radio device may be configured to operate in either full-duplex mode or half-duplex mode, or to manually and/or dynamically switch between the two.

In general, any of the radio devices and systems described herein may be configured to allow switching between full-duplex and half-duplex (e.g., emulated full duplex) modes. For example, a radio device for point-to-point transmission of high-bandwidth signals may be configured for switching between frequency division duplexing (FDD) and time division duplexing (TDD) when received signal integrity transitions across a threshold level. For example, a radio device for switching between frequency division duplexing (FDD) and time division duplexing (TDD) when received signal integrity transitions across a threshold level may include: a pair of antenna comprising a dedicated transmitting antenna and a dedicated receiving antenna; a transmitter coupled to the dedicated transmitting antenna; a receiver coupled to the dedicated receiving antenna; wherein the transmitter and receiver are configured to switch from frequency division duplexing (FDD) to time division duplexing (TDD) when integrity of the received signal falls below a threshold level.

Full duplex (double-duplex) systems typically allow communication in both directions simultaneously. Frequency division duplexing (FDD) may be one example of full duplex systems. As used herein, half duplex modulation may include emulated full duplex communication over a half-duplex communication link (e.g., TDD or HDD). In general, the systems and devices described herein may be configured to switch (manually and/or automatically) between different modes of operation such as FDD, TDD, HDD and other variations. This may be possible, in part, because the transmitter is isolated from, but directed in parallel with, the receiver, as described herein. Thus, the radio devices used may comprise a rigid housing forming both a first reflector of the dedicated transmitting antenna and a second reflector of the dedicated receiving antenna. For example, including a first parabolic reflector of the dedicated transmitting antenna and a second parabolic reflector of the dedicated receiving antenna, wherein the first and second parabolic reflectors are aimed directionally parallel with each other; the dedicated transmitting antenna may be configured to transmit but not to receive, and the dedicated receiving antenna may be configured to receive but not to transmit.

In some variations the transmitter and receiver are configured to be manually switchable between modes, (e.g., FDD and TDD; FDD and HDD; TDD and HDD; FDD, TDD and HDD, etc.).

In general, switching between modes may occur based on performance parameters and/or environmental parameters. For example, the threshold level may comprise a threshold error rate of received signals. The threshold error rate may correspond to a packet error rate.

As mentioned above, in some variations multiple transmitters and/or multiple receivers may be used. For example, the transmitter may comprise a pair of transmitters and the receiver may comprise a pair of receivers. The pair of transmitters may be configured to concurrently transmit at orthogonal polarization with respect to each other. In general, the transmitter and receiver may be configured to transmit and receive at the same frequency channel.

Thus, switching between modes may be dynamic. In some variations of radio devices for point-to-point transmission of high bandwidth signals, the device comprises: a housing comprising a first reflector configured as a transmitting antenna and a second reflector configured as a receiving antenna wherein the first and second reflectors are in a fixed relationship relative to each other; and a transmitter coupled to the first reflector; a receiver coupled to the second reflector; wherein the transmitter and receiver are configured to switch between frequency division duplexing (FDD) and time division duplexing (TDD).

In some variations, the radio device for point-to-point transmission of high bandwidth signals includes: a housing comprising a first reflector configured as a dedicated transmitting antenna and a second reflector configured as a dedicated receiving antenna wherein the first and second reflectors are aimed directionally parallel with each other; and a transmitter coupled to the first reflector; a receiver coupled to the second reflector; wherein the transmitter and receiver are configured to dynamically switch between frequency division duplexing (FDD) and time division duplexing (TDD) when received signal integrity transitions across a threshold level. As mentioned, the threshold level may comprise a threshold error rate of received signals (e.g., a packet error rate, etc.).

Any of the devices and systems described herein may be configured as wide-bandwidth zero intermediate frequency radio devices. These devices may include: a controller configured to emit transmission signals into a transmission path, the controller further configured to emit calibration tones; the first transmission path connected to the controller and including an in-phase/quadrature (IQ) modulator comprising an IQ filter and an IQ up-converter; and an IQ alignment module, wherein the IQ alignment module is connected to the first transmission path and comprises a band-limited measuring receiver having a measuring frequency $f_m$ wherein the measuring receiver determines a carrier leakage signal based on the level of a calibration tone at fm, further wherein the measuring receiver determines a sideband rejection signal based on the level of the calibration tone at $\pm\frac{1}{2}(f_m)$; wherein the IQ alignment module provides the carrier leakage signal and the sideband rejection signal to the controller. Radio devices including an IQ alignment module may be referred to as self-correcting, because they correct the transmission path.

In any of these variations, the measuring receiver may comprise a pair of detectors. For example, an IQ alignment module may comprise a pair of detectors each configured to receive orthogonal frequency division multiplexed (OFDM) transmission signals or single carrier signals generated by IQ sources. The IQ alignment module may comprise a filter, amplifier and analog to digital converter (ADC).

A band-limited measuring receiver may comprise a filter that sets the measuring frequency, $f_m$. For example, the measuring frequency may be 10.7 MHz.

In some variations, the controller is configured to emit orthogonal frequency division multiplexed calibration tones during an unused portion of a broadband communication signal frame. The controller may be configured to emit orthogonal frequency division multiplexed (OFDM) transmission signals. Generally, the controller may be configured to adjust device based on the sideband rejection signal and the carrier leakage signal.

For example, also described herein are methods of automatically correcting a wide-bandwidth zero intermediate frequency radio device, the method comprising: emitting calibration tones from a controller configured to emit broadband communication signals to first transmission path including an in-phase/quadrature (IQ) modulator; determining a carrier leakage signal based on a level of a calibration tone at a measuring frequency, $f_m$, using an IQ alignment module having a band-limited measuring receiver with the measuring frequency; determining a sideband rejection signal based on the level of a calibration tone at $\pm\frac{1}{2}(f_m)$; and providing the carrier leakage signal and sideband rejection signal to the controller.

The determining steps may comprise determining during an unused portion of a broadband communication signal frame. Analysis/transmission of the tone may occur during an unused portion of the frame.

The step of emitting may comprise emitting calibration tones that are orthogonal frequency division multiplexed (OFDM).

Providing the carrier leakage signal and the sideband rejection signal may comprise converting the carrier leakage signal to a digital signal and converting the sideband rejection signal to a digital signal. As mentioned above, the measuring frequency is 10.7 MHz.

In any of the methods of automatically correcting a wide-bandwidth zero intermediate frequency radio devices described herein, the method may include adjusting the wide-bandwidth zero intermediate frequency radio device based on the sideband rejection signal and the carrier leakage signal.

Methods of forming, assembling and/or making the radio devices and systems describe herein are also included. For example, a method of making a radio may include: forming a first reflector and a second reflector in a front side of an antenna housing unit; placing a printed circuit board (PCB) comprising a transmitter feed coupled to at least one transmitter and a receiver feed coupled to at least one receiver within a cavity at a backside of the antenna housing unit; and placing a backside cover over the cavity, thereby enclosing the PCB within the antenna housing unit. The method may further include coupling the transmitter feed to the first reflector; and coupling the receiver feed to the second reflector; wherein the transmitter and the receiver are isolated from each other with respect to the transmission of RF energy. In some variation, the method may include configuring the transmitter and the receiver to operate in one of: a full-duplex mode (e.g., FDD); and a half-duplex mode (e.g., TDD).

The first and second reflectors may be formed using a single mold. The first and second reflectors may include a pair of parabolic shaped reflecting surfaces. For example, the first reflector may comprise a first parabolic surface and the second reflector may comprise a second parabolic surface, and wherein the first parabolic surface cuts into the profile of the second parabolic surface. In some variations, the first reflector comprises a first parabolic surface and the second reflector comprises a second parabolic surface, further wherein the diameter of the first parabolic surface is larger than the diameter of the second parabolic surface.

The transmitter may comprise a quadrature modulator for modulating transmitted signals. For example, the transmitter may further comprise an IQ alignment module, as discussed above, for automatic alignment of in-phase and quadrature components of transmitted signals.

User interfaces for controlling the operation of any of the radio devices and system are also described herein. For example, a user interface for configuring a radio device for point-to-point transmission of high bandwidth signals may include: a display configured to show information about the radio; and a number of selectable tabs presented on the display, wherein a selection of a respective tab results in a number of user-editable fields being displayed, thereby facilitating a user in configuring and monitoring operations of the radio.

The selectable tabs may include a main tab, which displays current values of a plurality of configuration settings of the radio and traffic status for a link associated with the radio. The selectable tabs may include a wireless tab, which enables the user to set a plurality of parameters for a wireless link associated with the radio. In some variations, the plurality of parameters include at least one of: a wireless mode of the radio; a duplex mode for the wireless link; a transmitting frequency; a receiving frequency; a transmitting output power; a current modulation rate; and a gain setting for a receiving antenna.

The selectable tabs may include a network tab, which enables the user to configure settings for a management network associated with the radio. The selectable tabs may include a services tab, which enables the user to configure management services associated with the radio. The management services include at least one of: a ping service; a Simple Network Monitor Protocol (SNMP) agent; a web server; a Secure Shell (SSH) server; a Telnet server; a Network Time Protocol (NTP) client service; a dynamic Domain Name System (DNS); a system log service; and a device discovery service.

The selectable tabs may include a system tab, which enables the user to perform at least one of the following operations: reboot the radio; update firmware; manage a user account; and save or upload a configuration file.

BRIEF DESCRIPTION OF THE DRAWINGS

FIG. 12C1-12C4 presents a diagram illustrating the fine-tuning of the wireless link, in accordance with an embodiment of the present invention.

FIG. 20 presents a diagram illustrating one variation of the receive sensitivity specifications of the radio for various modulation schemes, in accordance with an embodiment of the present invention.

FIG. 21 presents a diagram illustrating one variation of the general specifications of the radio, in accordance with an embodiment of the present invention.

In the figures, like reference numerals refer to the same figure elements.

Figure 1A:
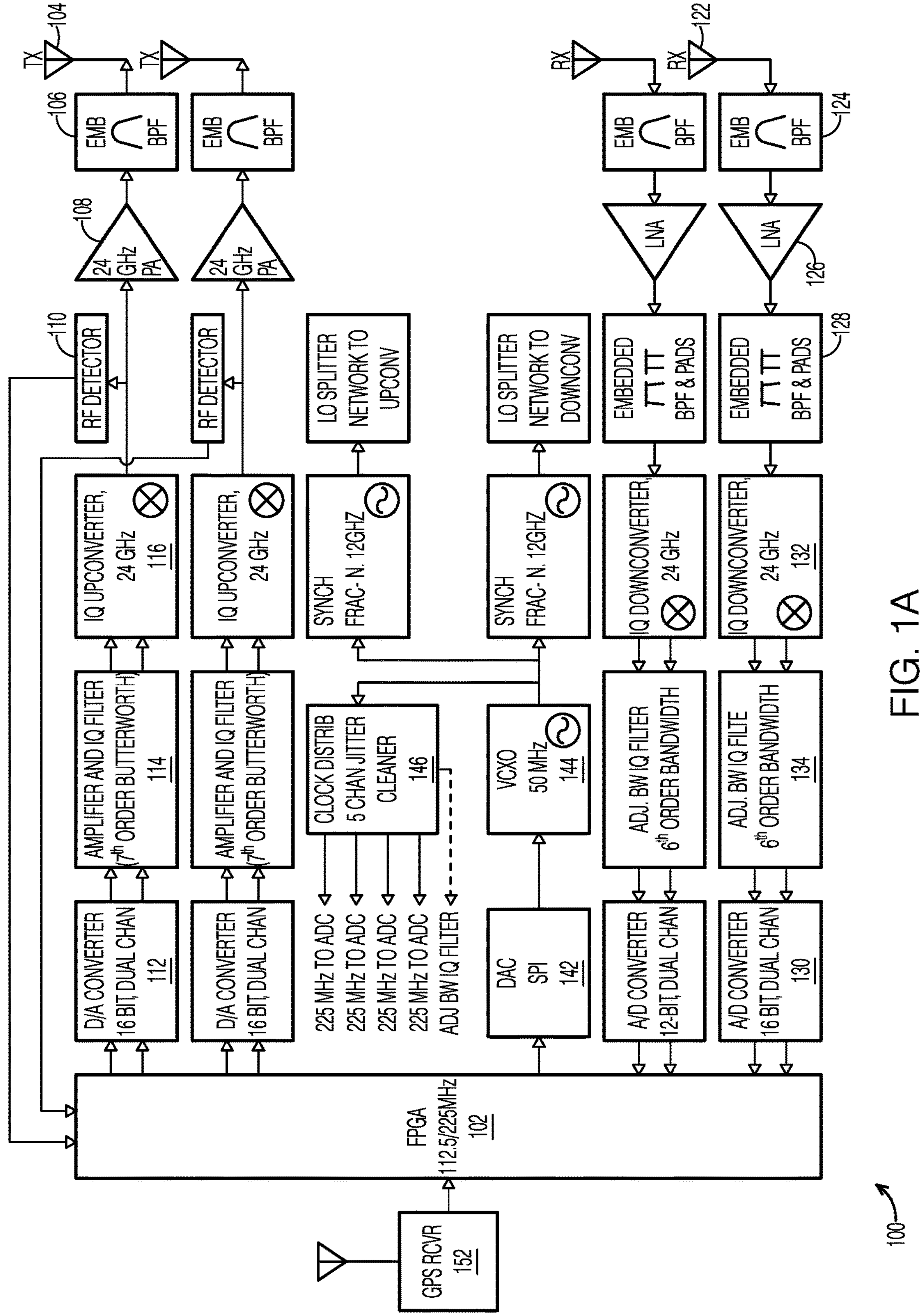
FIG. 1A presents a block diagram illustrating an exemplary architecture of an RF frontend of a radio, in accordance with an embodiment of the present invention.

All dimensions marked in the figures are in millimeters.

DETAILED DESCRIPTION

Described herein are radio devices and systems for point-to-point transmission of high bandwidth signals. These devices include radio devices/systems used for high-speed, long-range wireless communication.

In general, these radios include a dedicated transmit reflector (connected to one or more transmitters), and a dedicated receiver reflector (connected to one or more receivers). The dedicated transmit and receive reflectors are held in a fixed relationship with each other so that they are aimed directionally parallel with each other. In some variations the devices and systems may also be configured so that the circuitry for the radio is held on a single board, which connects to both the transmitter antenna feed, connected to the transmitter reflector, and the receiver antenna feed, connected to the receiver reflector. In some variations the two reflectors may overlap, e.g., so that the transmitter reflector (e.g., a parabolic reflector) cuts into the receiver reflector. In some variations the receiver reflector is larger than the transmitter reflector. Both receiver and transmitter reflectors may be formed as part of a unitary housing that is sufficiently stiff to prevent misalignment between the two reflectors. The housing may include additional structures (e.g., ribs, struts, supports, etc.) to enhance the stiffness.

As described in more detail below, any of these devices and systems may be configured to permit changing of the duplexing scheme of the device/system. For example, the radio device may be configured to manually and/or automatically switch between different types of duplexing (e.g., Frequency Division Duplexing (FDD), Time Division Duplexing (TDD), Hybrid Division Duplexing (HDD), etc.). In some variations the systems/devices are configured to switch between duplexing schemes based on performance parameters from the systems. For example, if the transmission degrades during operation of one duplexing scheme (e.g., FDD), the system may switch to a different duplexing scheme (e.g., TDD) for more reliable, though possibly slower, communication; if performance increases again, or if environmental parameters indicate, the system may again switch to a different duplexing scheme (e.g., FDD).

In general, the systems and devices described herein may be configured as a wide bandwidth zero intermediate frequency radio. Such radios typically allow generation and decoding at the baseband before up/down converting to the frequency band used (e.g., 24 GHz). Although such systems have historically been difficult to implement without the use of costly and complex circuitry to avoid imbalance of the in-phase and quadrature components (e.g., resulting from a DC offset), described herein are systems including IQ alignment modules that allow the device/systems to correct for either or both carrier leakage and sideband rejection.

In one variation, the radio system includes a pair of dual-independent 2×2 multiple-input multiple-output (MIMO) high-gain reflector antennas, a pair of transceivers capable of transmitting and receiving high-speed data (beyond 1.4 Gbps) at the 24 GHz unlicensed frequency band, and a user-interface that provides plug-and-play capability. In one configuration, the transceivers are capable of operating in both FDD (Frequency Division Duplex) and HDD (Hybrid Division Duplex) modes. The unique design of the antenna provides long-range reachability (up to 13 km). In addition to the 24 GHz frequency band, the radio system may also operate at other unlicensed or licensed frequency bands. For example, the radio system may operate at the 5 GHz frequency band. Moreover, the radio system may be configured to operate in various transmission modes. For example, in addition to a MIMO system, it is also possible for the radio system to be configured as a single-input single-output (SISO), SIMO, or MISO system. Similarly, in addition to the FDD mode, the radio system may operation in time-division duplex (TDD) mode or a hybrid of TDD and FDD.

FIG. 1A presents a block diagram illustrating one exemplary architecture of an RF frontend of a radio. In FIG. 1A, the RF frontend 100 includes two identical transmission paths and two identical receiving paths in order to enable 2×2 MIMO.

Each transmission path includes a transmitting antenna, such as antenna 104; a band-pass filter (BPF), such as BPF 106; a power amplifier (PA), such as PA 108; an RF detector, such as RF detector 110; a modulator; and a digital-to-analog converter (DAC), such as DAC 112. In one embodiment, the system uses a quadrature modulation scheme (also known as IQ modulation), and the modulator is an IQ modulator, which includes an IQ filter (such as IQ filter 114, which also works as a pre-amplifier) and an IQ up-converter (such as IQ up-converter 116). In one embodiment, the radio system operates at the unlicensed 24 GHz frequency band, and the IQ up-converters and the PAs are configured to operate at the 24 GHz RF band. Each receiving path includes a receiving antenna, such as antenna 122; a band-pass filter (BPF), such as BPF 124; a low-noise amplifier (LNA), such as LNA 126; a second BPF, such as BPF 128; a demodulator; and an analog-to-digital converter (ADC), such as ADC 130. In one embodiment, the system uses a quadrature modulation scheme (also known as IQ modulation), and the demodulator is an IQ demodulator, which includes an IQ down-converter (such as IQ down-converter 132) and an IQ filter (such as IQ filter 134 with adjustable bandwidth). In one embodiment, the radio system operates at the unlicensed 24 GHz frequency band, and the IQ down-converters and the LNAs are configured to operate at the 24 GHz RF band.

In FIG. 1A, a field-programmable gate array (FPGA) chip 102 provides signal processing capability as well as clock signals to both the transmission and receiving paths. More particularly, FPGA 102 includes a baseband digital signal processor (DSP), which is not shown in the figure. In addition, FPGA 102 provides an input to a DAC 142, which in turn drives a voltage-controlled crystal oscillator (VCXO) 144 to generate a clock signal. For example, VCXO 144 may generate a 50 MHz clock signal. This low-frequency clock signal can be frequency-multiplied by fraction-N synthesizers to higher frequency sinusoidal waves, thus providing sinusoidal signals to the up- and down-converters. In addition, the output of VCXO 144 is sent to a clock distributor 146, which provides clock signals to the DACs, the ADCs, and the IQ filters with adjustable bandwidth.

Also included in FIG. 1A is a GPS (Global-Positioning System) receiver 152 for receiving GPS signals. In some variations the clock signal is derived (or synchronized/initiated with) the GPS signal from a GPS receiver 152.

Figure 1B:
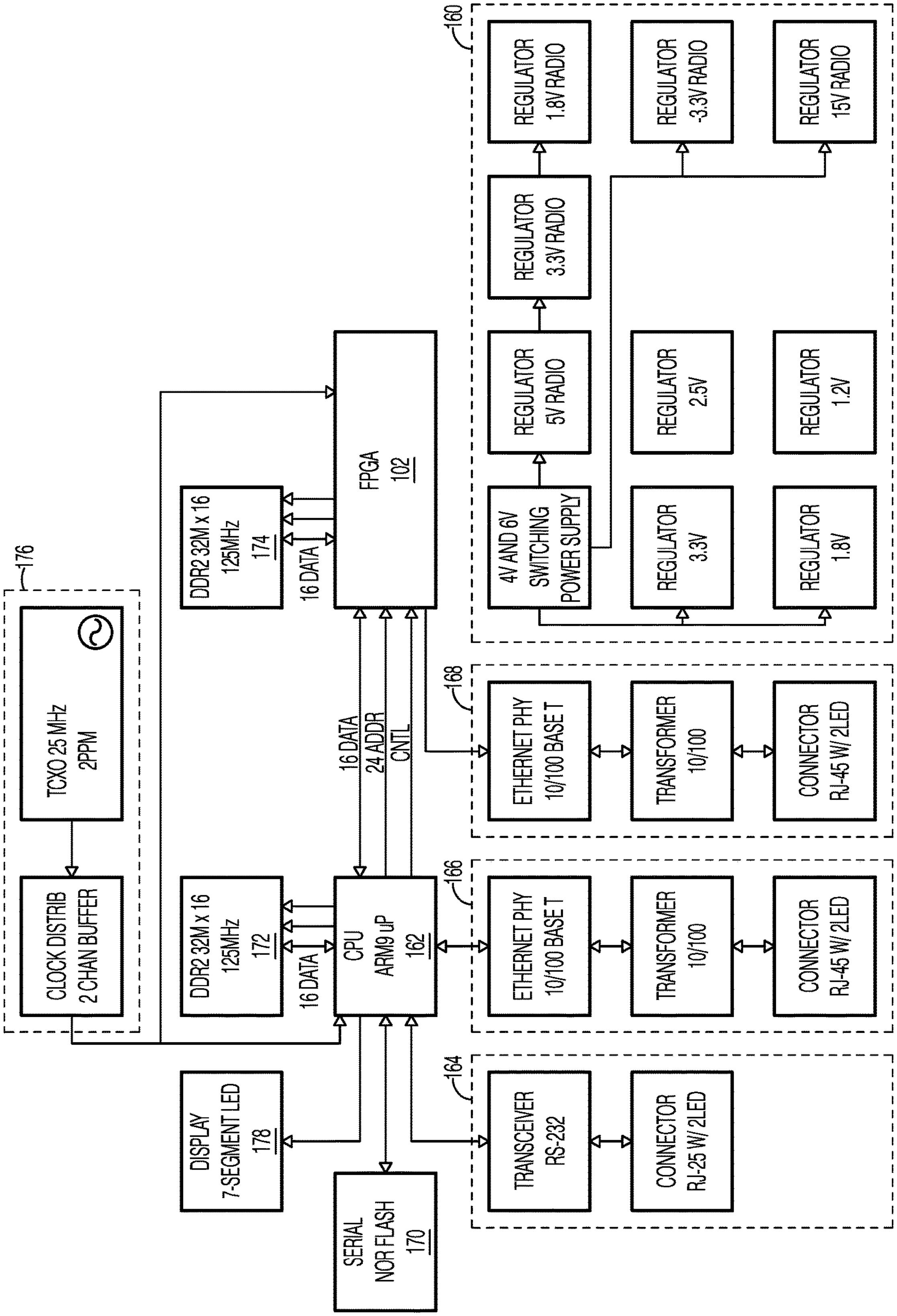
FIG. 1B presents a block diagram illustrating an exemplary architecture of power and control modules of a radio, in accordance with an embodiment of the present invention.

FIG. 1B presents a block diagram illustrating an exemplary architecture of power and control modules of one example of a radio device/system. FIG. 1B includes a power module 160 for providing power to the entire radio system, a CPU 162 for providing control to the radio system, and a number of control and data interfaces.

More specifically, power module 160 includes a power supply and a number of voltage regulators for providing power to the different components in the radio system. CPU 162 may control the operation of the radio system, such as the configurations or operating modes of the systems, by interfacing with FPGA chip 102. For example, the system may operate as a full-duplex system where the transmitter and receiver are running concurrently in time, or a half-duplex system (or may switch between the two or more duplex regimes, as described above). To configure the radio system, a user can access CPU 162 via a serial interface (such as an RS-232 interface 164) or an Ethernet control interface 166. In other words, a user is able to interact with the radio system via the serial interface or the Ethernet control interface. In one embodiment, the serial port is designated for alignments of the antennas. Ethernet data interface 168 is the data port for uploading and downloading data over the point-to-point link. Data to be transmitted over the point-to-point link may be uploaded to FPGA chip 102, which includes the baseband DSP, via Ethernet data interface 168; and data received from the point-to-point link can be downloaded from FPGA 102 via Ethernet data interface 168. Each Ethernet interface includes an Ethernet PHY transceiver, a transformer, and an RJ-45 connector. In one embodiment, the Ethernet PHY transceiver is capable of operating at 10 Mbps and 100 Mbps. Note that each of the interfaces (or ports) may also include status LEDs for indicating the status of each port.

Other components in the radio system may also include a flash memory 170 coupled to CPU 162, a random-access memory (RAM) 172 (such as a DDR2 memory) coupled to CPU 162, a RAM 174 coupled to FPGA 102, a clock source 176 providing clock signals to CPU 162 and FPGA 102, and an LED display 178 with two digits displaying the received signal strength in dBm.

Note that the various components (with the exception of the antennas) for the radio system shown in FIGS. 1A and 1B can be integrated onto a single printed circuit board (PCB). FIGS. 1A and 1B illustrate the architecture of a single radio. To establish a point-to-point link, a pair of radios may be used, one for each node of the link.

In the example shown in FIG. 1A, the modulation scheme used is quadrature modulation, which relies on orthogonally defined in-phase and quadrature signals (or I- and Q-signals). To ensure orthogonality between the I- and Q-signals, the amplitude of the I- and Q-signals should remain equal. However, in practice, a number of factors can affect the amplitude and phase of the I- and Q-signals, thus resulting in a misalignment between these signals. A misalignment in the I- and Q-signals may result in the increased bit error rate of the demodulated signal due to carrier leakage and imperfect sideband cancellation. Therefore, it is desirable to align the I- and Q-signals. Such alignment can result in cancellation of the carrier as well as the sideband signals. In one embodiment of the present invention, the systems/device includes an IQ alignment module that may provide feedback to correct imbalances in phase and quadrature. In some variations, including the system illustrated in FIGS. 1A and 1B, the FPGA 102 generates calibration tones that can be used for IQ alignment purpose.

Figure 1C:
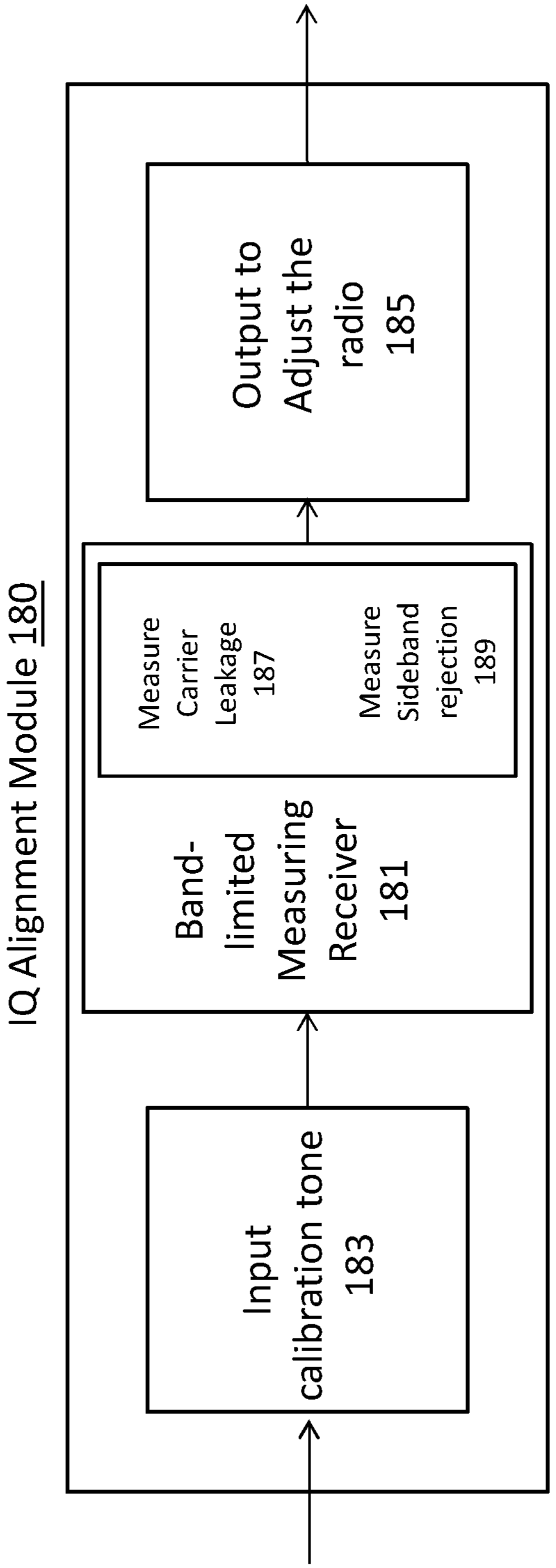
FIG. 1C is a schematic (block) diagram of one variation of an IQ alignment module.

FIG. 1C presents a block diagram illustrating, at a high level, the operation of an IQ alignment module that provides feedback to correct imbalances (alignment) in the in-phase and quadrature signals. In this example, a test tone ("calibration" tone) is entered into the IQ alignment module 183. The IQ alignment module 180 is typically positioned in the radio, e.g., on the transmitter side, after up-converting the signal, e.g., between the up-converter 116 and the power amplified 108. In. FIG. 1A, the RF detector 110 includes the IQ alignment module.

Returning to FIG. 1C, the IQ alignment module receives the calibration tone 183 at the input. In some variations, the same IQ alignment module receives inputs from multiple sources (e.g., transmitters, for transmitter-side alignment). The input may therefore include one or more switches to switch between these inputs. The input tone is passed to a band-limited measuring receiver that filters and amplifies the signal. The measuring receiver 181 may (depending on the calibration tone) determine either carrier leakage or sideband rejection. The IQ alignment module may include logic (e.g., separate from or part of the FPGA) to know when the signal (alignment tone) is appropriate for carrier leakage 187 or for sideband rejection 189. For example, the measuring receiver examines a calibration tone for carrier leakage emitted by the FPGA onto a first transmitter. Next, the measuring receiver examines a calibration tone for sideband rejection from the first transmitter. Next the measuring receiver examines a calibration tone for carrier leakage from the second transmitter. Then the measuring receiver examines a calibration tone for sideband rejection on the second transmitter, and the cycle may repeat. The IQ alignment module may monitor continuously or periodically.

Output from the measuring receiver may then be used as feedback to adjust the radio to correct the alignment of the in-phase and quadrature for the device component being monitored (e.g., each transmitter of the radio). In FIG. 1C, the output is used to adjust, for example, the carrier leakage of a transmitter by applying a DC offset proportional to the input from measuring receiver to the input ports of the IQ modulator for that transmitter; if the adjustment results in increasing the carrier leakage, then during the next cycle the offset may be adjusted in the opposite direction, providing feedback to the baseband inputs to minimize the carrier leakage. Similarly, output from the measuring receiver may be used to provide feedback that the FPGA (or other control circuitry) may use to generate a signal to adjust the phase imbalance on the baseband inputs to minimize sideband rejection.

In some variations the IQ alignment module operates during periods during transmission where signals are not being sent (e.g., transmission of time). In some variations the IQ alignment module operates when transmission is active, or when the system is both active and inactive. The system may generate an OFDM spectrum signal for the calibration tone that is distributed amongst the carriers. To make the radio transmit all these carriers so that any distortion pattern is produced at $f_m$ (e.g., 10.7 MHz). The IQ alignment module then detects the 10.7 MHz signal and looks at the distortion component to generate a digital word for the distortion (either for carrier leakage or for sideband rejection) that goes into the FPGA and can provide a closed-loop feedback to minimize the distortion in the IQ modulator.

Figure 1D:
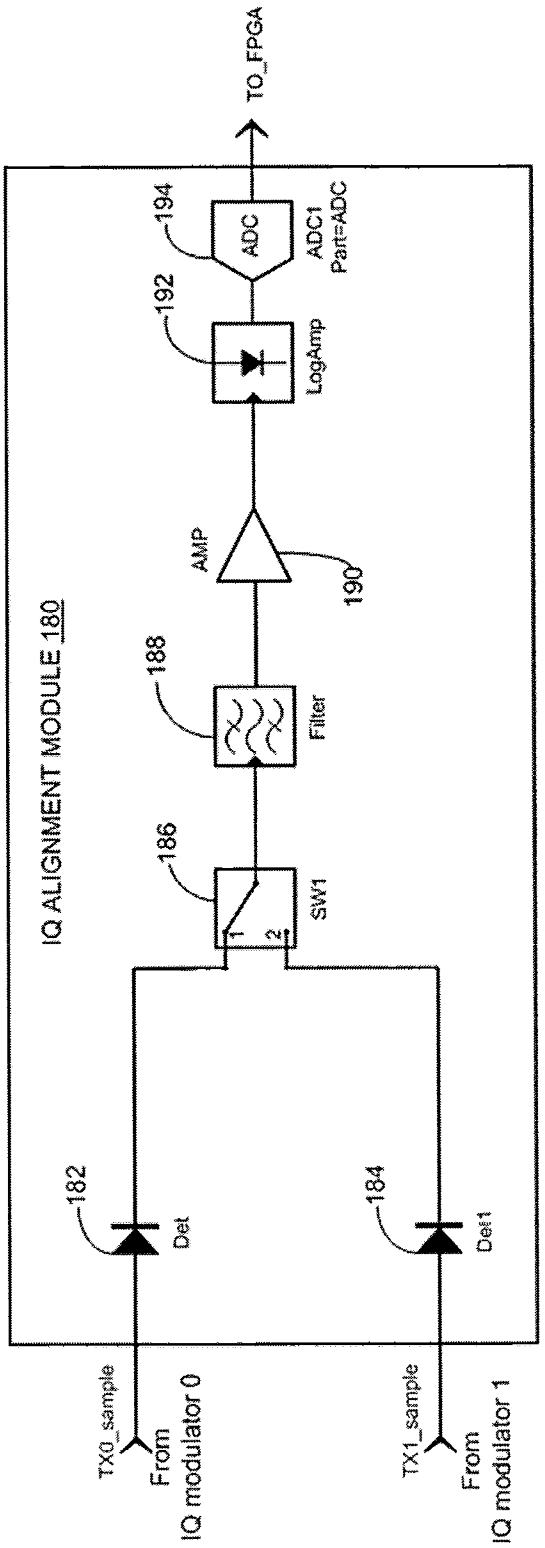
FIG. 1D presents a block diagram illustrating an exemplary architecture of an IQ alignment module, in accordance with an embodiment of the present invention.

FIG. 1D shows an example of an architecture of an IQ alignment module, in accordance with an embodiment of the present invention. IQ alignment module 180 includes two detectors 182 and 184, a switch 186, a filter 188, an amplifier 190, a log amplifier 192, and an ADC 194.

As mentioned, the input to the IQ alignment module 180, such as low-level detectors (detectors 182 and 184), may be placed after the IQ modulators, or the image-reject converters. During operation, the outputs of detectors 182 and 184 are alternately fed (via switch 186) to a band-limited measuring receiver, which includes filter 188, amplifier 190, log amplifier 192, and ADC 194. The selection of the calibration tone frequency determines which transmitter parameter is measured. The combinations of tones sent basically allow detectors 182 and 184 to operate as mixers with one strong tone acting as a local oscillator to convert other tones down to a low frequency that is easy to measure with low cost hardware.

Assuming that filter 188 sets its center frequency, and thus the center frequency of the measuring receiver, to $f_m$ for selecting one tone near $f_m$ only, then one can measure the carrier leakage by measuring the baseband signal. More specifically, in this situation, a baseband tone of $\pm f_m$ ($=f_{RF}\pm f_m$ at the output of the modulator) would produce a tune at $f_m$ in the measuring receiver at a level that is proportional to the amount of carrier leakage. This is because the tone at $f_{RF}\pm f_m$ acts as the local oscillator to mix down the residual carrier that is at the frequency $f_{RF}$. The tone level is measured by ADC 194 and read by an FPGA, such as FPGA 102, for processing. Consequently, self-calibration or adjustment can be made to eliminate the carrier leakage.

In addition to measuring carrier leakage, IQ alignment module 180 can also be configured to measure the rejection to the sideband. To do so, in one variation, a transmitter tone is set at either $+\frac{1}{2} f_m$ or $-\frac{1}{2} f_m$, which can produce a measurable result proportional to the level of undesired sideband. Because the transmitter outputs include signals at $f_{RF}\pm f_m$ (the strong "local oscillator" signal for the detectors) and opposite sideband signal, the power level seen by the measuring receiver at $f_m$ is proportional to the amount of undesired sideband signal present ($f_m$ away from the strong tone centered at $f_{RF}\pm\frac{1}{2} f_m$). Similar to the process of carrier leakage elimination, the sideband rejection measurement can be used for self-calibration or cancellation of the undesired sideband.

In some variations, the specific tones used by the transmitters are the nearest frequency bins already available in the IFFT function of the transmitters. For example, filter 188 sets its center frequency $f_m$ at around 10.7 MHz due to the availability of low-cost filters. This frequency selection also makes implementations of the rest of the receiver straightforward. The calibration tones may be chosen based on this known modulation frequency, $f_m$.

Implementing IQ alignment module 180 to augment the transmitters of the radio system may provide continuous self-correction (or self-calibration) functionality to the transmitters. Unlike other conventional integrated transceivers that perform some sort of corrections when "offline," embodiments of the present invention never go offline when operating in full duplex mode, where transmitters and receivers operate at different frequencies. As a result, this allows for the use of IQ image reject mixers with limited sideband rejection to be applied as quadrature modulators and demodulators. The IQ modulation may therefore effectively use Zero intermediate frequency (ZIF). Note that in addition to allowing parts with modest performance to be used in areas where IQ amplitude and phase balance is critical, this automatic IQ alignment scheme also assures that the radio maintains sufficiently high levels of performance across a wide range of temperatures and signal levels.

Figure 2A:
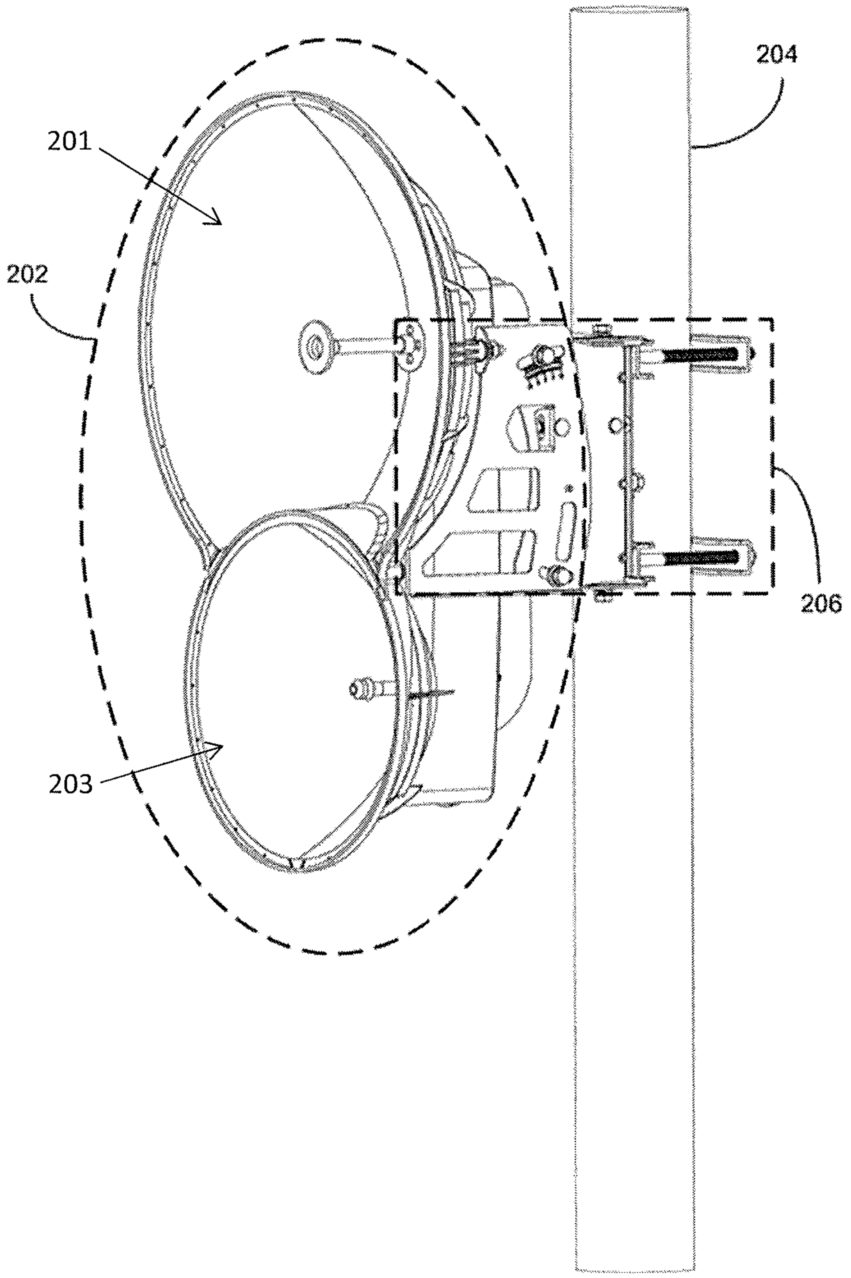
FIG. 2A presents a diagram illustrating an exemplary view of a radio mounted on a pole, in accordance with an embodiment of the present invention.
Figure 2B:
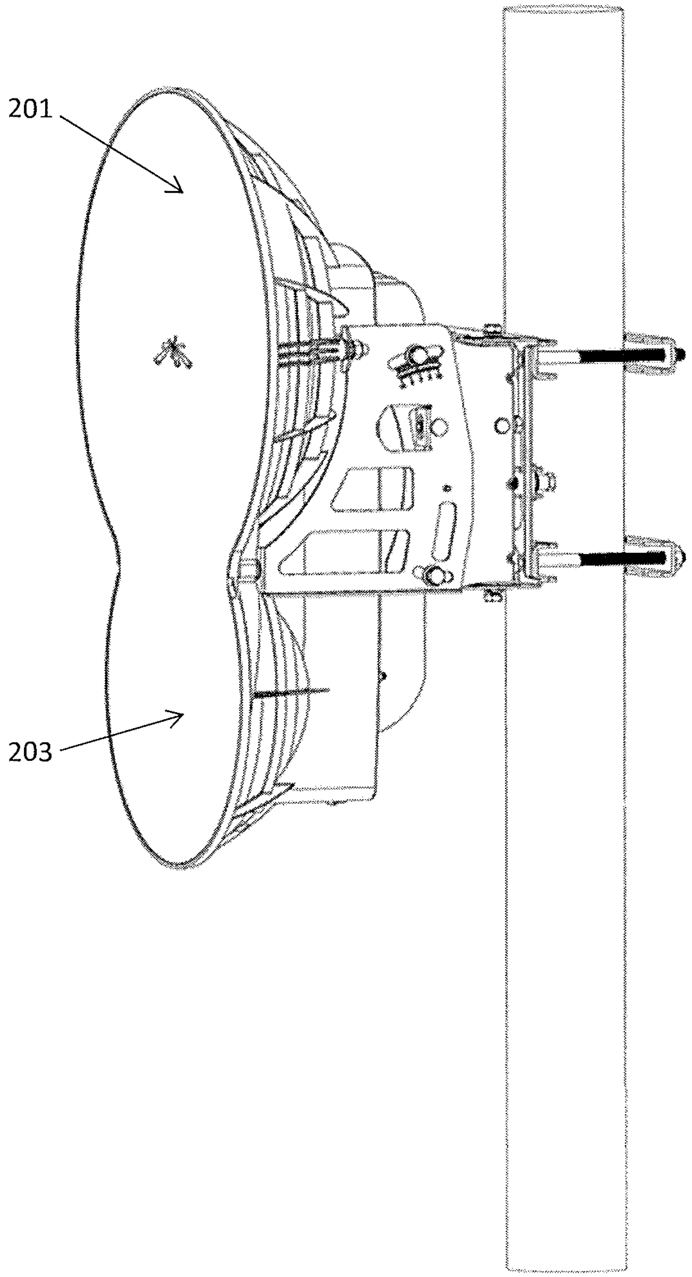
FIG. 2B presents a diagram illustrating an exemplary view of a radio mounted on a pole, in accordance with an embodiment of the present invention.

FIG. 2A presents a diagram illustrating an exemplary view of one variation of a point-to-point radio as described herein mounted on a pole. In FIG. 2A, a radio 202 is mounted to pole 204 via a mounting unit 206. In contrast with other conventional radios where antennas are built as separate units from other radio components, such as tuners and transceivers, various embodiments of the present invention provide an integrated solution where other radio components are housed together with the antenna. From FIG. 2A, one can see that the tuning components, as well as other radio components, are housed together with the antennas 201, 203. In some variations, compact, highly efficient form factor of the radio system and the utilization of the worldwide license-free 24 GHz band may provide cost-effective and instant deployment of the radio system anywhere in the world. FIG. 2B presents a diagram illustrating an exemplary view of a radio mounted on a pole, in accordance with an embodiment of the present invention. In FIG. 2B, a radome is used to cover the antenna surface, thus protecting the antenna from hazardous weather.

Figure 3B:
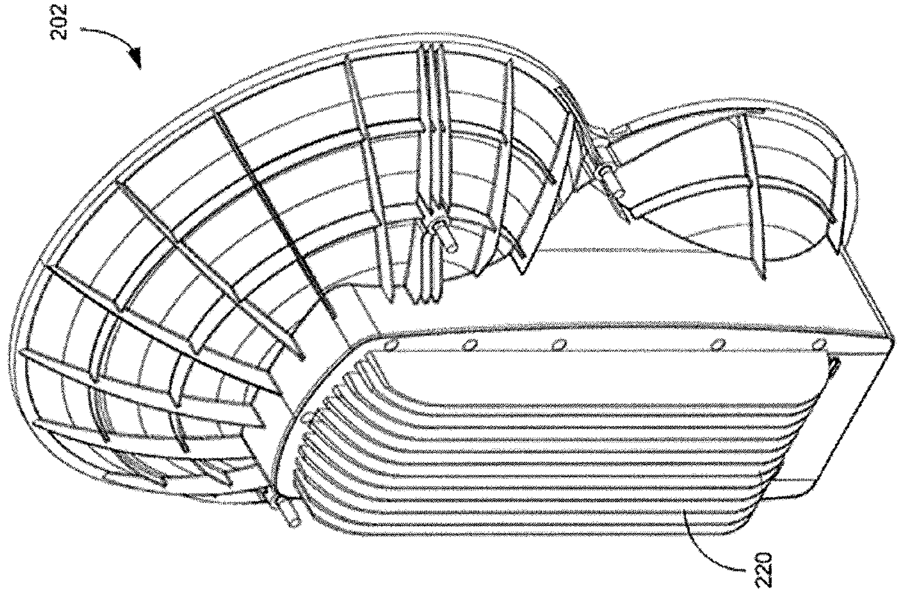
FIG. 3B presents an exemplary view of a radio showing the backside of the radio, in accordance with an embodiment of the present invention.
Figure 3A:
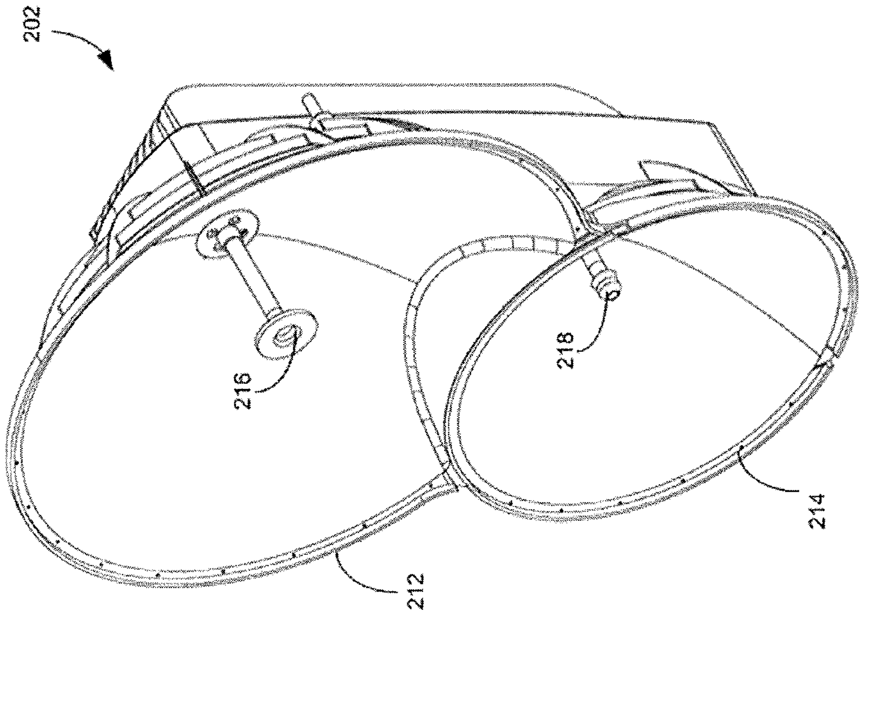
FIG. 3A presents an exemplary view of a radio showing the front side of the radio, in accordance with an embodiment of the present invention.

FIG. 3A presents an exemplary view of a radio showing the front side of the radio, in accordance with an embodiment of the present invention. From FIG. 3A, one can see that the front side of radio 200 includes two circular shaped reflectors, an upper reflector 212 and a lower reflector 214; and two feed antennas, an upper feed antenna 216 and a lower feed antenna 218. In one embodiment, upper feed antenna 216 is coupled to the receiver of the radio, whereas lower feed antenna 218 is coupled to the transmitter of the radio. The reflecting surfaces of the reflectors are carefully designed to ensure long-range reachability. In one embodiment, reflectors 212 and 214 are parabolic reflectors. We will describe the reflectors in more detail later.

FIG. 3B presents an exemplary view of a radio showing the backside of the radio, in accordance with an embodiment of the present invention. From FIG. 3B, one can see that the backside of radio 200 includes a substantially rectangular enclosure 220, which houses a PCB. This rectangular enclosure includes ribs or struts extending vertically/horizontally; these struts/ribs may provide added stiffness to the housing. Note that the rest of the radio components, including the CPU, the FPGA, the transmitters, the receivers, etc., can all be mounted to the single PCB.

Figure 3C:
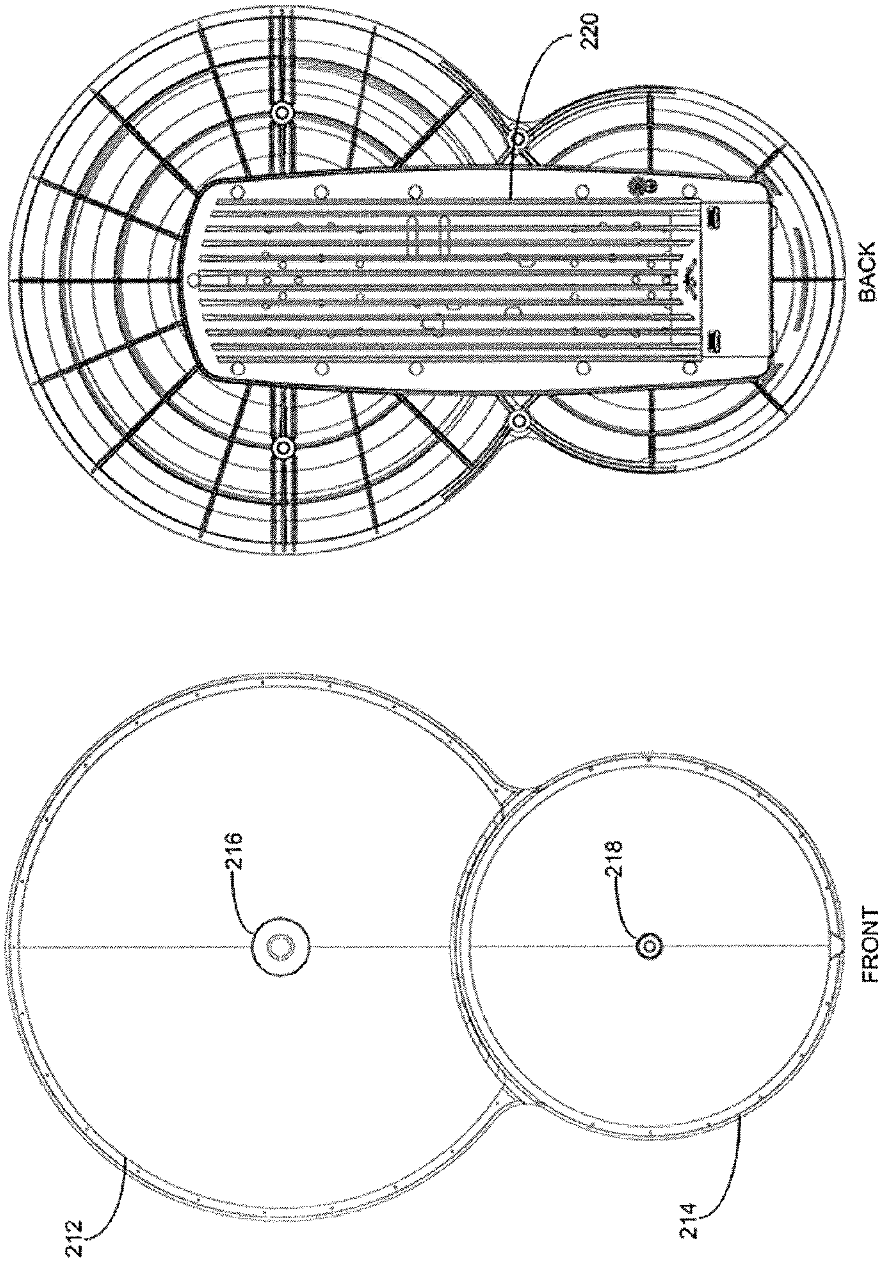
FIG. 3C presents the front view and the back view of the radio, in accordance with an embodiment of the present invention.

FIG. 3C presents the front view and the back view of the radio, in accordance with an embodiment of the present invention. From FIG. 3C, one can see that the two reflectors together are shaped like an upside-down 8, with upper reflector 212 being a partial circle and having a larger radius than lower reflector 214, which is a full circle. In addition, one can see that rectangular enclosure 220 is attached to the backside of the two reflectors. Note that the proximity of the reflectors to the PCB housed in enclosure 220 not only ensures a compact radio system, but also eliminates the need for an external cable to connect the reflector to other radio components, thus obviating the need for tuning the transmitter antennas.

Figure 3D:
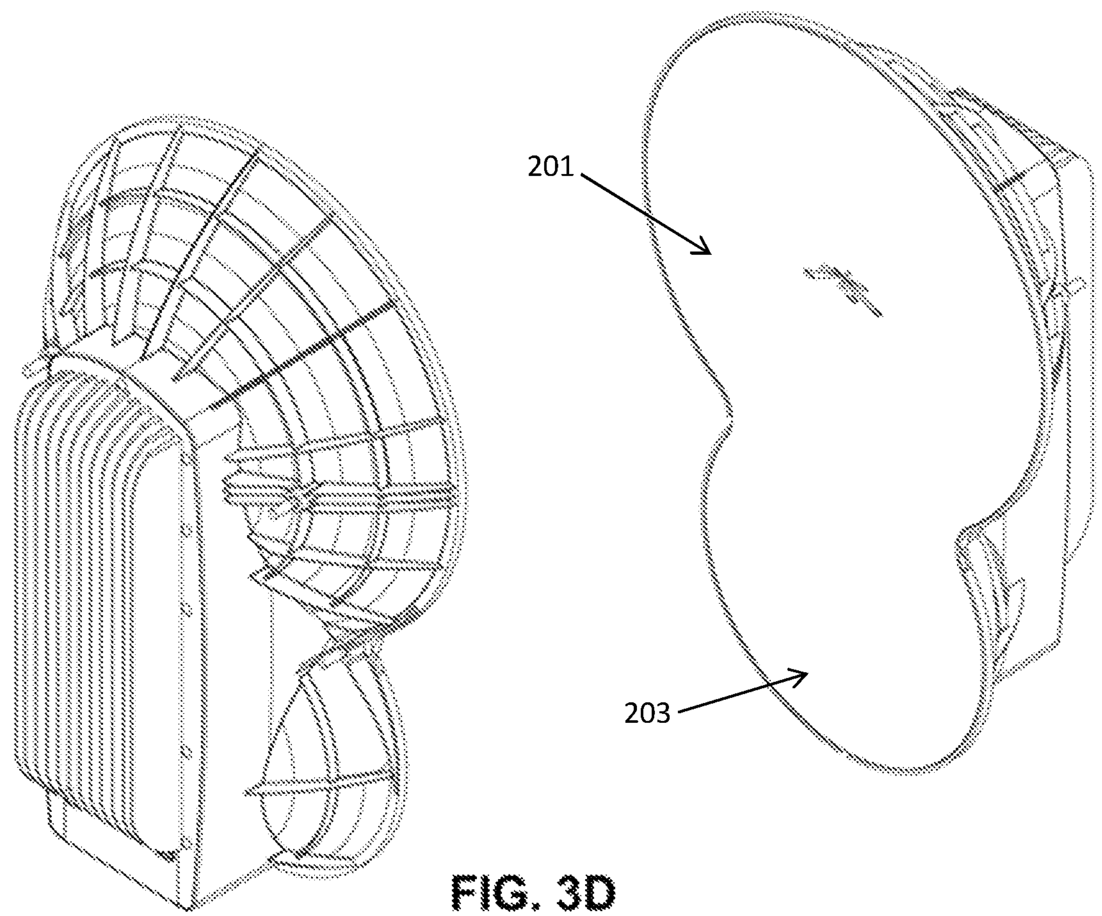
FIG. 3D presents exemplary views of the radio with the radome cover on, showing the front and backside of the radio, in accordance with an embodiment of the present invention.
Figure 3E:
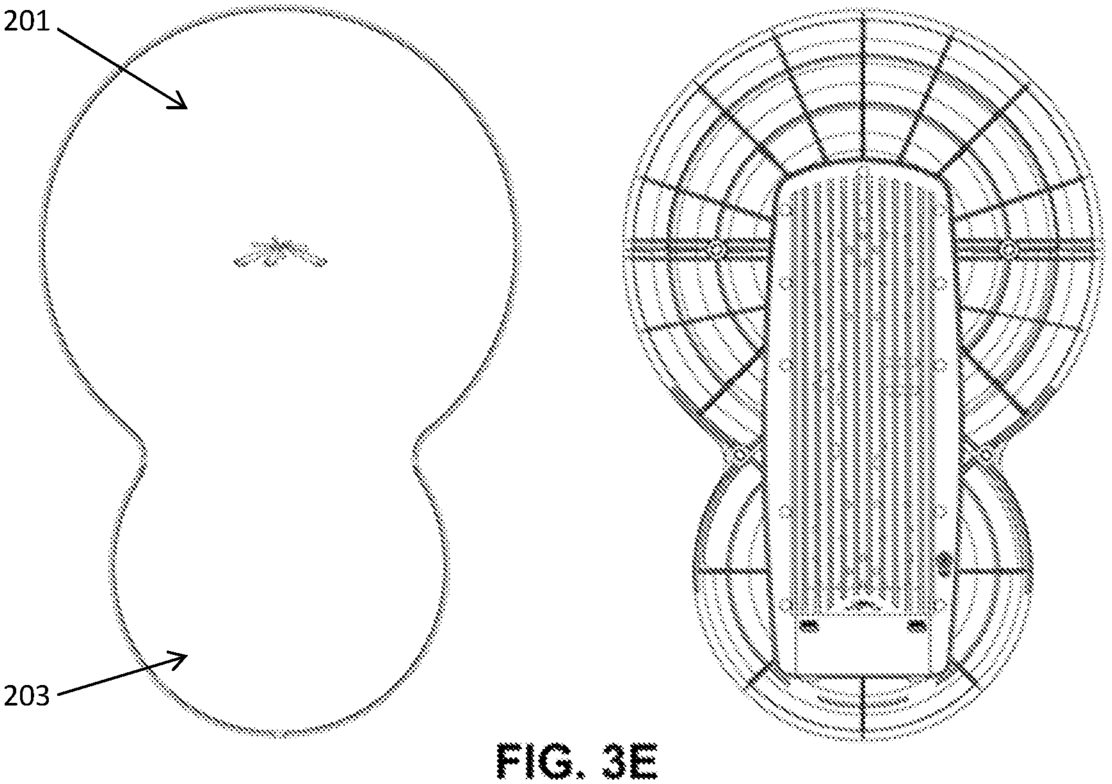
FIG. 3E presents the front view and the back view of the radio with the radome cover on, in accordance with an embodiment of the present invention.

FIG. 3D presents exemplary views of the radio with the radome cover on, showing the front and backside of the radio, in accordance with an embodiment of the present invention. FIG. 3E presents the front view and the back view of the radio with the radome cover on, in accordance with an embodiment of the present invention.

Figure 4A:
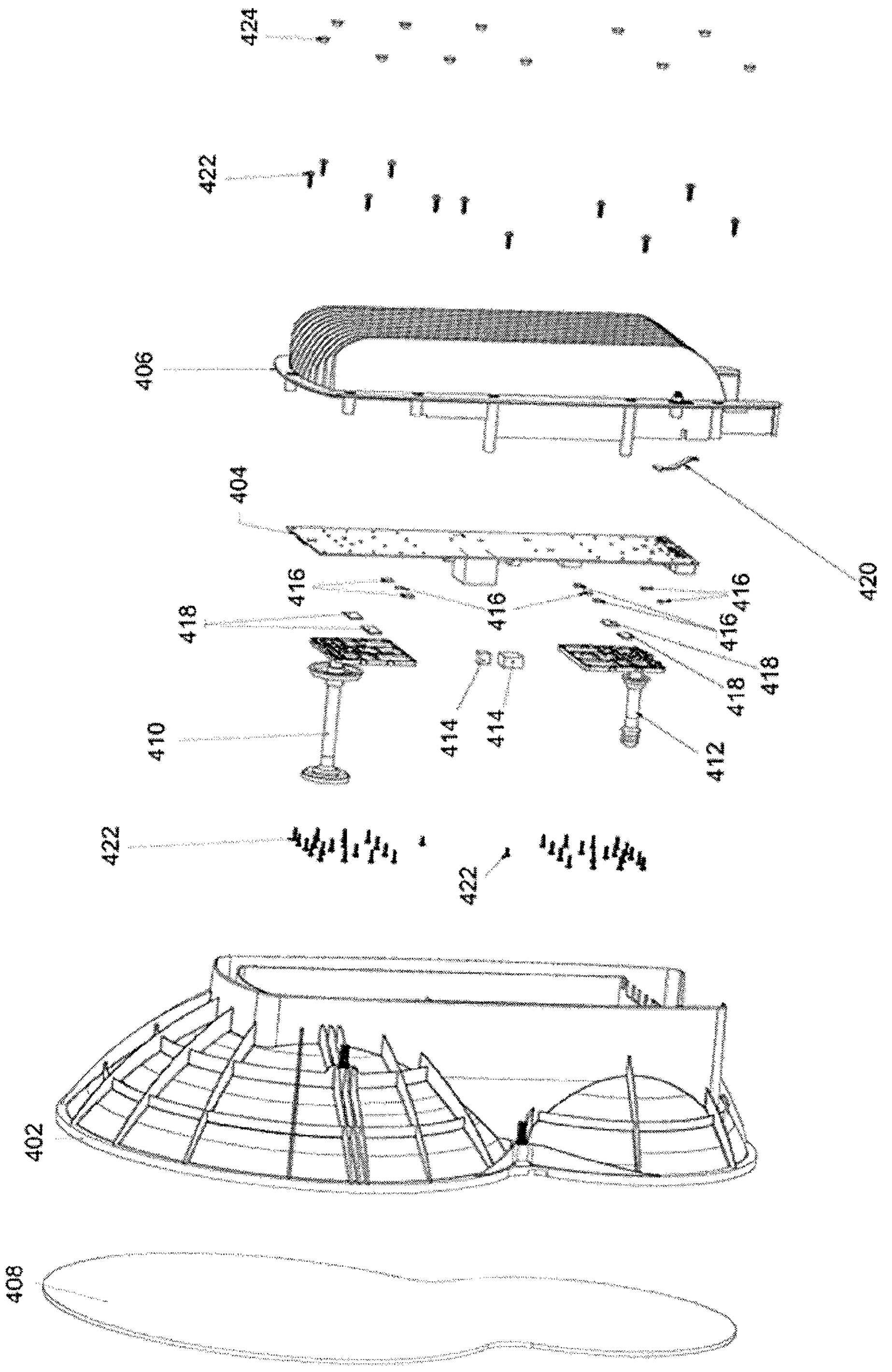
FIG. 4A presents a diagram illustrating an exemplary exploded view of the radio assembly, in accordance with an embodiment of the present invention.

FIG. 4A presents a diagram illustrating an exemplary exploded view of the radio assembly, in accordance with an embodiment of the present invention. In FIG. 4A, radio 400 includes a number of major components as well as a number of auxiliary or connecting components. More specifically, the major components include a reflecting housing 402, a PCB 404, and a backside cover 406. Reflecting housing 402 includes a front portion that houses and supports the reflectors for the antenna and a back portion that together with backside cover 406 provides a housing space for PCB 404. PCB 404 includes most radio components, such as the CPU, the FPGA, the transmitter, and the receiver. Backside cover 406 covers the backside of the radio. More specifically, backside cover 406 includes a hollowed space that snugly fits PCB 404. In addition, the fins on backside cover 406 improve dissipation of heat generated by the radio.

The auxiliary components include a radome cover 408 for protecting the antenna from weather damage; an upper feed-shield subassembly 410 for shielding a feed antenna to the upper reflector; a lower feed-shield subassembly 412 for shielding a feed antenna to the lower reflector; heat sinks 414 for dissipating heat from components on PCB 404; thermal pads 416; microwave absorbers 418; a strap 420 for an RJ-45 connector; a number of screws 422 for coupling together reflecting housing 402, PCB 404, and backside cover 406; and a number of screw covers 424.

Figure 4C:
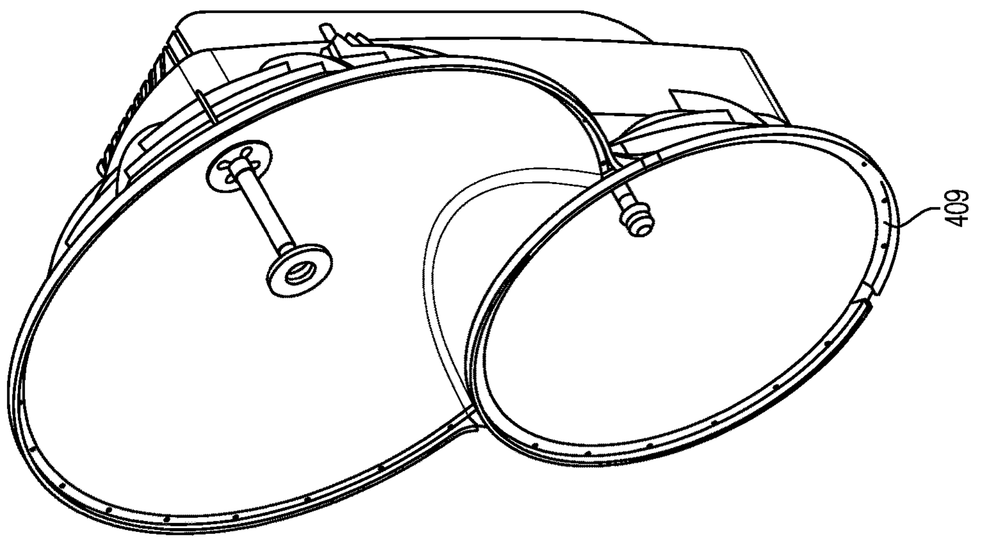
FIG. 4C presents a diagram illustrating where to apply the sealant for the radome, in accordance with an embodiment of the present invention.
Figure 4B:
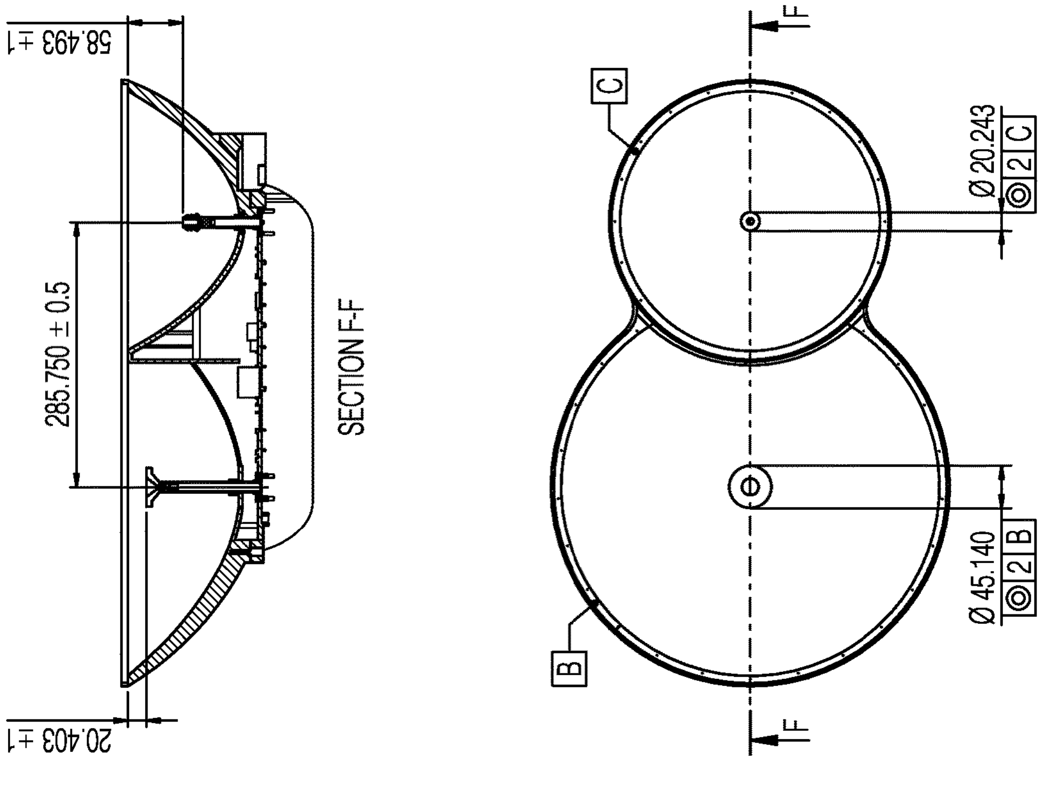
FIG. 4B presents a diagram illustrating the cross-sectional view of the assembled radio, in accordance with an embodiment of the present invention.

FIG. 4B presents a diagram illustrating the cross-sectional view of the assembled radio, in accordance with an embodiment of the present invention. The length unit used in the drawings is millimeters. The upper drawing shows the cross section of the radio system and the bottom drawing shows the front view of the assembled radio and the cutting plane (along line FF). FIG. 4C presents a diagram illustrating where to apply 409 the sealant for the radome, in accordance with an embodiment of the present invention. As described in greater detail below, this rim or ridge surrounding the reflectors (both transmit and receive reflectors) may also act as an isolation barrier in addition to acting as a channel for the sealant. In FIG. 4C, along the rims of the front surface of the reflecting housing, a narrow region is marked with hatched lines; the sealant needs to stay within the hatched region before and after the radome is seated and should not intrude into un-hatched regions. In another words, only a thin layer of sealant material should be applied before the radome is installed to prevent the sealant material from overflowing to the un-hatched region.

Figure 5:
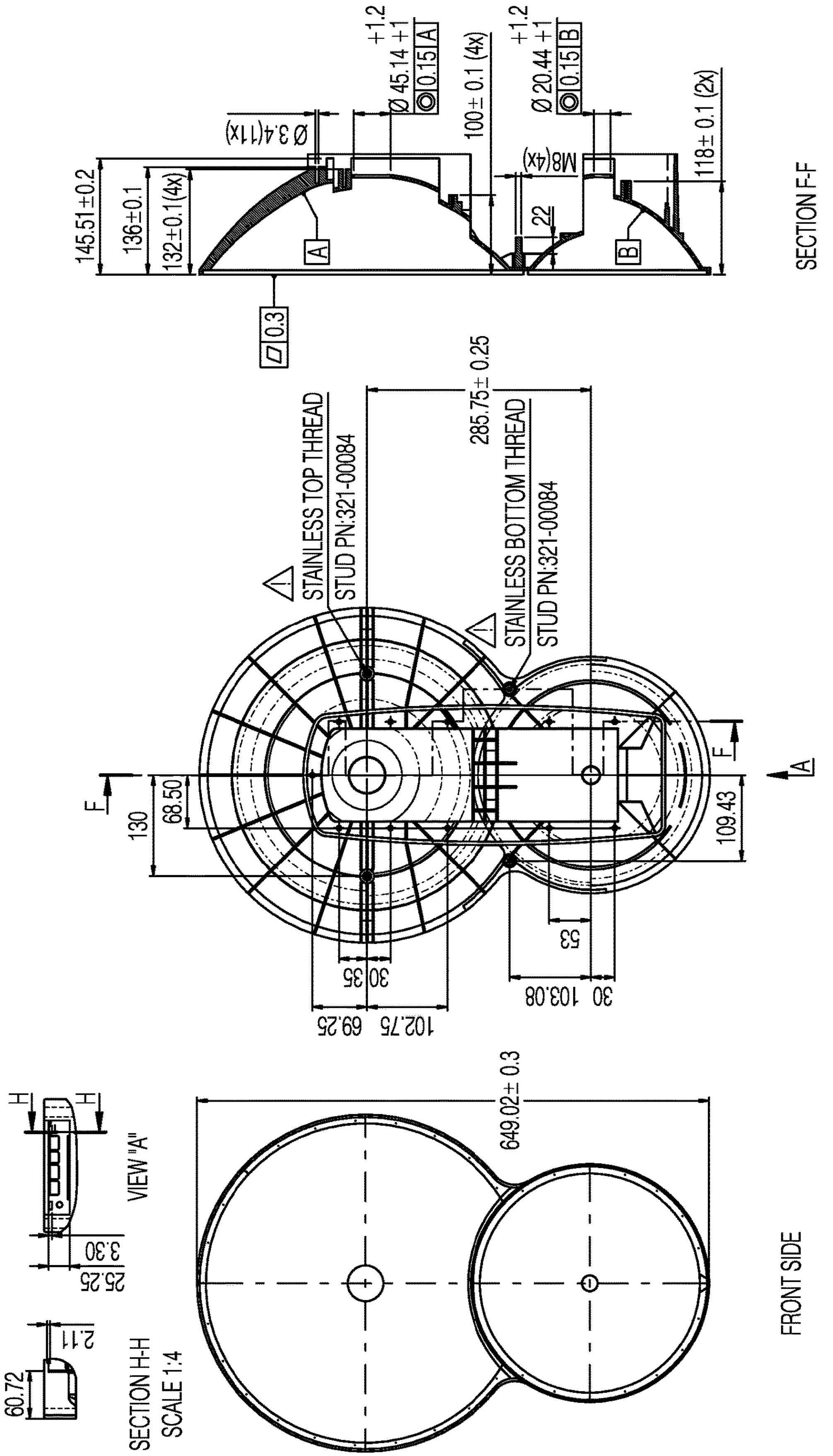
FIG. 5 illustrates a detailed mechanical drawing of the reflecting housing, in accordance with an embodiment of the present invention.

FIG. 5 illustrates a detailed mechanical drawing of the reflecting housing, in accordance with an embodiment of the present invention. More specifically, FIG. 5 provides exemplary dimensions of the reflecting housing. In the example shown in FIG. 5, all lengths are expressed in millimeters. For example, the vertical length of the radio system, or the sum of diameters of the upper and lower reflectors, is around 650 mm. Note that such a compact size makes installation of the radio much easier than many of the conventional radio systems. Note that the radios are installed outdoors, and thus a weatherproof material is needed for making the reflecting housing. In one embodiment, a hard plastic material, such as polycarbonate (PC), is used for making the reflecting housing. To form the reflectors, a metal layer can be deposited on the front concave surface of the reflecting housing. In one embodiment, a layer of aluminum (Al) is deposited using a physical vapor deposition (PVD) technique. In a further embodiment, before the PVD of the Al layer, the reflecting area is polished. For example, a diamond polishing process that meets the SPI (Society of the Plastic Industry) A-1 standard can be performed before the deposition of the metal layer.

Figure 6B:
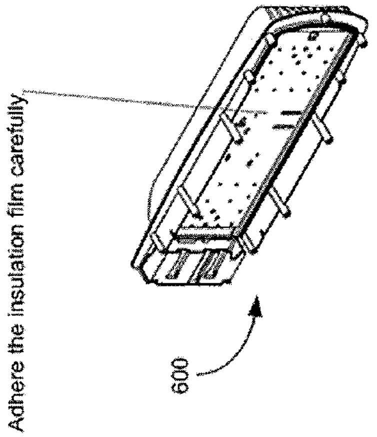
FIG. 6B presents a diagram illustrating an exemplary view of the assembled backside cover subassembly, in accordance with an embodiment of the present invention.
Figure 6A:
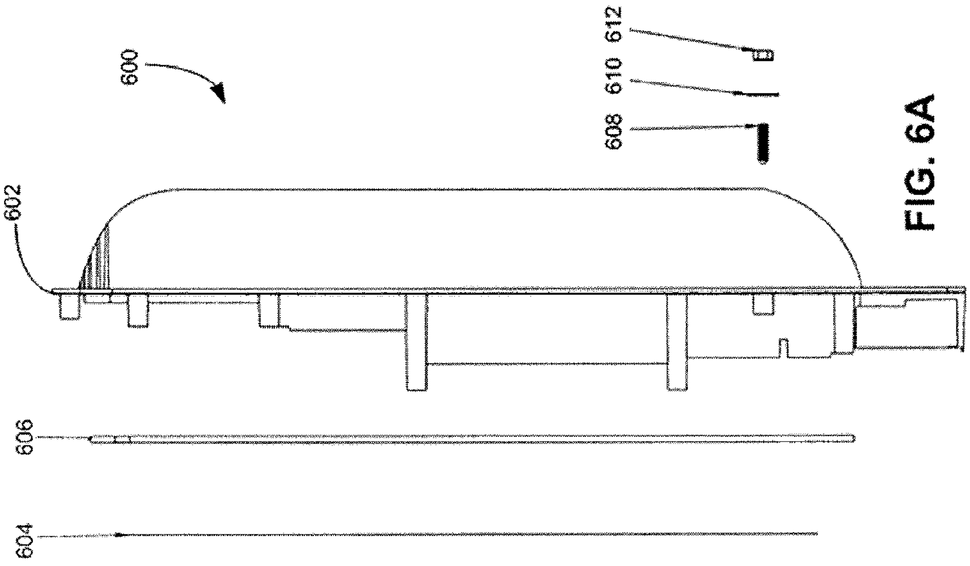
FIG. 6A presents a diagram illustrating an exemplary exploded view of the backside cover subassembly, in accordance with an embodiment of the present invention.

FIG. 6A presents a diagram illustrating an exemplary exploded view of the backside cover subassembly, in accordance with an embodiment of the present invention. In FIG. 6A, a backside cover subassembly 600 includes a rear lid 602, an insulation film 604, an o-ring seal 606, a setscrew 608, a washer 610, and a nut 612. More specifically, rear lid 602 covers the backside of the radio system. In one embodiment, a material that is similar to the one used for the reflecting housing can be used to make rear lid 602. For example, rear lid 602 can also be fabricated using PC. Insulation film 604 and o-ring seal 606 provide electrical insulation as well as waterproofing capability, thus preventing damages caused by weather or other factors to the radio components. Various insulation materials can be used as insulation film 604. In one embodiment, insulation film 604 includes a Kapton® (registered trademark of DuPont of Wilmington, Del.) film. FIG. 6B presents a diagram illustrating an exemplary view of the assembled backside cover subassembly, in accordance with an embodiment of the present invention. In FIG. 6B, the insulation film and the o-ring have been applied to the inside of the rear lid. Note that the insulation film should be adhered carefully on the inside of the rear lid and no bubbles should be formed.

Figure 6C:
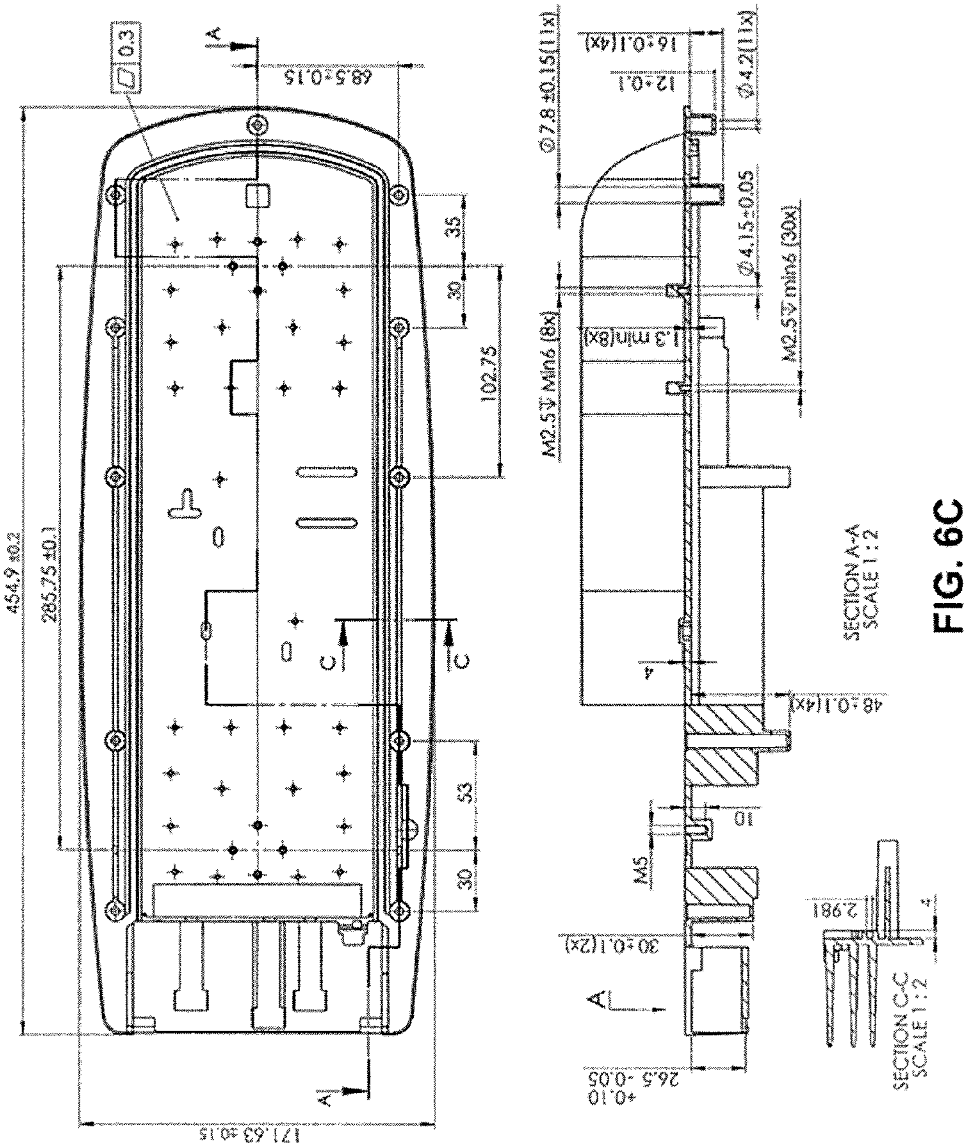
FIG. 6C presents a diagram illustrating a front view and cross-sectional views of the rear lid, in accordance with an embodiment of the present invention.

FIG. 6C presents a diagram illustrating a front view and cross-sectional views of the rear lid, in accordance with an embodiment of the present invention. More specifically, the top drawing shows the front view of the rear lid, the middle drawing shows a cross-sectional view of the rear lid across the cutting plane AA, and the bottom drawing shows a partial-sectional view of the rear lid across the cutting plane CC. From the sectional views, one can see more details, including the shape and dimensions of the heat dissipation fins on the backside of the rear lid.

Figure 6D:
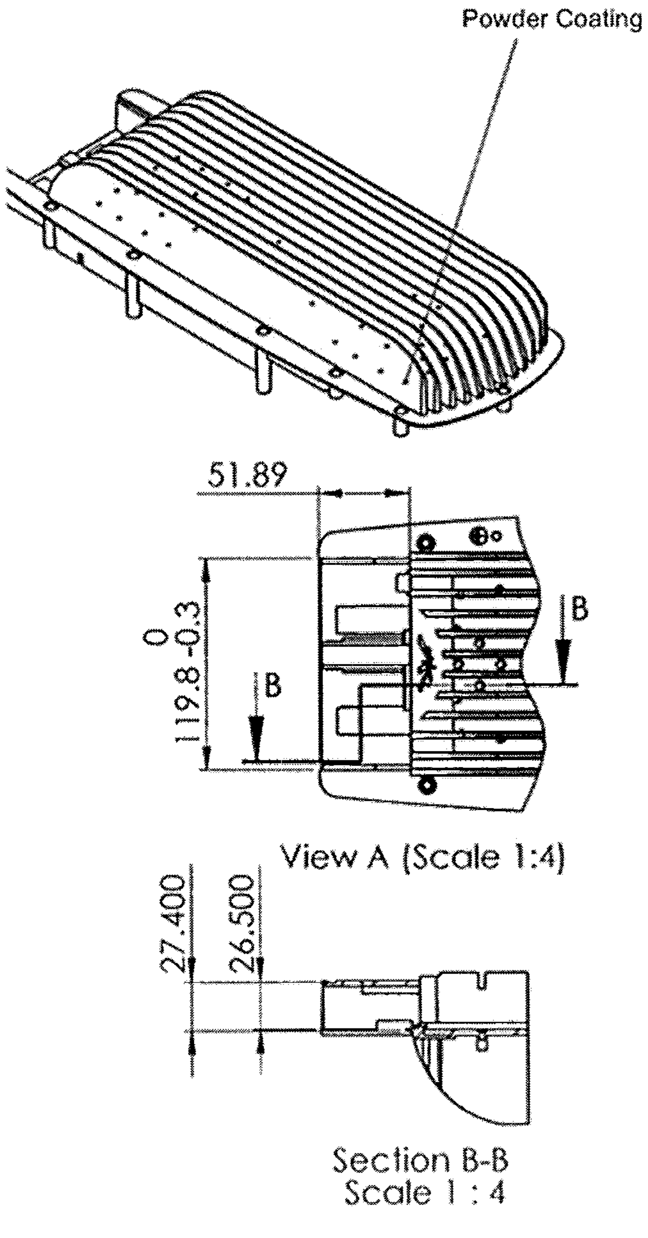
FIG. 6D illustrates the backside of the rear lid in more detail, in accordance with an embodiment of the present invention.

FIG. 6D illustrates the backside of the rear lid in more detail, in accordance with an embodiment of the present invention. The top drawing shows the entire backside from an angle. The middle drawing shows a portion of the backside viewed from the top. The bottom drawing shows a partial-sectional view of the rear lid across a cutting plane BB.

Figure 7A:
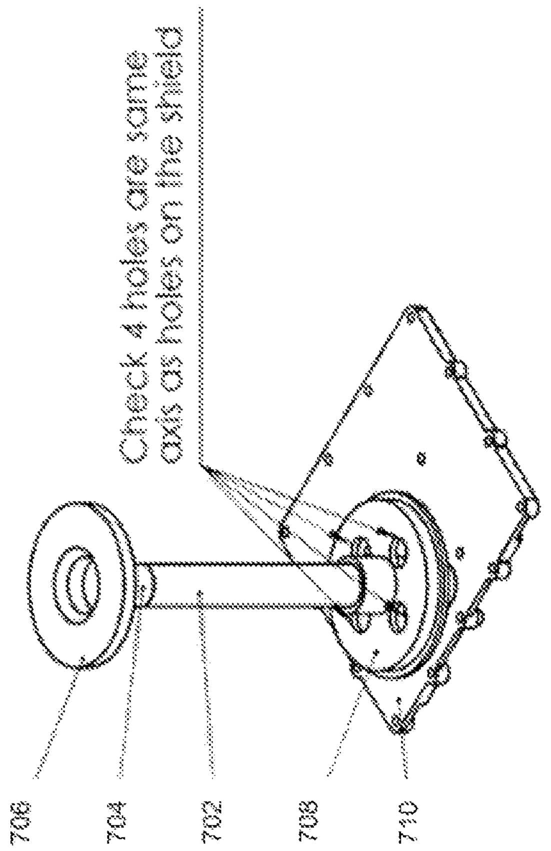
FIG. 7A presents a diagram illustrating an exemplary view of the upper feed-shield subassembly, in accordance with an embodiment of the present invention.

FIG. 7A presents a diagram illustrating an exemplary view of the upper feed-shield subassembly, in accordance with an embodiment of the present invention. In FIG. 7A, upper feed-shield subassembly 700 includes a waveguide tube 702, a spacer 704, a sub-reflector 706, a flange 708, and an RF shield 710. Waveguide tube 702 houses the waveguide of the feed antenna to the upper reflector of the radio antenna. Spacer 704 separates the waveguide and sub-reflector 706; sub-reflector 706 reflects the RF waves to the upper reflector. Flange 708 and the holes on it enable upper feed-shield subassembly 700 to be physically secured to other underlying structures.

Figure 7B:
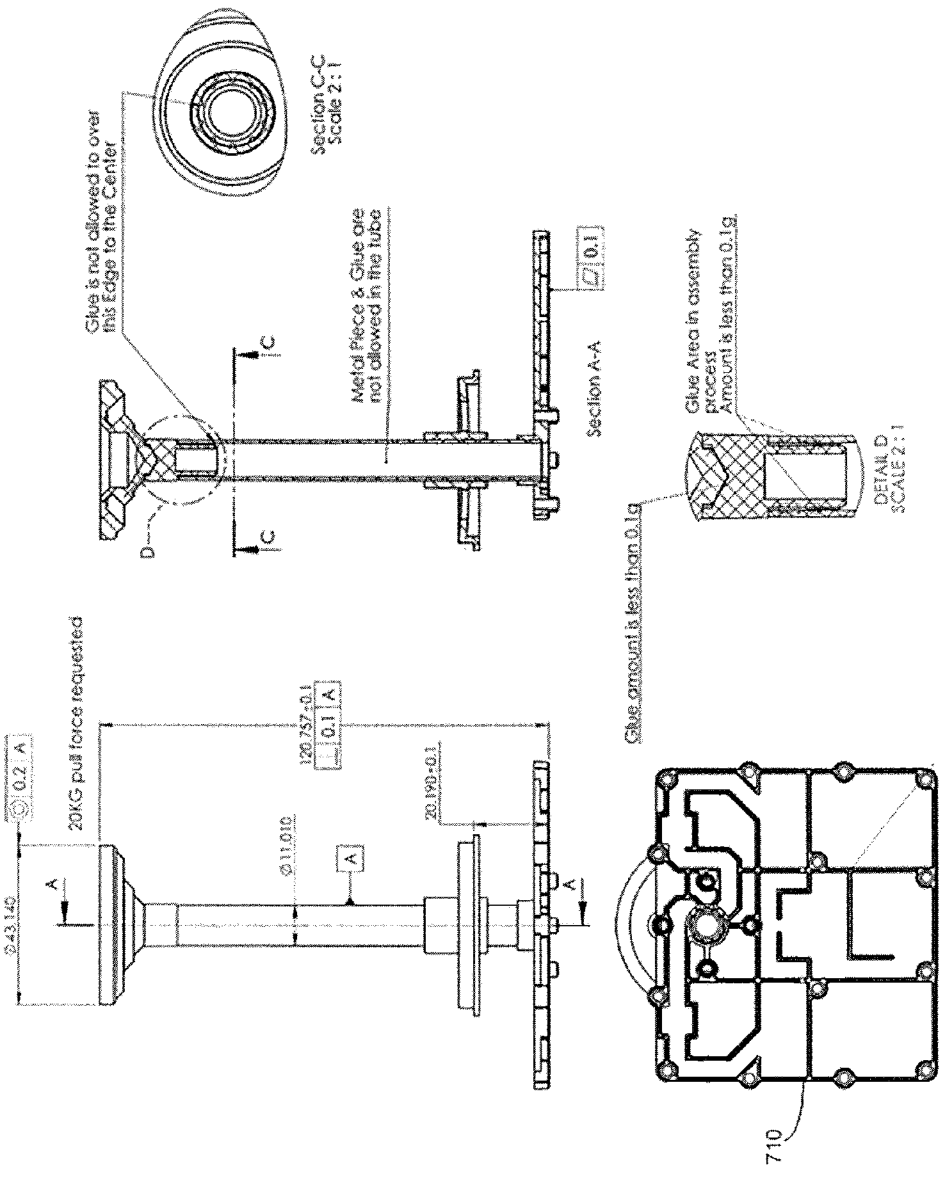
FIG. 7B presents detailed mechanical drawings for the upper feed-shield subassembly, in accordance with an embodiment of the present invention.

FIG. 7B presents detailed mechanical drawings for the upper feed-shield subassembly, in accordance with an embodiment of the present invention. The upper left drawing shows the front view of the upper feed-shield subassembly. The upper right drawing shows a cross-sectional view of the upper feed-shield subassembly along a vertical cutting plane AA and a horizontal cutting plane CC. The lower left drawing shows the bottom view of the upper feed-shield subassembly, illustrating in detail the bottom of RF shield 710. Note that the ridges on RF shield 710 provide space for components on the underlying FPGA board. The lower right drawing is a detailed drawing of a section where glue is applied to attach the sub-reflector to the spacer and the waveguide tube.

Figure 8A:
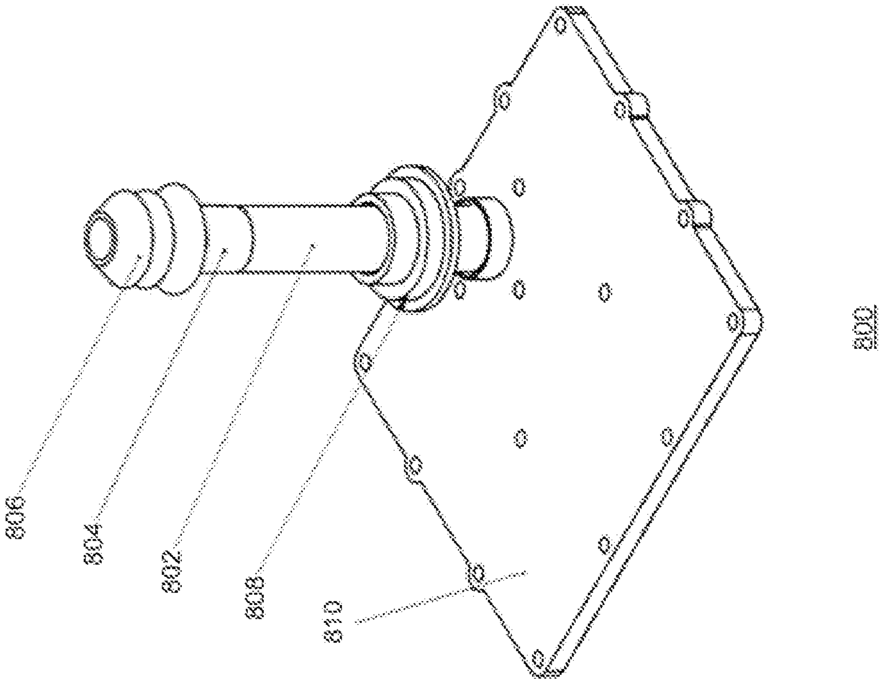
FIG. 8A presents a diagram illustrating an exemplary view of the lower feed-shield subassembly, in accordance with an embodiment of the present invention.

FIG. 8A presents a diagram illustrating an exemplary view of the lower feed-shield subassembly, in accordance with an embodiment of the present invention. In FIG. 8A, lower feed-shield subassembly 800 includes a waveguide tube 802, a spacer 804, a sub-reflector 806, a flange 808, and an RF shield 810. Waveguide tube 802 houses the waveguide of the feed antenna to the lower reflector of the radio antenna. Spacer 804 separates the waveguide and sub-reflector 806; sub-reflector 806 reflects the RF waves to the lower reflector. Flange 808 and the holes on it enable lower feed-shield subassembly 800 to be physically secured to other underlying structures.

Figure 8B:
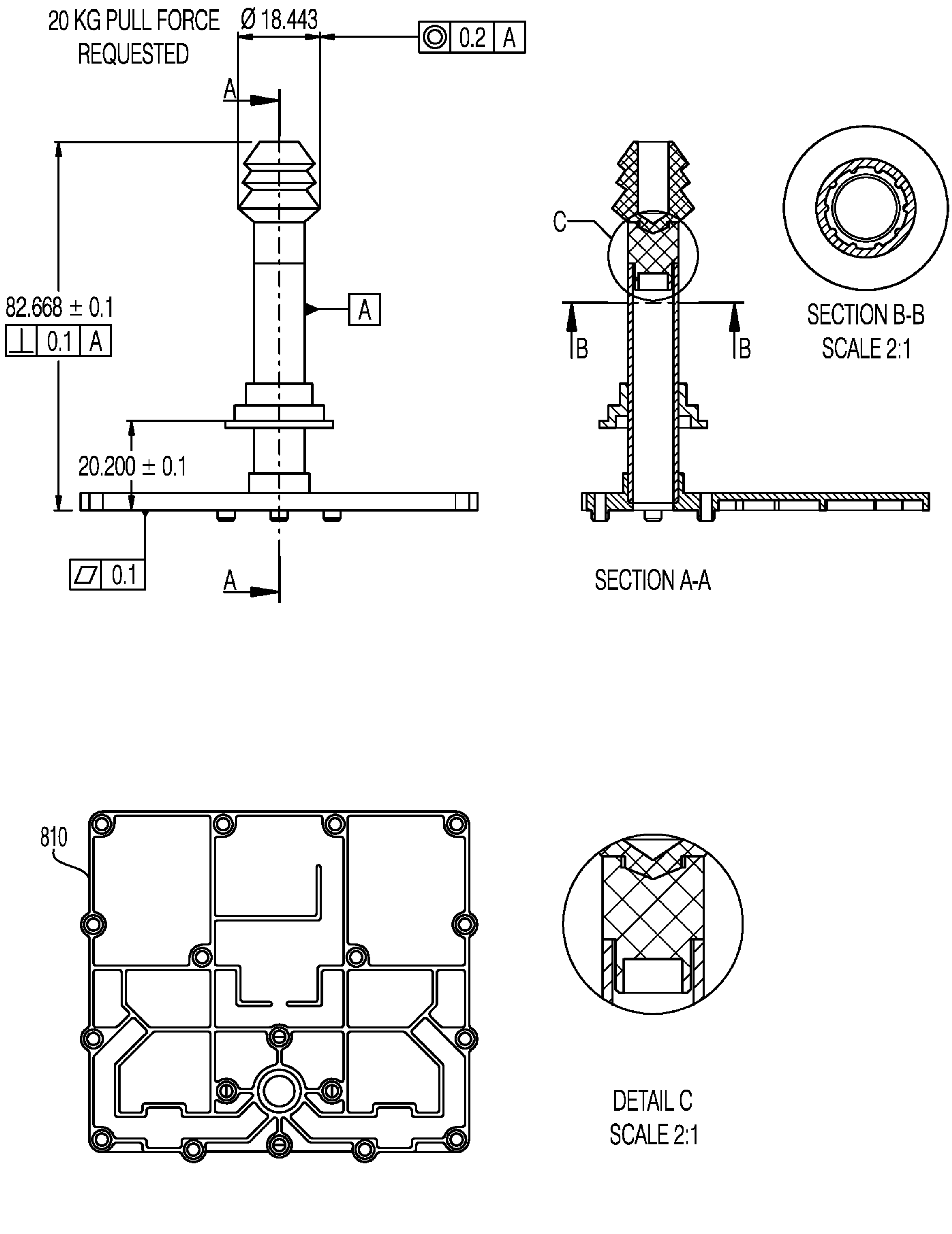
FIG. 8B presents detailed mechanical drawings for the lower feed-shield subassembly, in accordance with an embodiment of the present invention.

FIG. 8B presents detailed mechanical drawings for the lower feed-shield subassembly, in accordance with an embodiment of the present invention. The upper left drawing shows the front view of the lower feed-shield subassembly. The upper right drawing shows a cross-sectional view of the lower feed-shield subassembly along a vertical cutting plane AA and a horizontal cutting plane BB. The lower left drawing shows the bottom view of the lower feed-shield subassembly, illustrating in detail the bottom of RF shield 810. Note that the ridges on RF shield 810 provide space for components on the underlying FPGA board. The lower right drawing is a detailed drawing of a section where glue is applied to attach the sub-reflector to the spacer and the waveguide tube.

Recall the previously shown FIGS. 2A and 2B where the radio is mounted on a pole via a mounting unit. The mounting unit not only secures the radio to the pole, but also enables easy and accurate alignment of the antenna reflectors, which is important to ensure the best performance of the link. In general, the mounting unit includes a pole-mounting bracket and a radio-mounting bracket. The pole-mounting bracket is mounted to a pole, which can be located on a rooftop or any other elevated location in order to ensure a clear line of sight between paired radios. Moreover, the mounting location should have a clear view of the sky to ensure proper GPS operation. For safety, the mounting point should be at least one meter below the highest point on the structure, or if on a tower, at least three meters below the top of the tower. The radio-mounting bracket is mounted to the backside of the radio, and is coupled to the pole-mounting bracket.

Figure 9A:
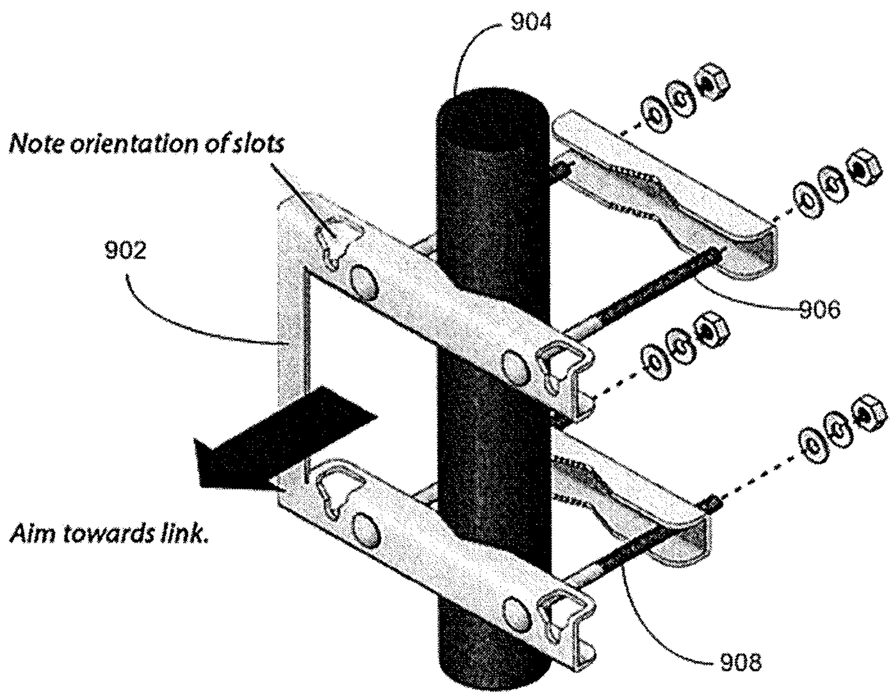
FIG. 9A presents the assembly view of the pole-mounting bracket mounted on a pole, in accordance with an embodiment of the present invention.

FIG. 9A presents the assembly view of the pole-mounting bracket mounted on a pole, in accordance with an embodiment of the present invention. In FIG. 9A, pole mounting bracket 902 is mounted onto a pole 904 using a number of bolts, such as bolts 906 and 908. Pole-mounting bracket 902 can be configured to fit poles of various sizes. In one embodiment, pole-mounting bracket 902 accommodates poles with diameters between 2 and 4 inches. The arrow in the figure indicates the direction in which the radio antenna faces, that is the direction to the other radio. Note that while aligning the antenna, a user may adjust the position of the antenna by adjusting the position (including elevation and direction) of pole-mounting bracket 902 on pole 904.

Figure 9B:
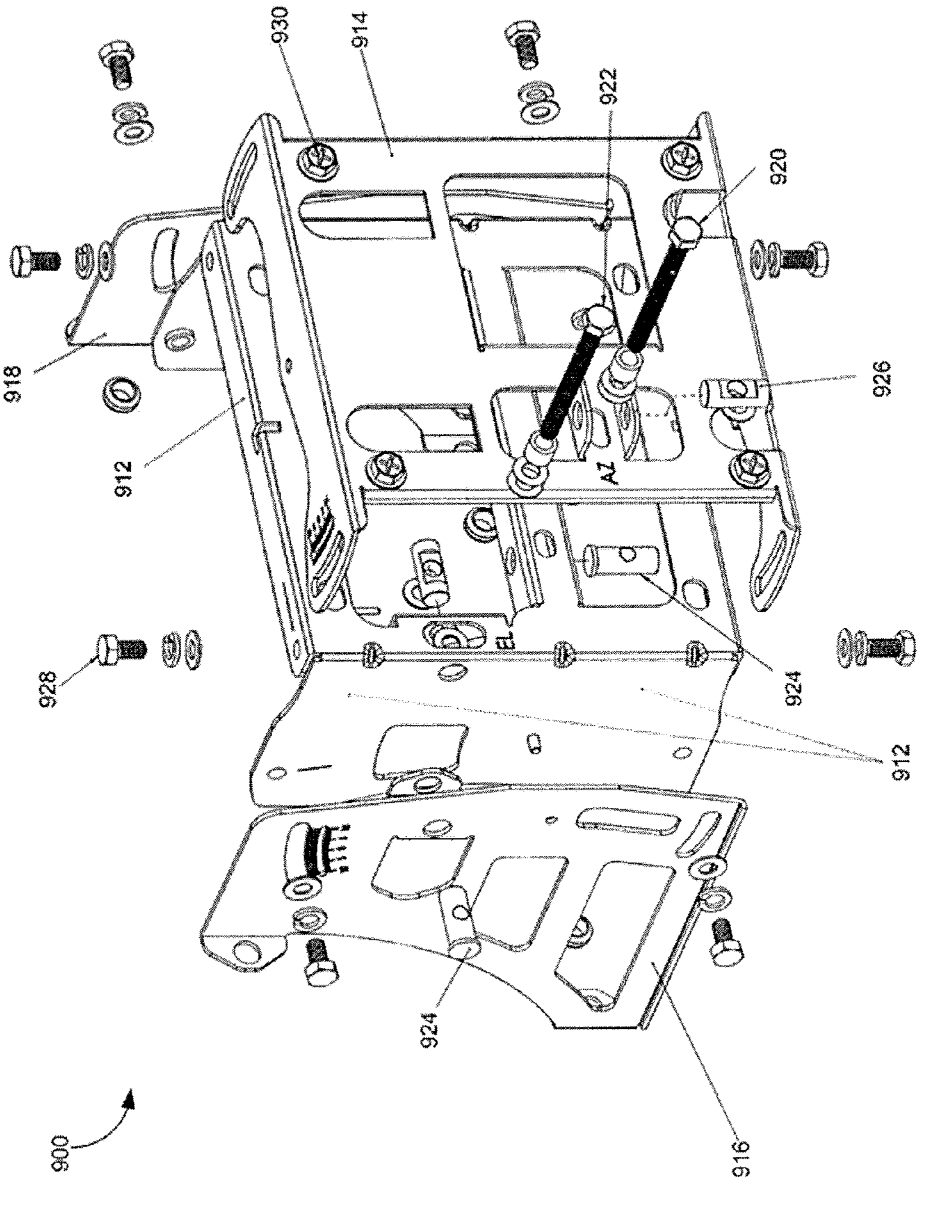
FIG. 9B presents the assembly view of the radio-mounting bracket subassembly, in accordance with an embodiment of the present invention.

FIG. 9B presents the assembly view of the radio-mounting bracket subassembly, in accordance with an embodiment of the present invention. In FIG. 9B, radio-mounting bracket subassembly 900 includes a number of brackets and a number of connecting components (such as screws and pins). More specifically, radio-mounting bracket subassembly 900 includes a pivot bracket 912, an azimuth (AZ)-adjustment bracket 914, a left elevation-adjustment bracket 916, and a right elevation-adjustment bracket 918. Pivot bracket 912 provides pivot points for all other adjustment brackets. AZ-adjustment bracket 914 enables the fine-tuning of the azimuth of the antenna. More specifically, a user can adjust the azimuth of the antenna by adjusting the position of an AZ-adjustment bolt 920 coupled to AZ-adjustment bracket 914. Similarly, elevation-adjustment brackets 916 and 918 enable the fine-tuning of the elevation of the antenna. A user can adjust the elevation of the antenna by adjusting the position of an elevation-adjustment bolt 922. In one embodiment, the azimuth and the elevation of the antenna can be adjusted within a range of ±10°. A number of adjustment pins, such as adjustment pins 924 and 926, fit to the adjustment bolts, also assist the fine-tuning of the antenna orientation. Radio-mounting bracket subassembly 900 also includes a number of lock bolts, such as lock bolt 928. In one embodiment, radio-mounting bracket subassembly 900 includes 8 lock bolts. These lock bolts are loosened before and during the alignment process. After the radio has been sufficiently aligned with the radio on the other side, these lock bolts are tightened to lock the alignment. In addition, radio-mounting bracket subassembly 900 includes four flange screws, such as screw 930. These flange screws are used to couple radio-mounting bracket subassembly 900 to pole mounting bracket 902.

Figure 9C:
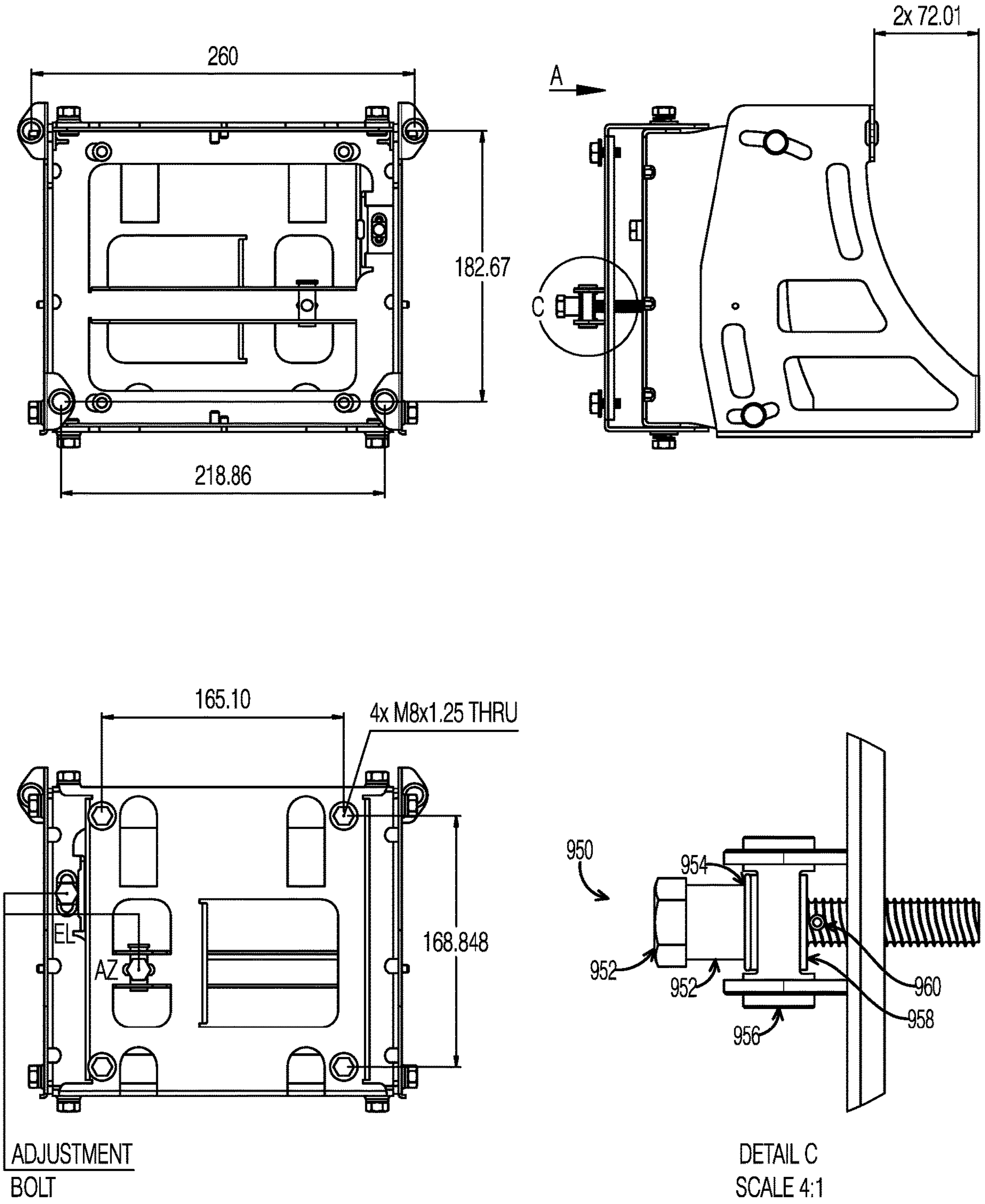
FIG. 9C presents more detailed mechanical drawings of the radio-mounting bracket, in accordance with an embodiment of the present invention.

FIG. 9C presents more detailed mechanical drawings of the radio-mounting bracket, in accordance with an embodiment of the present invention. The upper left drawing shows the back view (viewed from the side of the radio) of the radio-mounting bracket, the lower left drawing shows the front view of the radio-mounting bracket, the upper right drawing shows the side view of the radio-mounting bracket, and the lower right drawing shows a detailed drawing of an adjustment bolt assembly. Note that the assemblies for the AZ-adjustment bolt and the elevation-adjustment bolt are similar. In FIG. 9C, an adjustment bolt assembly 950 includes an adjustment bolt 952, a disk spring 954, an adjustment pin 956 with a through hole, a flat washer 958, and slotted spring pin 960.

Figure 9D:
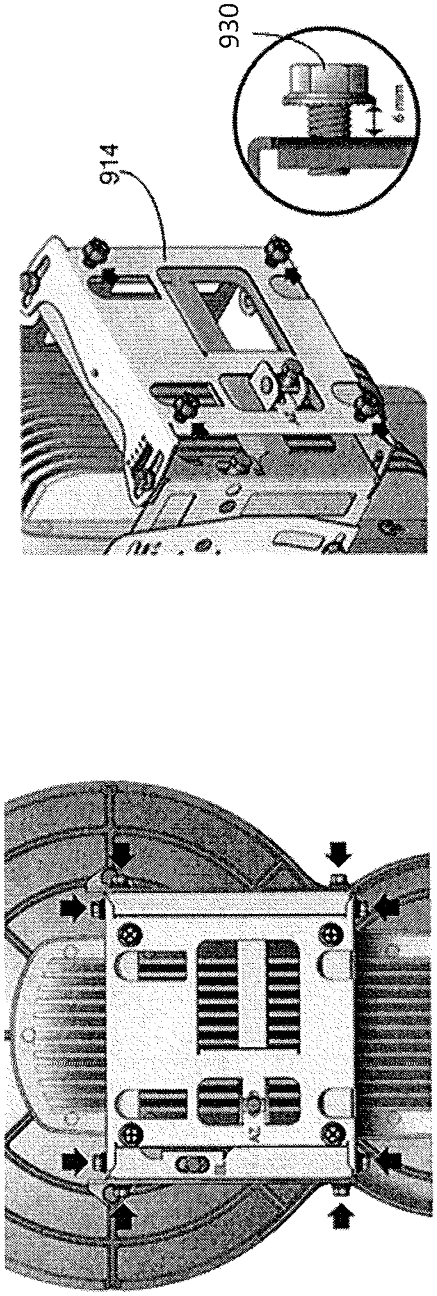
FIG. 9D presents a diagram illustrating the radio-mounting bracket mounted to a radio, in accordance with an embodiment of the present invention.

FIG. 9D presents a diagram illustrating the radio-mounting bracket mounted to a radio, in accordance with an embodiment of the present invention. The left drawing is the back view. The arrows in the left drawing point to the lock bolts. The right drawing is an angled view. The zoomed-in image shows that a 6 mm gap is needed between the head of flange screw 930 and AZ-adjustment bracket 914.

Figure 9E:
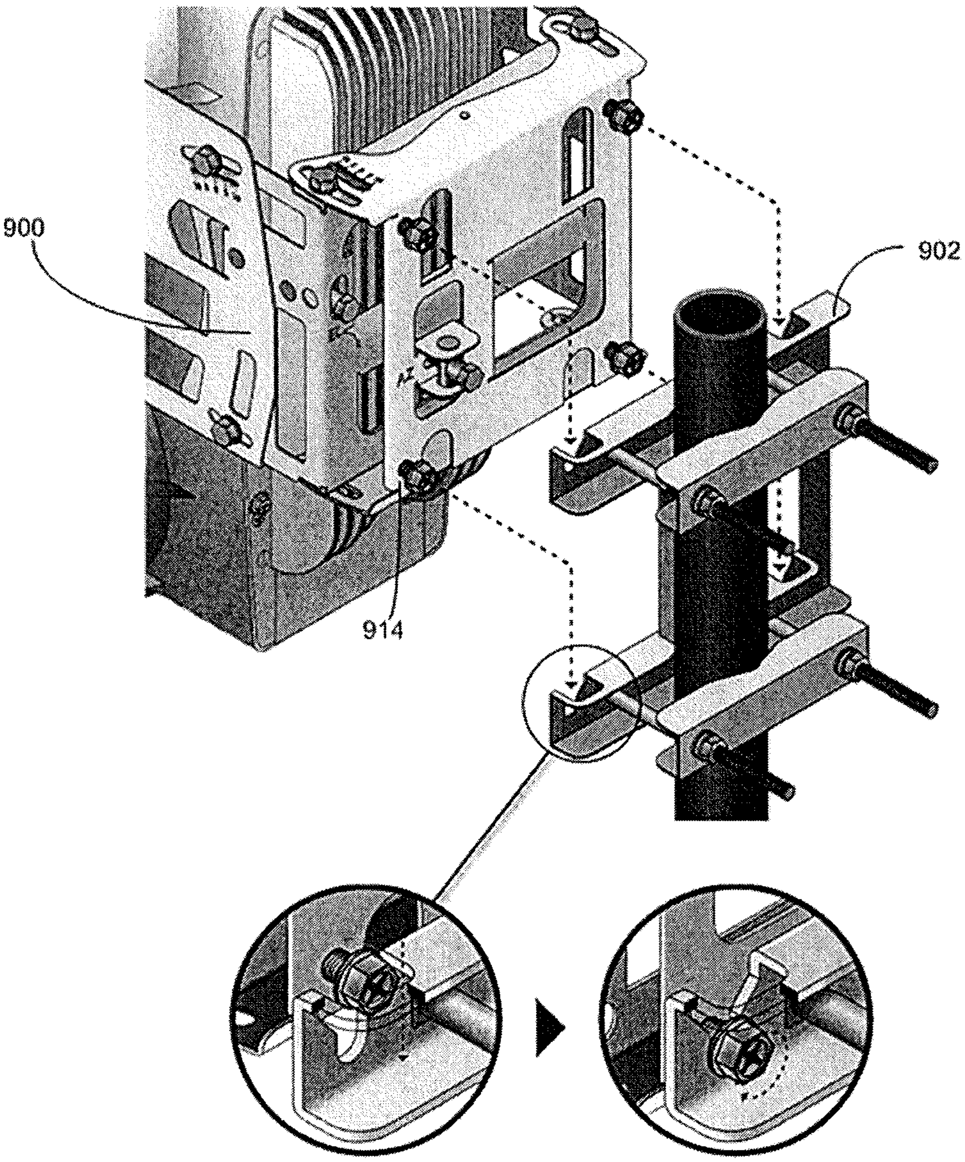
FIG. 9E presents a diagram illustrating the coupling between the radio-mounting bracket and the pole-mounting bracket, in accordance with an embodiment of the present invention.

FIG. 9E presents a diagram illustrating the coupling between the radio-mounting bracket and the pole-mounting bracket, in accordance with an embodiment of the present invention. From FIG. 9E, one can see that the radio-mounting bracket subassembly 900 can be attached to pole mounting bracket 902 by seating the flange screws on AZ-adjustment bracket 914 to corresponding notches on pole mounting bracket 902. Note that the flange screws can be later tightened to ensure that the radio-mounting bracket subassembly 900, and thus the radio, is securely attached to pole mounting bracket 902.

In general, the radios described herein include two (or more) antenna reflectors that are locked into alignment so that they both aim in parallel; both the transmitter and the receiver are aligned in parallel. This may allow for the dual reflectors (one transmitter and one receiver) to be "seen" as a single device by the paired partner during point-to-point transmission. To keep the two reflectors aligned in parallel, it may be desirable to have them be rigidly formed and/or connected to each other, as illustrated in FIGS. 3A-9E. Because the two beams (transmit and receive) are parallel they do not typically interfere with each other during transmission and receiving. The rigidity of the housing may also help the system resist misalignment of the reflectors (and possible interference between the transmitter and receiver during operation) under conditions of strain/stress, as due to weather conditions (wind, rain, etc.). In addition to the material stiffness of the housing, the addition of mechanical support elements (e.g., ribs) may also add to the stiffness. The radome may also enhance the stiffness by both covering the reflector and by providing additional support.

The housing may be formed of a single piece. In some variations the housing is formed as a monocoque structure, in which the load is supported by the "skin" of the antenna. Molding (e.g., injection molding) may be used in this design. Similarly a unitary body design may also be used to provide enhanced structural support. A design such as the monocoque design illustrated above may also allow for an extremely low overall weight, in part because of the reduced amount of materials need to achieve the overall stiffness/support. The reflector is a thin-wall reflector that may be supported by ribs.

As illustrated above, a single PCB is used. The size of the PCB may be minimized, though on the PCB the transmitters may be isolated from the receivers, as discussed.

System Operation

In use, radios that include adjacent (and even somewhat overlapping) reflectors as described herein may transmit and receive simultaneously in the same frequency channel(s). Thus, the transmitter and the receivers may be isolated from each other to prevent cross-talk and/or interference between the transmitter and receiver.

At the PCB level, one or more transmitters may be coupled to a single transmitting antenna feed; as illustrated above in FIGS. 7A-8B, both the transmitter and the receiver may be present on the same PCB, which may save costs but risks RF interference between the two. In the variations described herein the transmitters and receivers are all physically separated on different regions of the PCB and are shielded with shielding appropriate for the frequencies transmitted. For example, in FIGS. 7A and 8A, the RF shield elements 710, 810 are appropriate for use with 24 GHz signals, and are formed from die-cast Al. The labyrinthine shape of these shields isolates each of the transmitters (2) in the transmitters and isolates the feed from the rest of the circuitry. Interior walls help with isolation between the radio circuit elements (e.g., radio synthesizer, local oscillator, down- and up-converter parts, etc.). In the example shown in FIGS. 7A-8B the radio has two transmitters and two receivers, which operate using orthogonal polarization to enable concurrent RF waveforms traveling in the same direction, so that the transmitters share a single reflector and feed, and the receivers share a single receiver and feed. To avoid any contamination between these separate signals, both transmitters and receivers are also isolated from each other, as illustrated, reflected in the symmetric pattern of the RF shields.

Figure 22A:
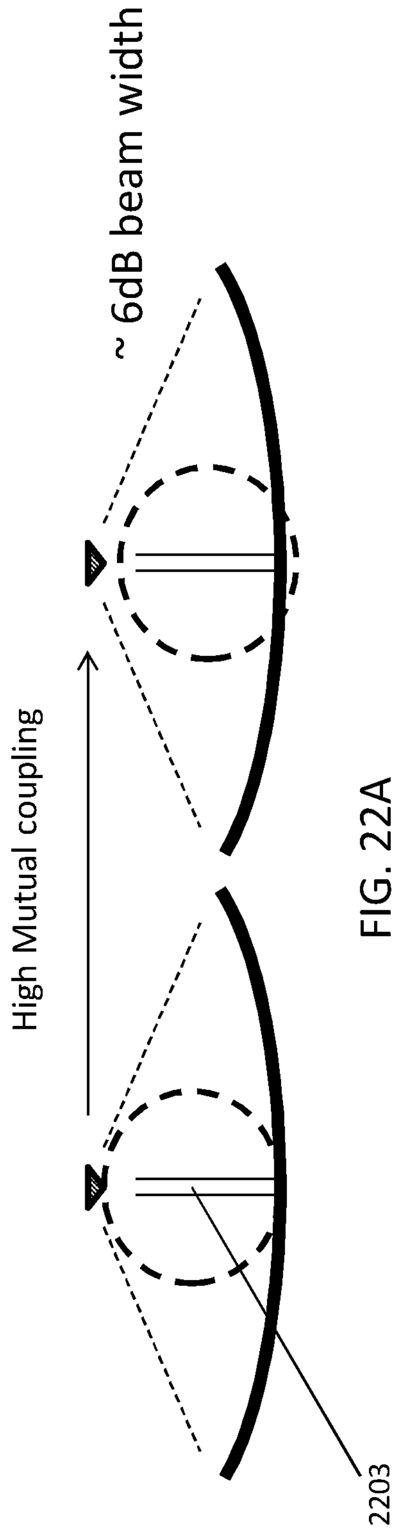
FIGS. 22A and 22B show a comparison between two adjacent typical parabolic reflectors (FIG. 22A) having relatively high mutual coupling, and two adjacent "deep dish" parabolic reflectors (FIG. 22B) having a low mutual coupling as described herein.
Figure 22B:
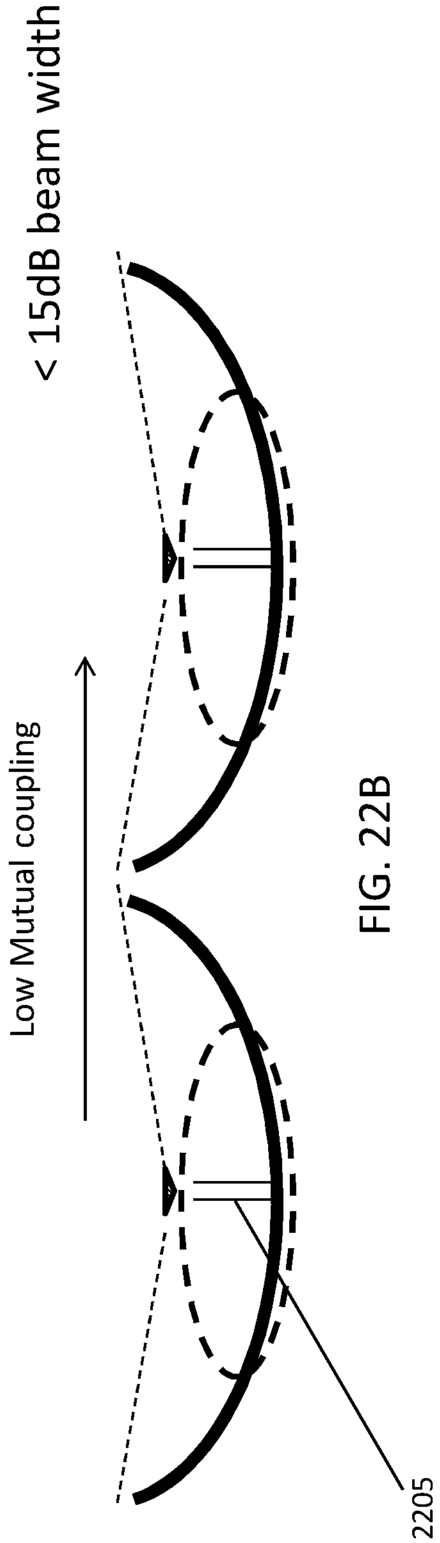

Beyond the RF shielding, the reflectors may also be configured to reduce or eliminate RF cross-talk (e.g., coupling) between the transmitter and receiver. FIGS. 22A and 22B illustrate one technique for reducing the mutual coupling between immediately adjacent reflectors.

As mentioned above, the adjacent reflectors are typically held in rigid alignment so that they are aimed in parallel, as shown. FIG. 22A illustrates a typical pair of parabolic reflectors, positioned side-by-side, that exhibit a high degree of mutual coupling between the transmitter on one side and the receiver on the other. The antenna feeds 2203 extend above the curvature (edge) of each reflector. In contrast, in FIG. 23B, a pair of adjacent parabolic reflectors are shown that have a low mutual conductance coupling. In this example, the primary feed 2205 is shadowed from the adjacent reflector. In addition, the feed used has been configured to have a very low edge illumination so that diffraction is minimized. In some variations the reflectors are configured so that there is low mutual coupling between the two reflectors in part because the ratio of focal length, $f_1$, to diameter, d, ($f_1$/d) may be less than approximately 0.25 for the reflectors (e.g., the transmission reflector or both the transmission and receiving reflectors).

In some variations the relative sizes of the reflectors may also help isolate the two antennas. For example, as shown above, the transmitting antenna reflector may be smaller than the receiver antenna reflector. This may allow a higher receive gain while staying within regulated limits for transmission. In some variations, the transmit antenna does not align maximally with the reflector, so that the effective power limitation plus the side lobe energy is less than maximal. Thus, in some variations, the antenna reflector is larger than it needs to be because of the losses from the side lobe energy.

In some variations an isolation boundary may be included between the transmitter reflector (antenna) and the receiver reflector (antenna). For example, an isolation boundary (choke) may be a ridged boundary between the two reflectors. An isolation boundary between the reflectors may be referred to as an isolation choke boundary (or isolation choke boundary layer). This boundary is typically an anti-diffraction layer which may smooth or avoid sharp edges that may otherwise interfere or create interference. By minimizing the diffraction (e.g., avoiding sharp edges where the energy will "bend"), and also by under-illuminating the transmitter, the transmitter may reduce energy at the rim of the reflector(s), so that the power available to spill over is small.

In some variations the isolation choke boundary includes "rings" around the rim of the parabolic reflector edge. For example, see FIG. 23A. Annular rings at the boundary (shown as "corrugations") may enhance the isolation of the transmitter antenna with respect to the receiver. A corrugated (ridged) surface may help reduce diffracted fields from reaching the second reflector feed. The ridges maybe chosen to be approximately a quarter wavelength at the center frequency of operation.

Figure 23A:
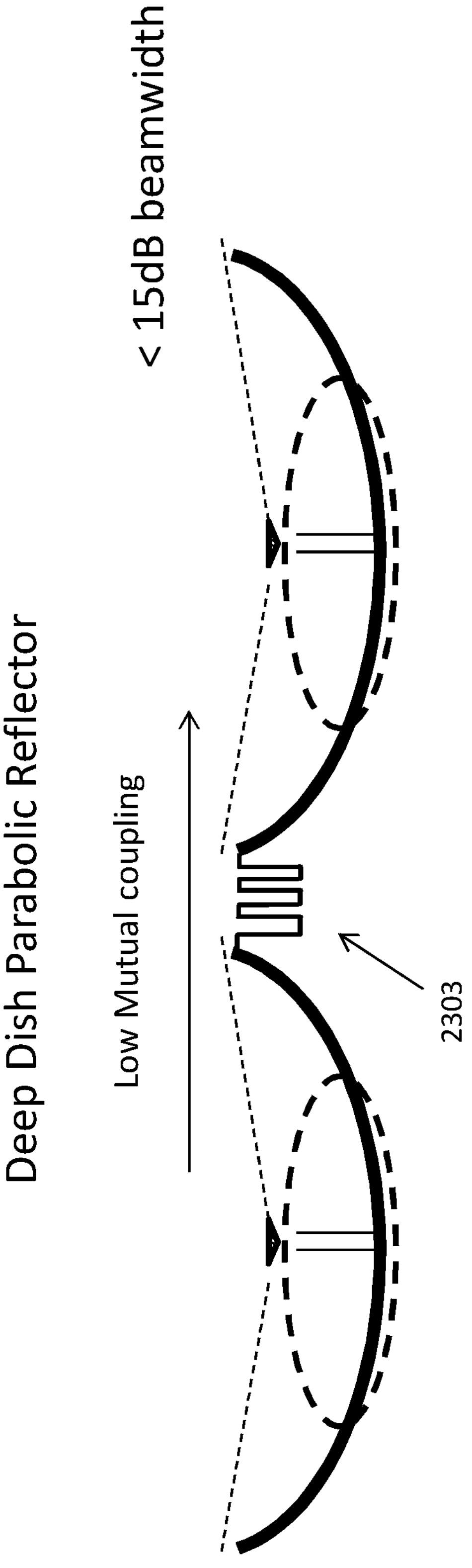
FIG. 23A shows another variation of a pair of parabolic reflectors (similar to those shown in FIG. 22B), having a corrugated isolation choke boundary layer that reduces or prevents diffracted fields from reaching the reflector feed of the adjacent reflector.
Figure 23B:
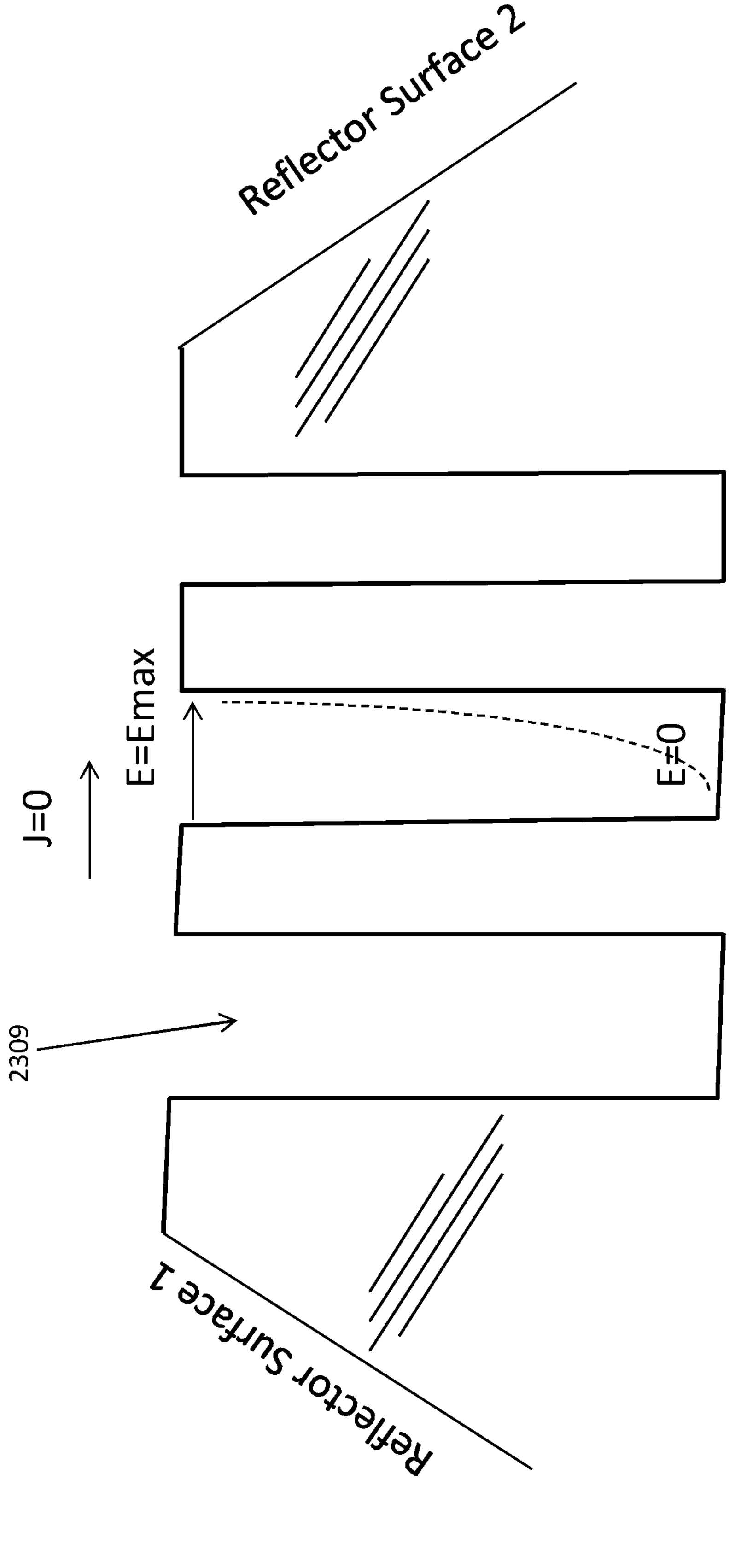
FIG. 23B shows an enlarged view of the boundary region, illustrating the quarter wavelength corrugations in the surface.
Figure 23C:
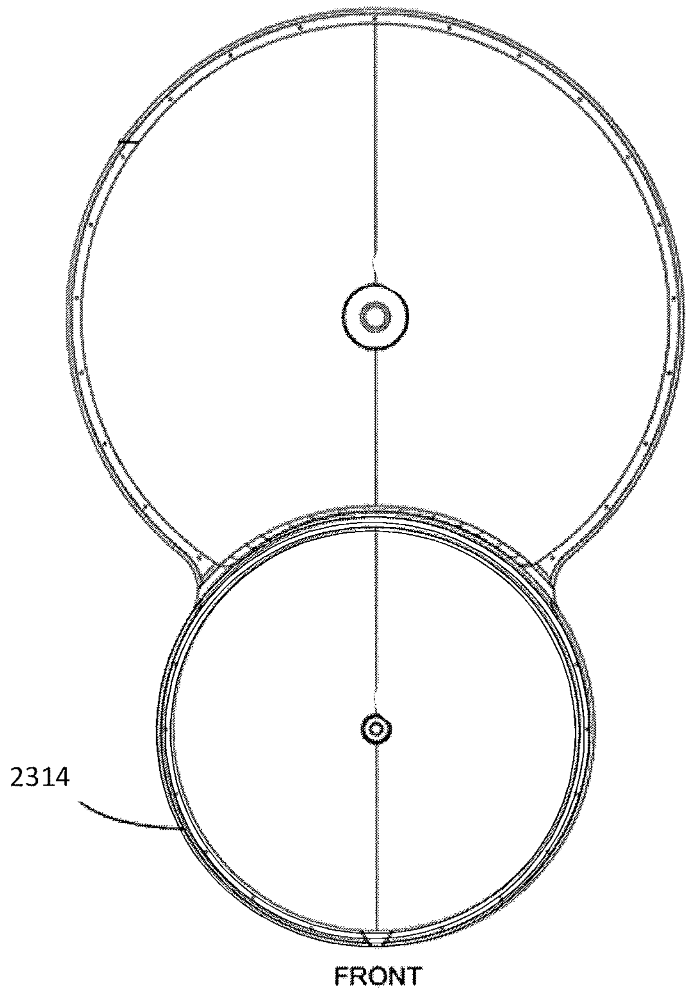
FIG. 23C shows a front view of a transmitter reflector having corrugations (rings) forming the isolation boundary between the transmitter and receiver.

FIG. 23B illustrates an enlarged view of the quarter wavelength corrugated surface 2303 shown in FIG. 23A. This boundary provides electromagnetic boundary conditions that do not allow current to travel from one antenna to the other. Thus, with no direct primary feed to primary feed patch and diffraction dramatically reduced by the feed pattern taper and corrugations, the antenna pair may have a very high isolation (e.g., low mutual coupling) between the transmitter antenna and the receiver antenna. FIG. 23C illustrates a front view of an antenna pair forming a radio device having a corrugated/ridged isolation boundary around the lower (transmitter) reflector 2314.

In this example, the transmitter reflector antenna is dominant in the sense that it emits a large amount of energy (high gain). The transmitter antenna is under-illuminated, and the splash guide is positioned deep in the housing, which may help with side-lobe suppression.

Further, in some variations, including the variation shown in FIG. 23C, the transmitter reflector/antenna is embedded within (e.g., overlaps with) the reflector for the receiver. Embedding the transmit reflector into the receive reflector may impact the efficiency of the receive antenna, however it may also help provide an isolation boundary between the receiver and transmitter antennas that reduces the coupled energy between these antenna.

The 24 GHz license-free operating frequency of the radio system makes it a preferred choice for deployment of point-to-point wireless links, such as a wireless backhaul, because there is no need to obtain an FCC (Federal Communications Commission) license. The unique design of the high-gain reflector antenna provides long reachability (up to 13 Km in range) of the radio system. Moreover, the radio system can operate in both Frequency Division Duplex (FDD) and Hybrid Division Duplex (HDD) modes, thus providing the radio system with unparalleled speed and spectral efficiency, with data throughput above 1.4 Gbps. Note that HDD provides the best of both worlds, combining the latency performance of FDD with the spectral efficiency of Time Division Duplex (TDD).

Figure 10A:
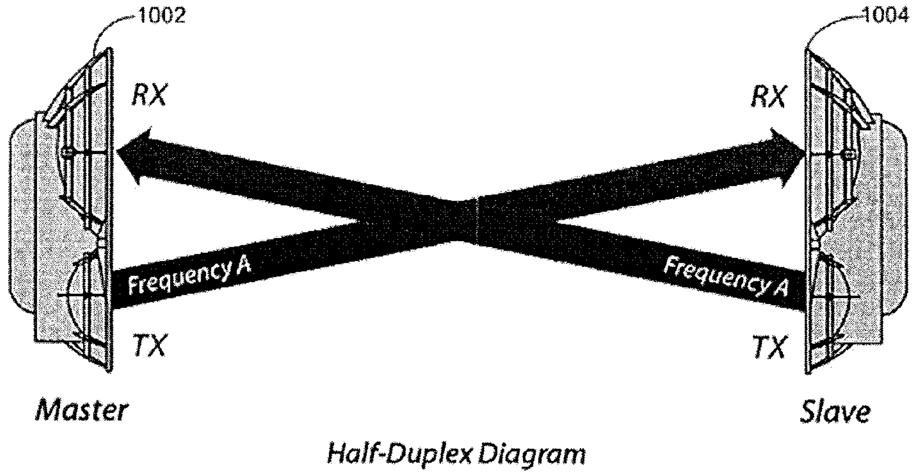
FIG. 10A presents a diagram illustrating the radio system operating in half-duplex mode, in accordance with an embodiment of the present invention.

During operation, the radio system can be configured for half-duplex operation (which is the default setting) and full-duplex operation. FIG. 10A presents a diagram illustrating the radio system operating in half-duplex mode, in accordance with an embodiment of the present invention. In FIG. 10A, radio system 1000 includes two radios, a master radio 1002 and a slave radio 1004. Note that master and slave radios can be similar radios with different configurations. In the example shown in FIG. 10A, the lower antenna reflectors are used for transmitting (TX) purposes, whereas the upper antenna reflectors are used for receiving (RX) purposes. When the system is configured to operate in the half-duplex mode, the TX and RX frequencies can be either the same or different to suit local interference. Note that the half-duplex mode allows communication in one direction at a time, alternating between transmission and reception. As a result, the half-duplex operation provides more frequency planning options at the cost of higher latency and throughput.

Figure 10B:
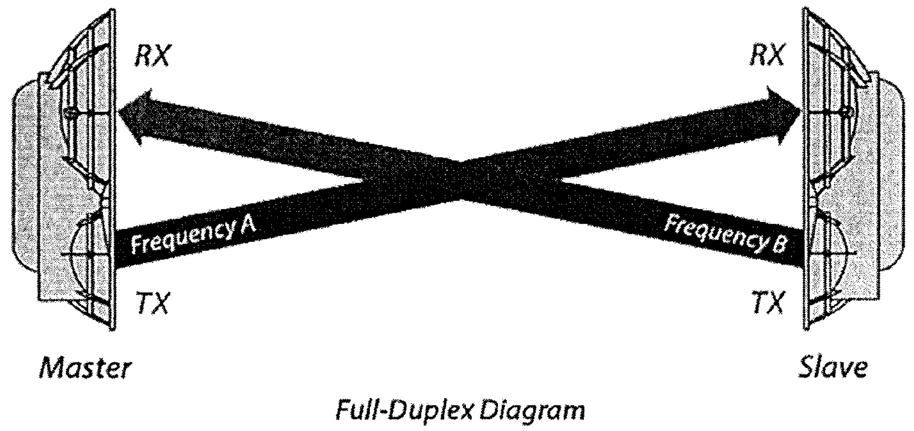
FIG. 10B presents a diagram illustrating the radio system operating in full-duplex mode, in accordance with an embodiment of the present invention.

FIG. 10B presents a diagram illustrating the radio system operating in full-duplex mode, in accordance with an embodiment of the present invention. When operating in the full-duplex mode, the TX and RX frequencies should be different, thus allowing communication in both directions simultaneously. The full-duplex operation may provide higher throughput and lower latency.

In some variations, high speed and lower latency may be obtained with the radios configured as a full-duplex system using Frequency Division Duplexing (FDD). The data streams generated by the radios are simultaneously transferred across the wireless link. The transmitter and receiver are running concurrently in time. Because of the trade-off between bandwidth resources and propagation conditions, this approach is typically reserved for links in areas where installations are in clear line-of-sight conditions and free of reflected energy such as that generated by heavy rain or intermediate objects. Installations that are subject to Fresnel reflections or highly scattered environments may experience some level of degradation at great ranges.

Links that are installed in environments that are highly reflective or subject to considerable scattering due to heavy rain or foliage loss may be better suited to half-duplex configurations (or simulated full duplex). In this case the frequency and bandwidth resources are shared on a Time Division Duplexing (TDD) basis, and the system can accept higher levels of propagation distortion. The trade-offs may include reduced throughput and slightly higher latency. Other half-duplex/simulated full duplex techniques include HDD and other techniques as known to those of skill in the art.

As mentioned above, in some variations the system may allow switching between duplexing types. For example, the system may be configured to switch between FDD and TDD. In some variations, the system switches between FDD and TDD based on the one or more performance parameters of the device/system. As mentioned above, communication between nodes may vary based on environmental conditions. In open space, you may have few obstacles that can cause multiple paths b/w the transmitter and receiver. In such cases, when you have a clear space, then FDD mode signaling may be used. Transmission and receiving may be performed at the same time, and even on the same channel using the devices described herein. However, if objects are introduced in the space (and particular energy reflectors, such as water, etc.) that cause reflection of signal power, the signals may degrade, and it may be better to transmit between nodes using TDD. Thus, by monitoring the signal parameters to detect the transmission quality, a system that can support multiple duplex modalities, such as the systems described above, may be configured to dynamically switch between modalities based on signal quality, allowing the optimal duplexing to be matched to the conditions and operation of the devices. In one example, the system or device may monitor (e.g., using the FPGA) a parameter of signal transmission. If the packet error rate increases (bit error rate, etc.) at the receiver above a predetermined threshold then the system may be configured to automatically switch to a higher-fidelity, though slower, duplexing mode (e.g., TDD). The transmission rate may be returned to a faster mode (e.g., FDD) either based on periodic re-testing at the faster duplexing mode, or based on other parameters passing a threshold (e.g., decrease in error rate, etc.).

The ability to switch duplexing modes (e.g., between FDD and TDD) is made possible in the systems described herein in part by having a separate receiver antenna and transmitter antenna. This allows use of FDD on the same channel without requiring specific and costly filtering using pre-tuned filters.

In some variations, the radio system is configured with the ability to manage time and bandwidth resources, similar to other systems utilizing different modulation schemes that are scaled according to the noise, interference, and quality of the propagation channel. The radio system also automatically scales its modulation based on channel quality but has the ability to be reconfigured from a time/bandwidth perspective to allow for the best possible performance. In many regards the suitability of the duplexing scheme needs to be taken into account based on the ultimate goals of the user. Just as channel conditions have an effect on the modulation scheme selection, there are effects on duplexing modes to consider as well.

When deploying the radio systems for establishing wireless communication links, various configurations can be used. For example, the first configuration is for point-to-point backhaul, where two radios (one configured as master and one configured as slave) are used to establish a point-to-point link as shown in FIGS. 10A and 10B. Note that although the figure show schematic "arrows" between the antenna pairs that cross (e.g., between TX and RX antenna reflectors on the link pairs), this is to illustrate the link between the node pairs and is not directionally accurate; the transmission and receiving reflectors are oriented in parallel.

Figure 11A:
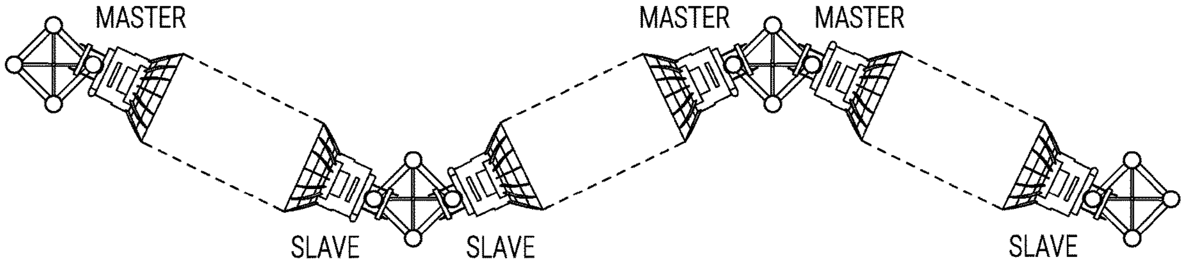
FIG. 11A presents a diagram illustrating a radio system in a daisy chain configuration, in accordance with an embodiment of the present invention.
Figure 11B:
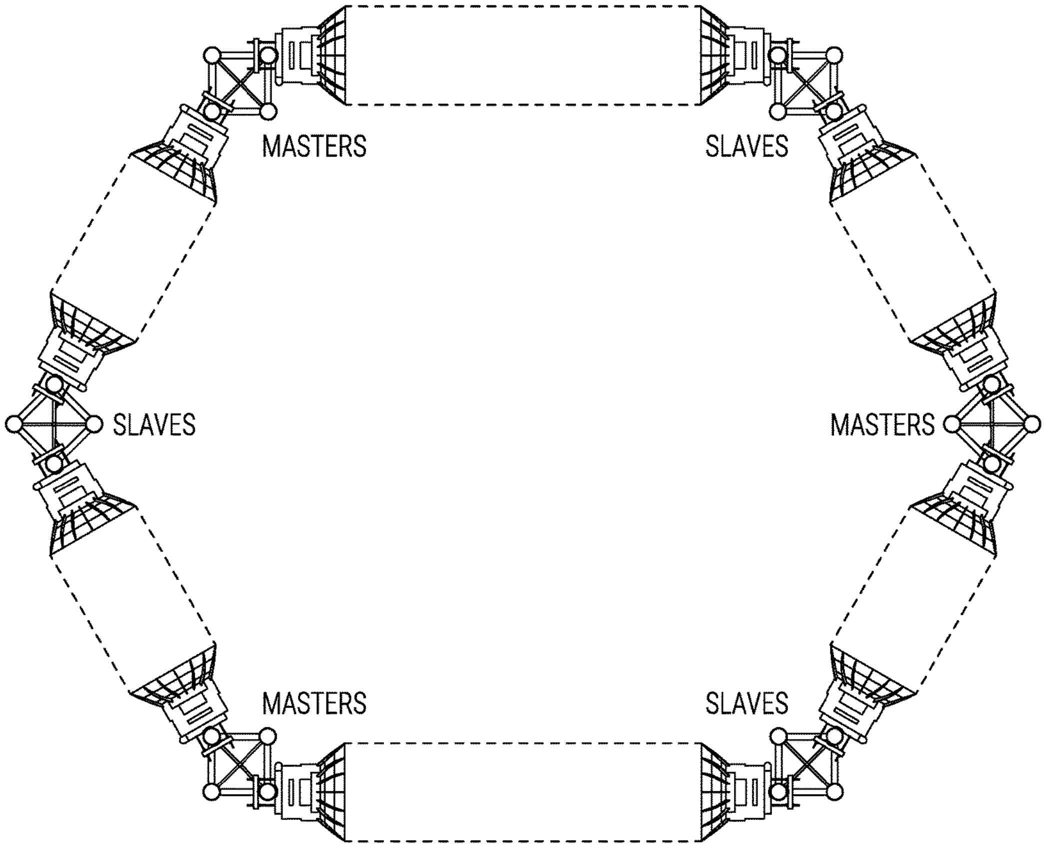
FIG. 11B presents a diagram illustrating a radio system in a ring configuration, in accordance with an embodiment of the present invention.

FIG. 11A presents a diagram illustrating a radio system in a daisy chain configuration, in accordance with an embodiment of the present invention. As shown in FIG. 11A, in a daisy chain configuration, multiple radios are used to extend the distance of a link, like a relay from point to point to point. Note that the radios in the same node need to have the same master/slave configuration. FIG. 11B presents a diagram illustrating a radio system in a ring configuration, in accordance with an embodiment of the present invention. As shown in FIG. 11B, in a ring configuration, multiple radios are used to form redundant paths. When configured as a ring, if one link goes down, the other links have an alternative route available. For each link, one radio is configured as master and the other one is configured as slave. Due to the narrow bandwidth of the radios, co-location interference is not a concern in most cases. It is possible to co-locate multiple radios if they are pointed in different directions. If the radios are back-to-back, it is even possible to use the same frequency. It is recommended to use different frequencies for adjacent radios. Note that co-located radios should have the same master/slave configuration.

Before mounting the radios onto poles, the user should configure the paired radios. The radio configurations include, but are not limited to: operating mode (master or slave) of the radio, duplex mode (full-duplex or half-duplex of the link), TX and RX frequencies, and data modulation schemes. Detailed descriptions of the configuration settings are included in the following section.

The installation steps include connecting Ethernet cables to the data and configuration ports, configuring the settings of the radio using a configuration interface, disconnecting the cables to move the radios to mounting sites, reconnecting at the mounting sites, mounting the radios, and establishing and optimizing the RF link.

Figure 12A:
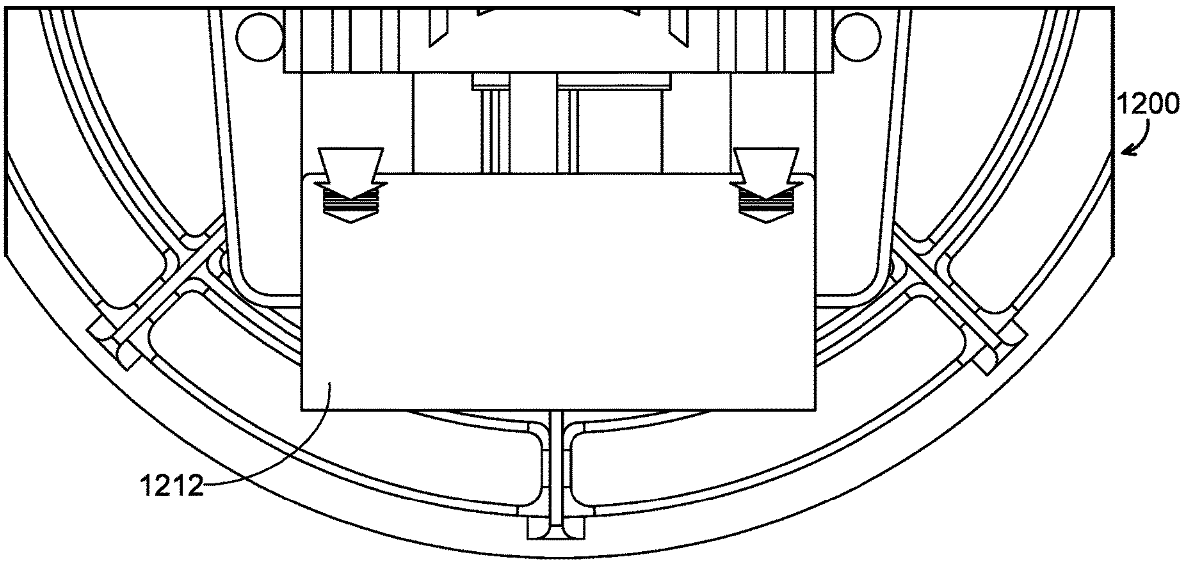
FIG. 12A presents a diagram illustrating the port cover being slid off the backside of the radio to expose various ports, in accordance with an embodiment of the present invention.

FIG. 12A presents a diagram illustrating the port cover being slid off the backside of the radio to expose various ports, in accordance with an embodiment of the present invention. In FIG. 12A, one can slide off a port cover 1212 from the backside of the radio by pressing down on the indicator arrows.

Figure 12B:
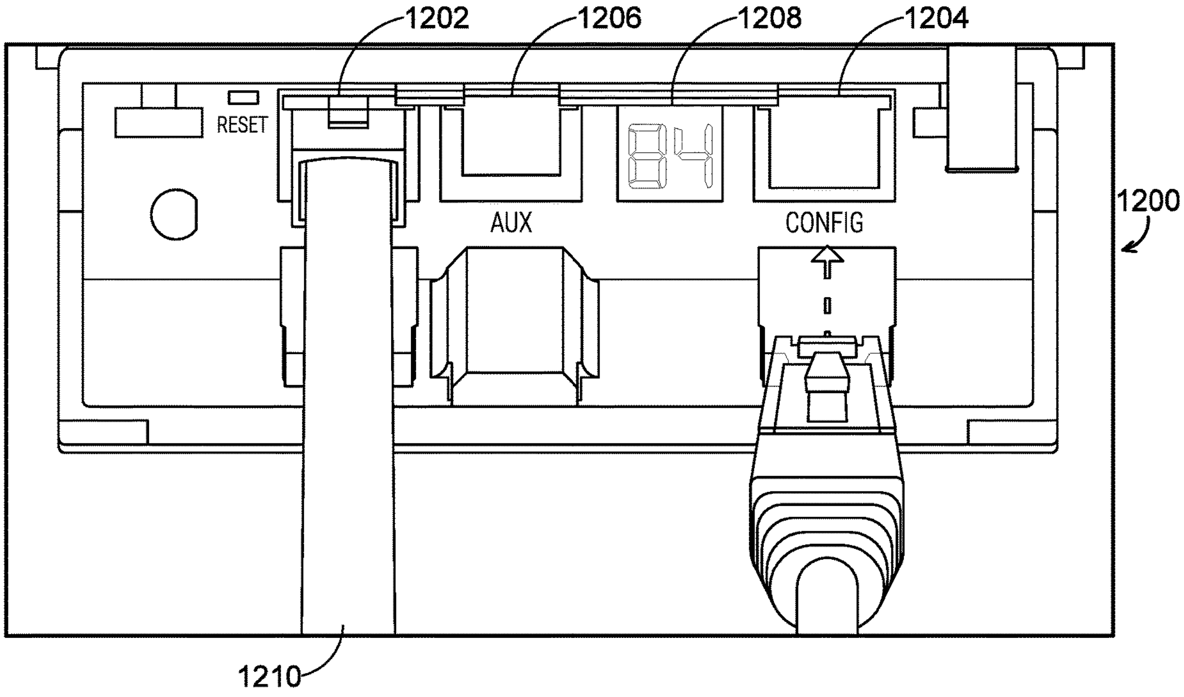
FIG. 12B presents a diagram illustrating the ports on the backside of a radio, in accordance with an embodiment of the present invention.

FIG. 12B presents a diagram illustrating the ports on the backside of a radio, in accordance with an embodiment of the present invention. In FIG. 12B, radio 1200 includes a data port 1202, a configuration port 1204, an auxiliary port 1206, and an LED display 1208. Data port 1202 not only enables upload/download of link data, but also provides power to the radio via power-over-Ethernet (PoE). During operation, an Ethernet cable, such as cable 1210, can be used to couple data port 1202 with a PoE adapter, which in turn couples to a power source. Configuration port 1204 enables communication between a user computer and the CPU of the radio, thus enabling the user to configure the settings that govern the operations of the radio. In one embodiment, an Ethernet cable can be used to couple configuration port 1204 with a computer.

Auxiliary port 1206 includes an RJ-12 connector. In one embodiment, auxiliary port 1206 can be coupled to a listening device, such as a headphone, to enable alignment of the antennas by listening to an audio tone. More specifically, while aligning the pair of antennas, one can listen to the audio tone via the listening device coupled to auxiliary port 1206; the higher the pitch, the stronger the signal strength, and thus the better the alignment. To ensure the best tuning result, it is recommended that the user iteratively adjusts the AZ and elevation of the pair of radios one by one, starting with the slave radio, until a symmetric link (with received signal levels within 1 dB of each other) is achieved. This ensures the best possible data rate between the paired radios. Note that adjusting the AZ and elevation of a radio can be achieved by adjusting the corresponding AZ and elevation bolts, as discussed in the previous section.

In addition to using the audio tone, the user can also align the paired radios based on digital values displayed by LED display 1208. More specifically, LED display 1208 displays the power level of the received signal. In one embodiment, values on LED display 1208 are displayed in negative dBm. For example, a number 61 represents a received signal level of −61 dBm. Hence, lower values indicate a stronger received signal level. While aligning the paired radios, the user can observe LED display 1208 to monitor the received signal strength. For best alignment results, a pair of installers should be used with one adjusting the AZ and elevation of a radio at one end of the link, while the other installer reports the received signal level at the other end of the link.

FIG. 12C1-12C4 presents a diagram illustrating the fine-tuning of the wireless link, in accordance with an embodiment of the present invention. The upper drawing shows that one installer at the end of the slave radio sweeps the AZ-adjustment bolt and then sweeps the elevation-adjustment bolt (as indicated by the arrows in the drawing) until the other installer sees the strongest received signal level displayed on the LED display of the master radio. The lower drawing shows that the installer at the end of the master radio sweeps the AZ-adjustment bolt and then sweeps the elevation-adjustment bolt (as indicated by the arrows in the drawing) until the other installer sees the strongest received signal level displayed on the LED display of the slave radio. During alignment, the installers alternate adjustments between the paired radios until a symmetric link is achieved. Subsequently, the installers can lock the alignment on both radios by tightening all eight lock bolts on the alignment bracket. The installers should observe the LED display on each radio to ensure that the value remains constant. If the LED value changes during the locking process, the installers can loosen the lock bolts, finalize the alignment of each radio again, and retighten the lock bolts.

The radio configurations include, but are not limited to: operating mode (master or slave) of the radio, duplex mode (full-duplex or half-duplex of the link), TX and RX frequencies, and data modulation schemes. Detailed descriptions of the configuration settings are included in the following section.

Configuration Interface

In addition to hardware, the radio system may further includes a configuration interface, which is an operating system capable of powerful wireless and routing features, built upon a simple and intuitive user interface foundation. In one embodiment, a user can access the configuration interface for easy configuration and management via a web browser. Note that the configuration interface can be accessed in two different ways. More specifically, one can use the direct coupling to the configuration port to achieve out-of-band management. In addition, in-band management is available via the local data port or the data port at the other end of the link.

In some variations, before accessing the communication interface, the user needs to make sure that the host machine is connected to the LAN that is connected to the configuration port on the radio being configured. The user may also need to configure the Ethernet adapter on the host system with a static IP address, such as one on the 192.168.1.x subnet (for example, 192.168.1.100). Subsequently, the user can launch the web browser, and type http://192.168.1.20 in the address field and press enter (PC) or return (Mac). In one embodiment, a login window appears, prompting the user for a username and password. After a standard login process, the configuration interface will appear, allowing the user to customize radio settings as needed.

Figure 13:
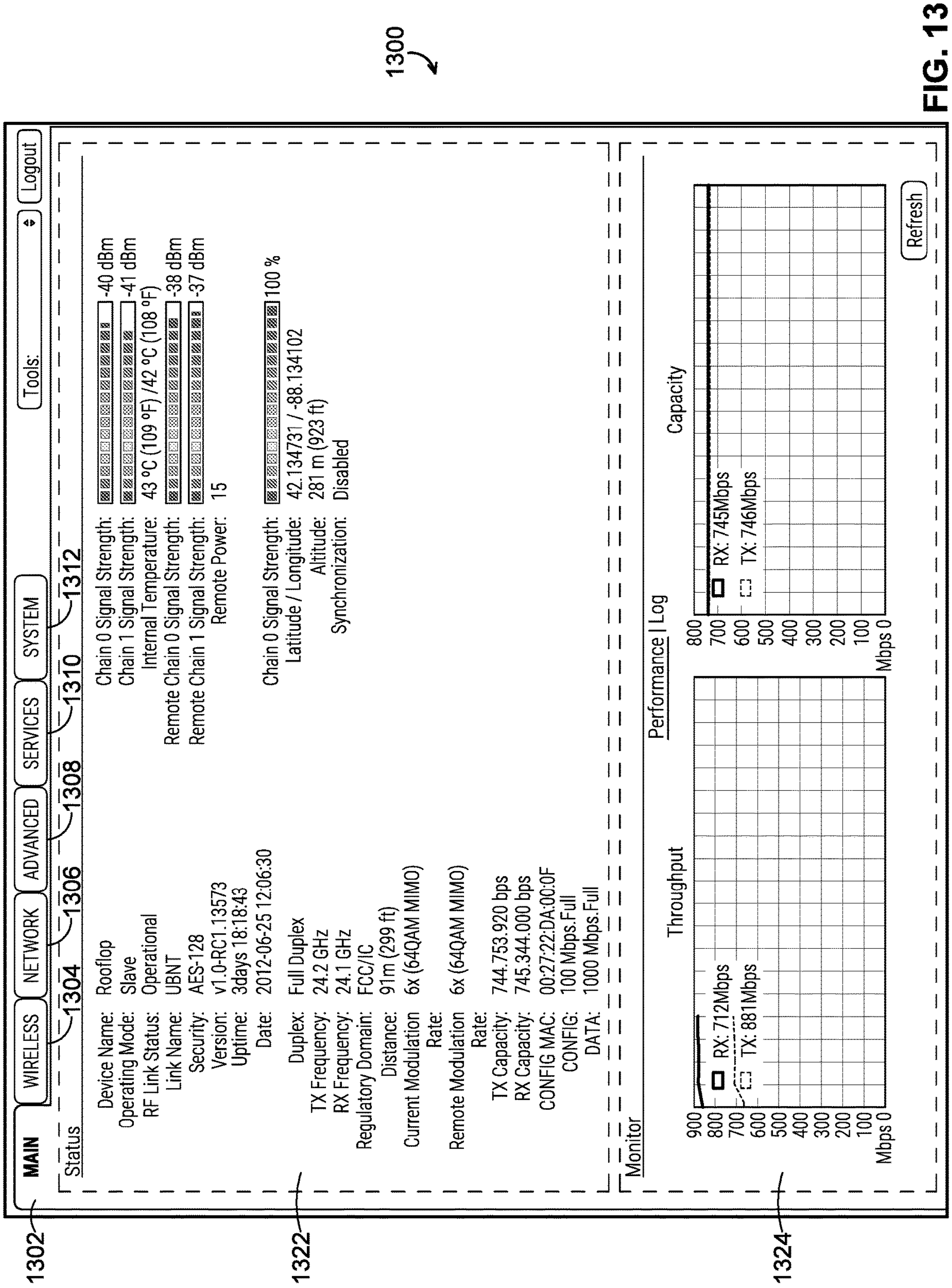
FIG. 13 presents a diagram illustrating an exemplary view of the configuration interface, in accordance with an embodiment of the present invention.

FIG. 13 presents a diagram illustrating an exemplary view of the configuration interface, in accordance with an embodiment of the present invention. In FIG. 13, configuration interface 1300 includes six main tabs, each of which provides a web-based management page to configure a specific aspect of the radio. More specifically, configuration interface 1300 includes a main tab 1302, a wireless tab 1304, a network tab 1306, an advanced tab 1308, a services tab 1310, and a system tab 1312.

In some variations, the main tab 1302 displays device status, statistics, and network monitoring links. Wireless tab 1304 configures basic wireless settings, including the wireless mode, link name, frequency, output power, speed, RX Gain, and wireless security. Network tab 1306 configures the management network settings, Internet Protocol (IP) settings, management VLAN, and automatic IP aliasing. Advanced tab 1308 provides more precise wireless interface controls, including advanced wireless settings and advanced Ethernet settings. Services tab 1310 configures system management services: ping watchdog, Simple Network Management Protocol (SNMP), servers (web, SSH, Telnet), Network Time Protocol (NTP) client, dynamic Domain Name System (DDNS) client, system log, and device discovery. System tab 1312 controls system maintenance routines, administrator account management, location management, device customization, firmware update, and configuration backup. The user may also change the language of the web management interface under system tab 1312.

As shown in FIG. 13, when main tab 1302 is active, configuration interface 1300 presents two display areas, an area 1322 for displaying various status information, and an area 1324 for displaying outputs of monitoring tools.

In the example shown in FIG. 13, area 1322 displays a summary of link status information, current values of the basic configuration settings, and network settings and information. Items displayed in area 1322 include, but are not limited to: device name, operating mode, RF link status, link name, security, version, uptime, date, duplex, TX frequency, RX frequency, regulatory domain, distance, current modulation rate, remote modulation rate, TX capacity, RX capacity, CONFIG MAC, CONFIG, data, chain 0/1 signal strength, internal temperature, remote chain 0/1 signal strength, remote power, GPS signal quality, latitude/longitude, altitude, and synchronization.

Device name displays the customizable name or identifier of the device. The device name (also known as the host name) is displayed in registration screens and discovery tools. Operating mode displays the mode of the radio: slave, master, or reset. RF link status displays the status of the radio: RF off, syncing, beaconing, registering, enabling, listening, or operational. Link name displays the customizable name or identifier of the link. Security displays the encryption scheme, where AES-128 is enabled at all times.

Version displays the software version of the radio configuration interface. Uptime is the total time the device has been running since the latest reboot (when the device was powered up) or software upgrade. This time is displayed in days, hours, minutes, and seconds. Date displays the current system date and time in YEAR-MONTH-DAY HOURS: MINUTES:SECONDS format. The system date and time are retrieved from the Internet using NTP (Network Time Protocol). The NTP client is enabled by default on the Services tab. The radio does not have an internal clock, and the date and time may be inaccurate if the NTP client is disabled or the device is not connected to the Internet.

Duplex displays full-duplex or half-duplex. As discussed in the previous section, full-duplex mode allows communication in both directions simultaneously, and half-duplex mode allows communication in one direction at a time, alternating between transmission and reception.

TX frequency displays the current transmit frequency. The radio uses the radio frequency specified to transmit data. RX frequency displays the current receive frequency. The radio uses the radio frequency specified to receive data. Regulatory domain displays the regulatory domain (FCC/IC, ETSI, or Other), as determined by country selection. Distance displays the distance between the paired radios.

Current modulation rate displays the modulation rate, for example: 6× (64QAM MIMO), 4× (16QAM MIMO), 2× (QPSK MIMO), 1× (QPSK SISO), and ¼× (QPSK SISO). Note that if Automatic Rate Adaptation is enabled on the wireless tab, then current modulation rate displays the current speed in use and depends on the maximum modulation rate specified on the wireless tab and current link conditions. Remote modulation rate displays the modulation rate of the remote radio: 6× (64QAM MIMO), 4× (16QAM MIMO), 2× (QPSK MIMO), 1× (QPSK SISO), and ¼× (QPSK SISO).

TX capacity displays the potential TX throughput, how much the radio can send, after accounting for the modulation and error rates. RX capacity displays the potential RX throughput, how much the radio can receive, after accounting for the modulation and error rates.

CONFIG MAC displays the MAC address of the configuration port. CONFIG displays the speed and duplex of the configuration port. Data displays the speed and duplex of the data port. Chain 0/1 signal strength displays the absolute power level (in dBm) of the received signal for each chain. Changing the RX Gain on the wireless tab does not affect the signal strength values displayed on the main tab. However, if "overload" is displayed to indicate overload condition, decrease the RX Gain.

Internal temperature displays the temperatures inside the radio for monitoring. Remote chain 0/1 signal strength displays the absolute power level (in dBm) of the received signal for each chain of the remote radio. Remote power displays the maximum average transmit output power (in dBm) of the remote radio. GPS signal quality displays GPS signal quality as a percentage value on a scale of 0-100%. Latitude and longitude are displayed based on GPS tracking, reporting the device's current latitude and longitude. In some variations, clicking the link opens the reported latitude and longitude in a browser, for example, using Google Maps™ (registered trademark of Google Inc. of Menlo Park, Calif.). Altitude is displayed based on GPS tracking, reporting the device's current altitude relative to sea level. Synchronization displays whether the radio uses GPS to synchronize the timing of its transmissions. In some variation, the option of synchronization using GPS maybe disabled. In some variation, the radio can be configured without a GPS receiver or other GPS tracking electronics.

Area 1324 displays outputs of two monitoring tools that are accessible via the links on the main tab, performance and log. The default is performance, which is displayed when the main tab is opened, as shown in FIG. 13. In FIG. 13, area 1324 displays two charts, the throughput chart and the capacity chart. The throughput chart displays the current data traffic on the data port in both graphical and numerical form. The capacity chart displays the potential data traffic on the data port in both graphical and numerical form. For both charts the chart scale and throughput dimension (Bps, Kbps, Mbps) change dynamically depending on the mean throughput value, and the statistics are updated automatically. If there is a delay in the automatic update, one can click the refresh button to manually update the statistics. When the log link is selected and logging is enabled, area 1324 displays all registered system events. By default, logging is not enabled.

Figure 14:
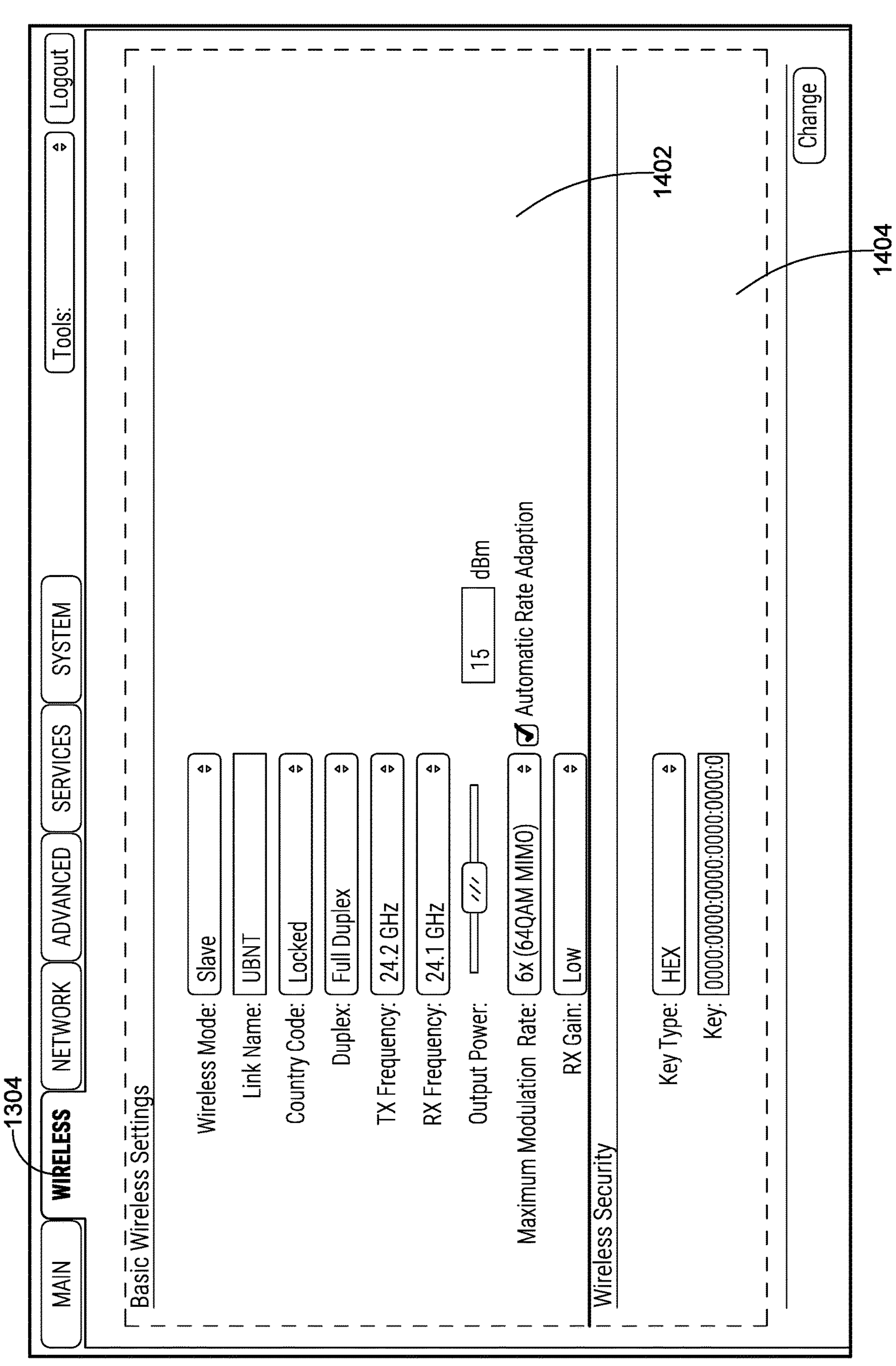
FIG. 14 presents a diagram illustrating an exemplary view of the configuration interface, in accordance with an embodiment of the present invention.

FIG. 14 presents a diagram illustrating an exemplary view of the configuration interface, in accordance with an embodiment of the present invention. As shown in FIG. 14, when wireless tab 1304 is active, two display areas are presented to the user, including an area 1402 for displaying basic wireless settings and an area 1404 for displaying wireless security settings. The change button allows the user to save or test the changes. When a user clicks on the change button, a new message appears (not shown in FIG. 14), providing the user with three options. The user can immediately save the changes by clicking on an apply button. To test the changes, the user can click a test button. To keep the changes, click the apply button. If the user does not click apply within 180 seconds (the countdown is displayed), the radio times out and resumes its earlier configuration. To cancel the changes, the user can click the discard button.

In some variations, the basic wireless settings include, but are not limited to: wireless mode, link name, country code, duplex mode, frequencies, output power, speed, and gain. The wireless mode can be set as master or slave. By default, the wireless mode is set as slave. For paired radios, one needs to be configured as master because each point-to-point link must have one master. Link name is the name for the point-to-point link. A user can enter a selected name in the field of the link name.

Because each country has its own power level and frequency regulations, to ensure that the radio operates under the necessary regulatory compliance rules, the user may select the country where the radio will be used. The frequency settings and output power limits will be tuned according to the regulations of the selected country. In some variations, the U.S. product versions are locked to the U.S. country code, as illustrated in FIG. 14, to ensure compliance with government regulations.

In this example, the duplex field includes two selections: half-duplex or full-duplex. The TX frequency field allows the user to select a transmit frequency. Note that the TX frequency on the master should be used as the RX frequency on the slave, and vice versa. The RX frequency field allows a user to select a receive frequency. The output power field defines the maximum average transmit output power (in dBm) of the radio. A user can use the slider or manually enter the output power value. The transmit power level maximum is limited according to the country regulations. The maximum modulation rate field displays either the maximum modulation rate or the modulation rate. Note that higher modulations support greater throughput but generally require stronger RF signals and higher signal-to-noise ratio (SNR). In some variations, by default, automatic rate adaptation is enabled, as shown in FIG. 14, and the maximum modulation rate is displayed. This allows the radio to automatically adjust the modulation rate to changing RF signal conditions. Under certain conditions, a user may prefer to lock the maximum modulation rate to a lower setting to improve link performance. When automatic rate adaptation is disabled, the modulation rate is displayed, and the user can lock the modulation rate to a selected setting. In some variations, there are five possible modulation choices: 6× (64QAM MIMO), 4× (16QAM MIMO), 2× (QPSK MIMO), 1× (QPSK SISO), and ¼× (QPSK SISO). The RX Gain field allows the user to select the appropriate gain for the RX antenna: high (default) or low. One can select RX Gain as low if the link is very short or being tested to prevent the signal from being distorted.

In FIG. 14, area 1404 displays wireless security settings, where 128-bit, AES (Advanced Encryption Standard) encryption is used at all times. The security settings include a key type field, which specifies the character format (HEX or ASCII), and a key field, which specifies the format of the MAC address.

Note that the same wireless settings should be applied to the radio at the other end of the point-to-point link with the exception of the wireless mode (one needs to be configured as master and the other as slave), and the TX and RX frequencies (the TX frequency on the master should be used as the RX frequency on the slave, and vice versa).

Figure 15:
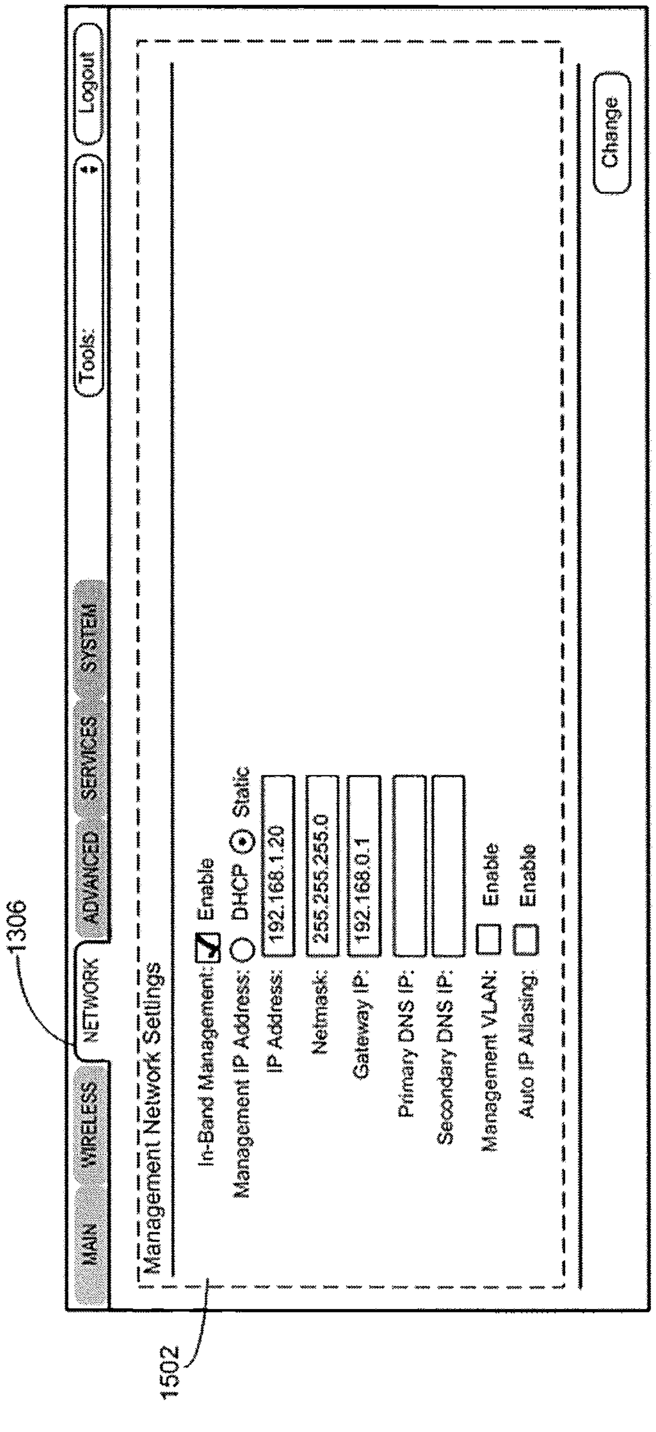
FIG. 15 presents a diagram illustrating an exemplary view of the configuration interface, in accordance with an embodiment of the present invention.

FIG. 15 presents a diagram illustrating an exemplary view of the configuration interface, in accordance with an embodiment of the present invention. As shown in FIG. 15, when network tab 1306 is active, a display area 1502 is presented to the user, which allows the user to configure settings for the management network. The change button allows a user to save or test the changes.

The in-band management field allows a user to enable or disable in-band management, which is available via the data port of the local radio or the data port of the remote radio. In-band management is enabled by default, as shown in FIG. 15. Out-of-band management is available via the configuration port, which is enabled by default. The configuration port and the in-band management share the default IP address of 192.168.1.20.

The management IP address field includes two choices: DHCP or static. When DHCP is selected, the local DHCP server assigns a dynamic IP address, gateway IP address, and DNS address to the radio. It is recommended to choose the static option, where a static IP address is assigned to the radio, as shown in FIG. 15.

When a static IP address is selected, area 1502 displays the following fields: IP address, netmask, gateway IP, primary DNS IP, secondary DNS IP, management VLAN, and auto IP aliasing. The IP address field specifies the IP address of the radio. This IP will be used for device management purposes. When the netmask is expanded into its binary form, the netmask field provides a mapping to define which portions of the IP address range are used for the network devices and which portions are used for host devices. The netmask defines the address space of the radio's network segment. For example, in FIG. 15, the netmask field displays 255.255.255.0 (or "/24"), which is commonly used on many Class C IP networks.

The gateway IP is the IP address of the host router, which provides the point of connection to the Internet. This can be a DSL modem, cable modem, or WISP gateway router. The radio directs data packets to the gateway if the destination host is not within the local network. The primary DNS IP specifies the IP address of the primary DNS (Domain Name System) server. The secondary DNS IP specifies the IP address of the secondary DNS server. Note that this entry is optional and used only if the primary DNS server is not responding.

The management VLAN field allows the user to enable the management VLAN, which results in the system automatically creating a management Virtual Local Area Network (VLAN). In some variations, when management VLAN is enabled, a VLAN ID filed appears (not shown in the figure) to allow the user to enter a unique VLAN ID from 2 to 4094. When the auto IP aliasing option is enabled, the system automatically generates an IP address for the corresponding WLAN/LAN interface. The generated IP address is a unique Class B IP address from the 169.254.X.Y range (netmask 255.255.0.0), which is intended for use within the same network segment only. The auto IP always starts with 169.254.X.Y, with X and Y being the last two octets from the MAC address of the radio. For example, if the MAC address is 00:15:6D:A3:04:FB, then the generated unique auto IP will be 169.254.4.251. The hexadecimal value, FB, converts to the decimal value, 251. This auto IP aliasing setting can be useful because the user can still access and manage devices even if the user loses, misconfigures, or forgets their IP addresses. Because an auto IP address is based on the last two octets of the MAC address, the user can determine the IP address of a device if he knows its MAC address.

Figure 16:
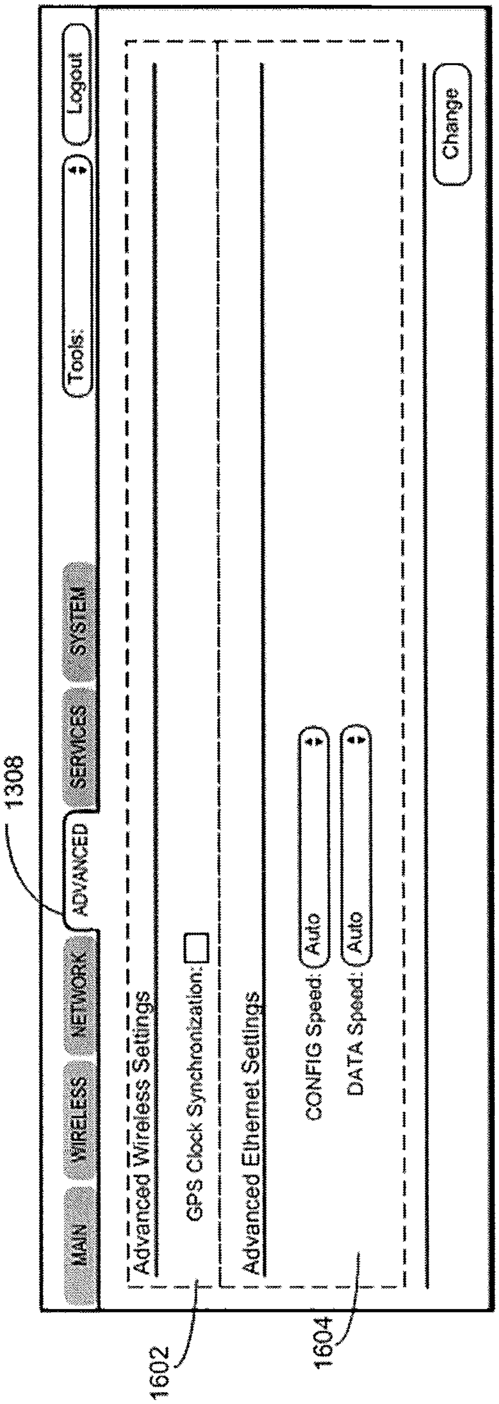
FIG. 16 presents a diagram illustrating an exemplary view of the configuration interface, in accordance with an embodiment of the present invention.

FIG. 16 presents a diagram illustrating an exemplary view of the configuration interface, in accordance with an embodiment of the present invention. As shown in FIG. 16, when advanced tab 1308 is active, display areas 1602 and 1604 are presented to the user, which allow the user to configure advanced wireless and Ethernet settings, respectively. Display area 1602 includes a GPS clock synchronization field, which allows the user to enable or disable the use of GPS to synchronize the timing of its transmissions. By default, option is disabled, as shown in FIG. 16. Display area 1604 includes a CONFIG speed field and a data speed field. The CONFIG speed field allows the user to set the speed of the configuration port. By default, this option is auto, as shown in FIG. 16, where the radio automatically negotiates transmission parameters, such as speed and duplex, with its counterpart. A user can also manually specify the maximum transmission link speed and duplex mode by selecting one of the following options: 100 Mbps-full, 100 Mbps-half, 10 Mbps-full, or 10 Mbps-half. The data speed field allows the user to set the data speed. By default, this option is auto, as shown in FIG. 16. When negotiating the transmission parameters, the networked devices first share their capabilities and then choose the fastest transmission mode they both support. The change button allows a user to save or test the changes.

Figure 17:
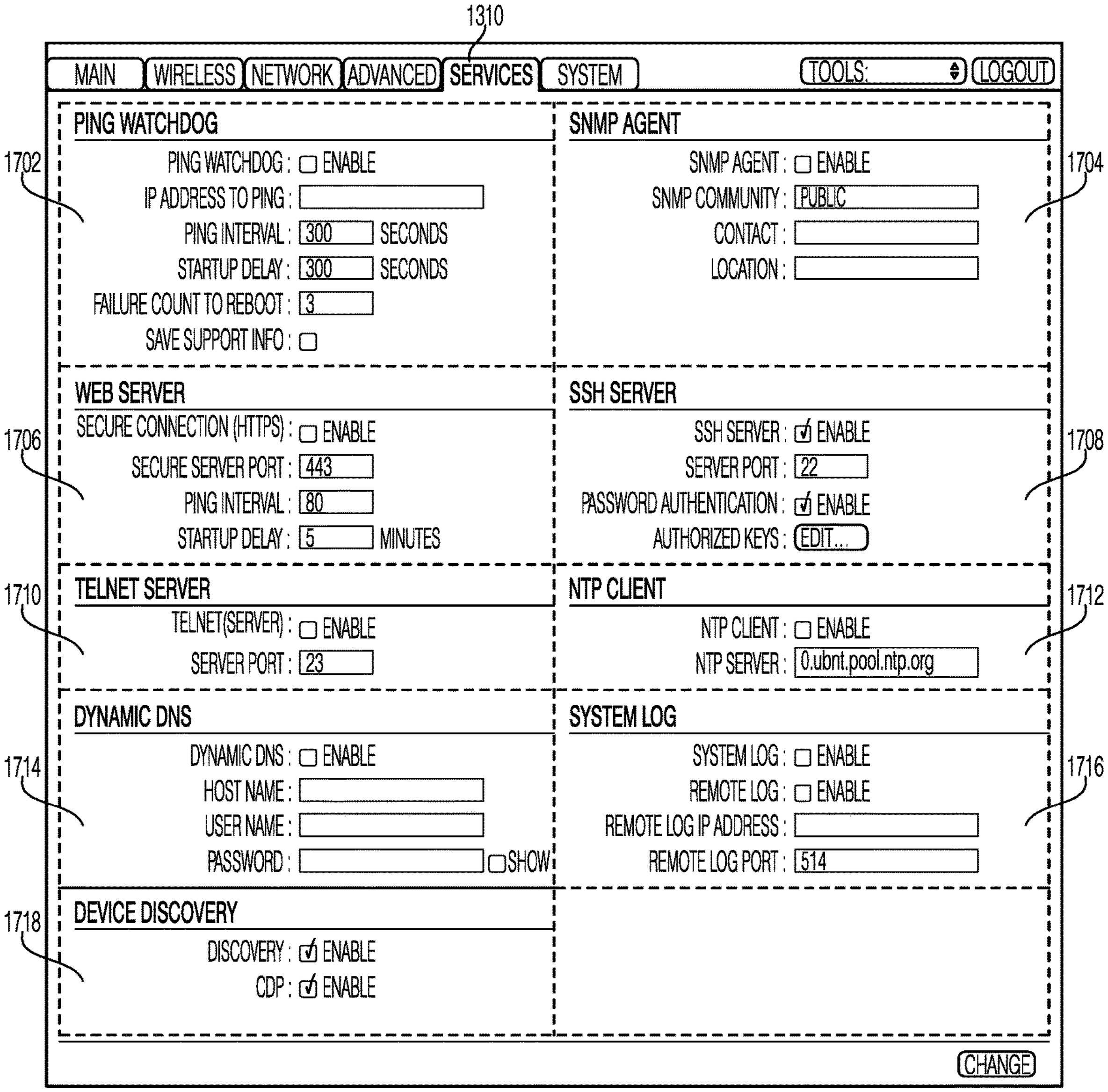
FIG. 17 presents a diagram illustrating an exemplary view of the configuration interface, in accordance with an embodiment of the present invention.

FIG. 17 presents a diagram illustrating an exemplary view of the configuration interface, in accordance with an embodiment of the present invention. As shown in FIG. 17, when services tab 1310 is active, a number of display areas are presented to the user to allow the user to configure system management services, including but not limited to: ping watchdog, SNMP agent, web server, SSH server, Telnet server, NTP client, dynamic DNS, system log, and device discovery. The change button allows the user to save or test the changes.

In some variations, ping watchdog sets the radio to continuously ping a user-defined IP address (it can be the Internet gateway, for example). If it is unable to ping under the user-defined constraints, then the radio will automatically reboot. This option creates a kind of "fail-proof" mechanism. Ping watchdog is dedicated to continuous monitoring of the specific connection to the remote host using the ping tool. The ping tool works by sending ICMP echo request packets to the target host and listening for ICMP echo response replies. If the defined number of replies is not received, the tool reboots the radio. As shown in FIG. 17, a user can enable the ping watchdog option to activate the fields in display area 1702, which include an IP address to ping field, a ping interval field, a startup delay field, a failure count to reboot field, and a save support info option.

The IP address to ping field specifies the IP address of the target to be monitored by the ping watchdog. The ping interval field specifies the time interval (in seconds) between the ICMP echo requests that are sent by the Ping watchdog. The default value is 300 seconds. The startup delay field specifies the initial time delay (in seconds) until the first ICMP echo requests are sent by the ping watchdog. The default value is 300 seconds. The startup delay value should be at least 60 seconds because the network interface and wireless connection initialization takes a considerable amount of time if the radio is rebooted. The failure count to reboot field specifies a number of ICMP echo response replies. If the specified number of ICMP echo response packets is not received continuously, the ping watchdog will reboot the radio. The default value is 3. The save support info option generates a support information file when enabled.

Simple Network Monitor Protocol (SNMP) is an application layer protocol that facilitates the exchange of management information between network devices. Network administrators use SNMP to monitor network-attached devices for issues that warrant attention. The radio includes an SNMP agent, which does the following: provide an interface for device monitoring using SNMP, communicate with SNMP management applications for network provisioning, allow network administrators to monitor network performance and troubleshoot network problems.

In some variations, as shown in FIG. 17, a user can enable the SNMP agent, and the fields in display area 1704, which include SNMP community, contact, and location, are activated. The SNMP community field specifies the SNMP community string. It is required to authenticate access to Management Information Base (MIB) objects and functions as an embedded password. The radio also supports a read-only community string; authorized management stations have read access to all the objects in the MIB except the community strings, but do not have write access. The radio supports SNMP v1. The default SNMP community is public. The contact field specifies the contact that should be notified in case of emergency. The location field specifies the physical location of the radio.

As shown in FIG. 17, configuration options of the web server are displayed in display area 1706, including an option to enable secure connection (HTTPS), a secure server port field (active only when HTTPS is enabled), a server port field, and a session timeout field. When the secure connection is enabled, the web server uses the secure HTTPS mode. When secure HTTPS mode is used, the secure server port field specifies the TCP/IP port of the web server. If the HTTP mode is used, the server port field specifies the TCP/IP port of the web server, as shown in FIG. 17. The session timeout field specifies the maximum timeout before the session expires. Once a session expires, the user needs to log in again using the username and password.

A number of SSH server parameters can be set in display area 1708. The SSH server option enables SSH access to the radio. When SSH is enabled, the server port field specifies the TCP/IP port of the SSH server. When the password authentication option is enabled, the user needs to be authenticated using administrator credentials to gain SSH access to the radio; otherwise, an authorized key is required. A user can click edit in the authorized keys field to import a public key file for SSH access to the radio instead of using an admin password.

The Telnet server parameter can be set in display area 1710. When the Telnet server option is enabled, the system activates Telnet access to the radio, and the server port field specifies the TCP/IP port of the Telnet server.

Network Time Protocol (NTP) is a protocol for synchronizing the clocks of computer systems over packet-switched, variable-latency data networks. One can use it to set the system time on the radio. If the log option is enabled, then the system time is reported next to every log entry that registers a system event. The NTP client parameter can be set in display area 1712. When the NTP client option is enabled, the radio obtains the system time from a time server on the Internet. The NTP server field specifies the IP address or domain name of the NTP server.

Domain Name System (DNS) translates domain names to IP addresses; each DNS server on the Internet holds these mappings in its respective DNS database. Dynamic Domain Name System (DDNS) is a network service that notifies the DNS server in real time of any changes in the radio's IP settings. Even if the radio's IP address changes, one can still access the radio through its domain name. The dynamic DNS parameters can be set in display area 1714. When the dynamic DNS option is enabled, the radio allows communication with the DDNS server. To do so, the user needs to enter the host name of the DDNS server in the host name field, the user name of the DDNS account in the username field, and the password of the DDNS account in the password field. When the box next to the show option is checked, the password characters are shown.

The system log parameters can be set in display area 1716. Enabling the system log option enables the registration routine of system log (syslog) messages. By default it is disabled. When enabled, the remote log option enables the syslog remote sending function. As a result, system log messages are sent to a remote server, which is specified in the remote log IP address and remote log port fields. The remote log IP address field specifies the host IP address that receives the syslog messages. One should properly configure the remote host to receive syslog protocol messages. The remote log port field specifies the TCP/IP port that receives syslog messages. 514 is the default port for the commonly used system message logging utilities, as shown in FIG. 17.

Every logged message contains at least a system time and host name. Usually a specific service name that generates the system event is also specified within the message. Messages from different services have different contexts and different levels of detail. Usually error, warning, or informational system service messages are reported; however, more detailed debug level messages can also be reported. The more detailed the system messages reported, the greater the volume of log messages generated.

The device discovery parameters can be set in display area 1718. More specifically, a user can enable the discovery option in order for the radio to be discovered by other devices through the discovery tool. A user can also enable the Cisco Discovery Protocol (CDP) option, so the radio can send out CDP packets to share its information.

Figure 18:
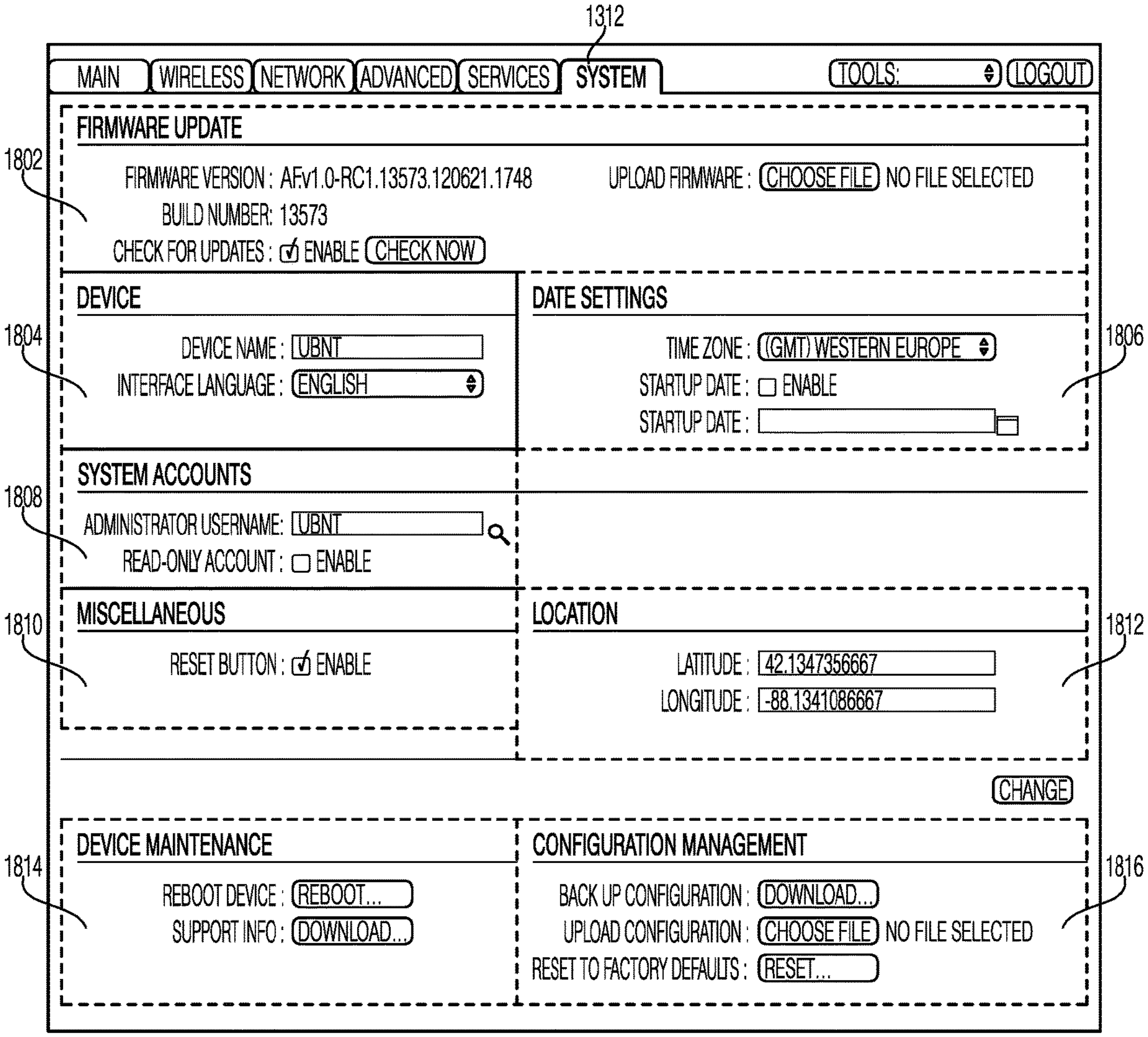
FIG. 18 presents a diagram illustrating an exemplary view of the configuration interface, in accordance with an embodiment of the present invention.

FIG. 18 presents a diagram illustrating an exemplary view of the configuration interface, in accordance with an embodiment of the present invention. As shown in FIG. 18, when system tab 1312 is active, a number of display areas are presented to the user to provide the user with a number of administrative options. More specifically, this page enables the administrator to reboot the radio, reset it to factory defaults, upload new firmware, back up or update the configuration, and configure the administrator account. The change button allows the user to save and test the changes.

The firmware maintenance is managed by the various fields in firmware update display area 1802. The firmware version field displays the current firmware version. The build number field displays the build number of the firmware version. The check for updates option is enabled by default to allow the firmware to automatically check for updates. To manually check for an update, the user can click the check now button. One can click the upload firmware button to update the radio with new firmware. The radio firmware update is compatible with all configuration settings. The system configuration is preserved while the radio is updated with a new firmware version. However, it is recommended that the user backs up the current system configuration before updating the firmware. Updating the firmware is a three-step procedure. First, click the choose file button to locate the new firmware file. In a subsequently appearing window (not shown in FIG. 18), select the file and click open. Second, click the upload button to upload the new firmware to the radio. Third, once the uploaded firmware version is displayed, click the update button to confirm. If the firmware update is in process, the user can close the firmware update window, but this does not cancel the firmware update. The firmware update routine can take three to seven minutes. The radio cannot be accessed until the firmware update routine is completed.

Device display area 1804 displays the device name and the interface language. The device name (host name) is the system-wide device identifier. The SNMP agent reports it to authorized management stations. The device name will be used in popular router operating systems, registration screens, and discovery tools. The interface language field allows a user to select the language displayed in the web management interface. English is the default language.

Data settings display area 1806 displays time zone and startup date. The time zone field specifies the time zone in relation to Greenwich Mean Time (GMT). A user can enable the startup date option to change the radio's startup date. The startup date field specifies the radio's startup date. The user can click the calendar icon or manually enter the date in the following format: MM/DD/YYYY. For example, for Apr. 5, 2012, enter Apr. 5, 2012 in the startup date field.

System accounts display area 1808 allows the user to change the administrator password to protect the device from unauthorized changes. It is recommended that the user changes the default administrator password when initially configuring the device. Note that the read-only account check box enables the read-only account, which can only view the main tab.

Miscellaneous display area 1810 includes a reset button option. Enabling the reset button allows the use of the radio's physical reset button. To prevent an accidental reset to default settings, uncheck the box.

Location display area 1812 includes a latitude field and a longitude field. After the on-board GPS determines the location of the radio, its latitude and longitude are displayed in the respective fields. If the GPS does not have a fix on its location, then "searching for satellites" will be displayed.

Device maintenance display area 1814 enables management of the radio's maintenance routines: reboot and support information reports. When the reboot button is clicked, the configuration interface initiates a full reboot cycle of the radio. Reboot is the same as the hardware reboot, which is similar to the power-off and power-on cycle. The system configuration stays the same after the reboot cycle completes. Any changes that have not been applied are lost. When the support info download button is clicked, the configuration interface generates a support information file that support engineers can use when providing customer support. This file only needs to be generated at the engineers' request.

Configuration management display area 1816 allows a user to manage the radio's configuration routines and provides the option to reset the radio to factory default settings. The radio configuration is stored in a plain text file with a ".cfg" extension. A user can back up, restore, or update the system configuration file. More specifically, a user can back up the configuration file by clicking the download button to download the current system configuration file. To upload a configuration file, one can click the choose file button to locate the new configuration file. On a subsequently appearing screen (not shown in FIG. 18), the user can select the file and click open. It is recommended that one should back up the current system configuration before uploading the new configuration. Once the new file is open, the user can click the upload button to upload the new configuration file to the radio. After the radio is rebooted, the settings of the new configuration are displayed in the wireless, network, advanced, services, and system tabs of the configuration interface. The reset button in the reset to factory defaults field resets the radio to the factory default settings. This option will reboot the radio, and all factory default settings will be restored.

Figure 19:
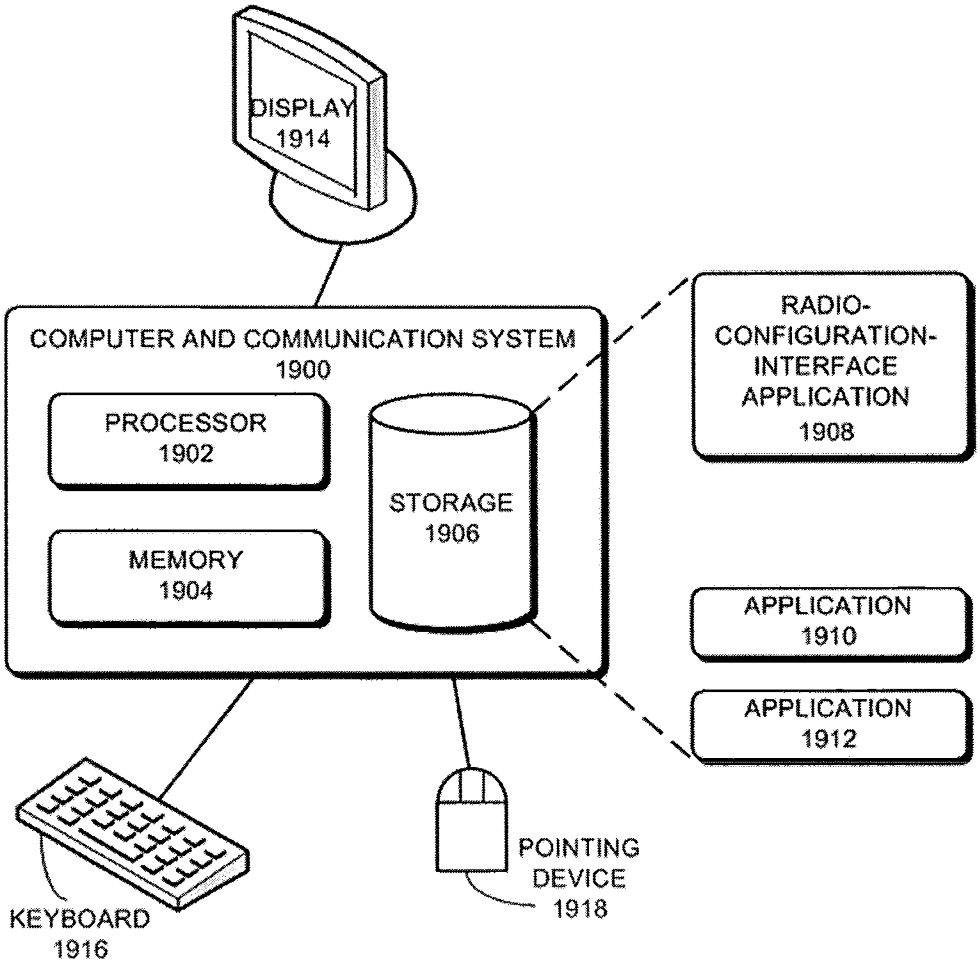
FIG. 19 illustrates an exemplary computer system for implementing the radio-configuration interface of devices, in accordance with one embodiment of the present invention.

FIG. 19 illustrates an exemplary computer system for implementing the radio-configuration interface of devices, in accordance with one embodiment of the present invention. In one embodiment, a computer and communication system 1900 includes a processor 1902, a memory 1904, and a storage device 1906. Storage device 1906 stores a radio-configuration-interface application 1908, as well as other applications, such as applications 1910 and 1912. During operation, radio-configuration-interface application 1908 is loaded from storage device 1906 into memory 1904 and then executed by processor 1902. While executing the program, processor 1902 performs the aforementioned functions. Computer and communication system 1900 is coupled to an optional display 1914, keyboard 1916, and pointing device 1918. The display, keyboard, and pointing device can facilitate the use of the radio-configuration interface.

FIG. 20 presents a diagram illustrating one variation of the receive sensitivity specifications of the radio for various modulation schemes, in accordance with an embodiment of the present invention. As one can see from FIG. 20, in this example, the higher rate modulations support greater throughput but generally require stronger RF signals (with lower receive sensitivity).

FIG. 21 presents a diagram illustrating one variation of the general specifications of the radio, in accordance with an embodiment of the present invention.

The data structures and code described in this detailed description may be stored on a computer-readable storage medium, which may be any device or medium that can store code and/or data for use by a computer system. In some variations, the computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

This application should be read in the most general possible form. This includes, without limitation, the following: References to specific techniques include alternative and more general techniques, especially when discussing aspects of the invention, or how the invention might be made or used. References to "preferred" techniques generally mean that the inventor contemplates using those techniques, and thinks they are best for the intended application. This does not exclude other techniques for the invention, and does not mean that those techniques are necessarily essential or would be preferred in all circumstances. References to contemplated causes and effects for some implementations do not preclude other causes or effects that might occur in other implementations. References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described above to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

This application should be read with the following terms and phrases in their most general form. The general meaning of each of these terms or phrases is illustrative, not in any way limiting. The terms "antenna", "antenna system" and the like, generally refer to any device that is a transducer designed to transmit or receive electromagnetic radiation. In other words, antennas convert electromagnetic radiation into electrical currents and vice versa. Often an antenna is an arrangement of conductor(s) that generate a radiating electromagnetic field in response to an applied alternating voltage and the associated alternating electric current, or can be placed in an electromagnetic field so that the field will induce an alternating current in the antenna and a voltage between its terminals.

The term "filter", and the like, generally refers to signal manipulation techniques, whether analog, digital, or otherwise, in which signals modulated onto distinct carrier frequencies can be separated, with the effect that those signals can be individually processed.

By way of example only, in systems in which frequencies both in the approximately 2.4 GHz range and the approximately 5 GHz range are concurrently used, it might occur that a single band-pass, high-pass, or low-pass filter for the approximately 2.4 GHz range is sufficient to distinguish the approximately 2.4 GHz range from the approximately 5 GHz range, but that such a single band-pass, high-pass, or low-pass filter has drawbacks in distinguishing each particular channel within the approximately 2.4 GHz range or has drawbacks in distinguishing each particular channel within the approximately 5 GHz range. In such cases, a 1st set of signal filters might be used to distinguish those channels collectively within the approximately 2.4 GHz range from those channels collectively within the approximately 5 GHz range. A 2nd set of signal filters might be used to separately distinguish individual channels within the approximately 2.4 GHz range, while a 3rd set of signal filters might be used to separately distinguish individual channels within the approximately 5 GHz range.

The term "gain" generally means a dimensionless quality of an antenna characterized by the ratio of the power received by the antenna from a source along its beam axis to the power received by a hypothetical isotropic antenna. The term "waveguide" generally means a structure that guides waves, such as electromagnetic waves. Conventionally there are different types of waveguides for each type of wave. For example and without limitation a hollow conductive metal pipe may be used to carry high frequency radio waves, particularly microwaves. Waveguides may differ in their geometry and physical makeup because different waveguides are used to guide different frequencies: an optical fiber guiding light (high frequency) will not guide microwaves (which have a much lower frequency).

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A self-correcting wide-bandwidth zero intermediate frequency radio device, the device comprising:

a controller configured to emit transmission signals into a transmission path, the controller further configured to emit calibration tones;

the first transmission path connected to the controller and including an in-phase/quadrature (IQ) modulator comprising an IQ filter and an IQ up-converter; and an IQ alignment module, wherein the IQ alignment module is connected to the first transmission path and comprises a band-limited measuring receiver having a measuring frequency $f_m$ wherein the measuring receiver determines a carrier leakage signal based on the level of a calibration tone at $f_m$, further wherein the measuring receiver determines a sideband rejection signal based on the level of a calibration tone at $\pm\frac{1}{2}(f_m)$;

wherein the IQ alignment module provides the carrier leakage signal and the sideband rejection signal to the controller.

2. The device of claim 1, wherein the controller comprises field programmable gate array (FPGA).

3. The device of claim 1, wherein the measuring receiver comprises a pair of detectors.

4. The device of claim 1, wherein the IQ alignment module comprises a pair of detectors each configured to receive orthogonal frequency division multiplexed (OFDM) transmission signals.

5. The device of claim 1, wherein the IQ alignment module comprises a filter, amplifier and analog to digital converter (ADC).

6. The device of claim 1, wherein the band-limited measuring receiver comprises a filter that sets the measuring frequency $f_m$.

7. The device of claim 1, wherein the measuring frequency is 10.7 MHz.

8. The device of claim 1, wherein the controller is configured to emit orthogonal frequency division multiplexed calibration tones during an unused portion of a broadband communication signal frame.

9. The device of claim 1, wherein the controller is configured to emit orthogonal frequency division multiplexed (OFDM) transmission signals.

10. The device of claim 1, wherein the controller is configured to adjust device based on the sideband rejection signal and the carrier leakage signal.

11. A method of automatically correcting a wide-bandwidth zero intermediate frequency radio device, the method comprising:

emitting calibration tones from a controller configured to emit broadband communication signals to first transmission path including an in-phase/quadrature (IQ) modulator;

determining a carrier leakage signal based on a level of a calibration tone at a measuring frequency, $f_m$, using an IQ alignment module having a band-limited measuring receiver with the measuring frequency;

determining a sideband rejection signal based on the level of a calibration tone at $\pm\frac{1}{2}(f_m)$; and providing the carrier leakage signal and sideband rejection signal to the controller.

12. The method of claim 11, wherein the determining steps comprise determining during an unused portion of a broadband communication signal frame.

13. The method of claim 11, wherein emitting comprises emitting calibration tones that are orthogonal frequency division multiplexed (OFDM).

14. The method of claim 11, wherein providing the carrier leakage signal and the sideband rejection signal comprise converting the carrier leakage signal to a digital signal and converting the sideband rejection signal to a digital signal.

15. The method of claim 11, wherein the measuring frequency is 10.7 MHz.

16. The method of claim 11, further comprising adjusting the wide-bandwidth zero intermediate frequency radio device based on the sideband rejection signal and the carrier leakage signal.

* * * * *